US011875927B2

(12) United States Patent
Sukegawa et al.

(10) Patent No.: US 11,875,927 B2
(45) Date of Patent: Jan. 16, 2024

(54) COIL COMPONENT

(71) Applicant: Murata Manufacturing Co., Ltd., Kyoto-fu (JP)

(72) Inventors: Takashi Sukegawa, Nagaokakyo (JP); Yasuhiro Itani, Nagaokakyo (JP); Takanori Suzuki, Nagaokakyo (JP); Yuuki Kitadai, Nagaokakyo (JP); Yoshifumi Maki, Nagaokakyo (JP); Reiichi Matsuba, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 752 days.

(21) Appl. No.: 16/850,977

(22) Filed: Apr. 16, 2020

(65) Prior Publication Data

US 2020/0335249 A1 Oct. 22, 2020

(30) Foreign Application Priority Data

Apr. 19, 2019 (JP) ................................. 2019-080204

(51) Int. Cl.
*H01F 17/04* (2006.01)
*H01F 27/30* (2006.01)
(Continued)

(52) U.S. Cl.
CPC ......... *H01F 17/045* (2013.01); *H01F 27/027* (2013.01); *H01F 27/2823* (2013.01); (Continued)

(58) Field of Classification Search
CPC .... H01F 17/0013; H01F 17/04; H01F 27/292; H01F 41/041; H01F 2017/0066; H01F 2017/048
See application file for complete search history.

(56) References Cited

U.S. PATENT DOCUMENTS 6,472,969 B1 * 10/2002 Hanato ................. H01F 17/045 336/200
2003/0071704 A1 * 4/2003 Toi .......................... H01F 27/36 336/83
(Continued)

FOREIGN PATENT DOCUMENTS

CN 108933025 A 12/2018
JP S50-37047 U 4/1975
(Continued)

OTHER PUBLICATIONS

An Office Action; "Notice of Reasons for Refusal," mailed by the Japanese Patent Office dated Dec. 1, 2021, which corresponds to Japanese Patent Application No. 2019-080204 and is related to U.S. Appl. No. 16/850,977 with English translation.

*Primary Examiner* — Marlon T Fletcher
*Assistant Examiner* — Malcolm Barnes
(74) *Attorney, Agent, or Firm* — Studebaker & Brackett PC

(57) ABSTRACT

A coil component includes a core including a winding core portion and a first flange portion that is disposed on a first end portion of the winding core portion in a direction in which the winding core portion extends. A first curved portion is formed at a connection between a bottom surface of the winding core portion and the first flange portion. A ratio of a length of the first curved portion in a height direction to a distance in the height direction between the bottom surface and a first terminal electrode is no less than 20% and no more than 60% (i.e., from 20% to 60%).

18 Claims, 28 Drawing Sheets

(51) Int. Cl.

| | |
|---|---|
| ***H01F 27/02*** | (2006.01) |
| ***H01F 41/06*** | (2016.01) |
| ***H01F 27/28*** | (2006.01) |
| ***H01F 41/02*** | (2006.01) |
| ***H01F 27/29*** | (2006.01) |

(52) U.S. Cl.

CPC ......... *H01F 27/292* (2013.01); *H01F 27/306* (2013.01); *H01F 41/0246* (2013.01); *H01F 41/06* (2013.01)

(56) References Cited

U.S. PATENT DOCUMENTS

| | | | | |
|---|---|---|---|---|
| 2005/0145408 | A1* | 7/2005 | Hess | H05K 3/3442 174/541 |
| 2005/0237141 | A1* | 10/2005 | Hirai | H01F 27/292 336/83 |
| 2007/0046413 | A1* | 3/2007 | Yamashita | H01F 17/045 336/96 |
| 2009/0045902 | A1* | 2/2009 | Hirai | H01F 17/045 29/605 |
| 2011/0128107 | A1* | 6/2011 | Kitagawa | H01F 17/045 29/606 |
| 2017/0062122 | A1* | 3/2017 | Kanbe | H01F 27/2823 |
| 2018/0342346 | A1 | 11/2018 | Hashimoto | |

FOREIGN PATENT DOCUMENTS

| | | | | |
|---|---|---|---|---|
| JP | S50037047 | U | * | 4/1975 |
| JP | 2000-208331 | A | | 7/2000 |
| JP | 2002-329618 | A | | 11/2002 |
| JP | 2002329618 | A | * | 11/2002 |
| JP | 2003-151837 | A | | 5/2003 |
| JP | 2004063697 | A | * | 2/2004 |
| JP | 2014075533 | A | | 4/2014 |
| WO | 2008/096487 | A1 | | 8/2008 |

* cited by examiner

COIL COMPONENT

CROSS-REFERENCE TO RELATED APPLICATION

This application claims benefit of priority to Japanese Patent Application No. 2019-080204, filed Apr. 19, 2019, the entire content of which is incorporated herein by reference.

BACKGROUND

Technical Field

The present disclosure relates to a coil component.

Background Art

A known coil component that is used as a common-mode choke coil includes a core that includes a winding core portion and two flange portions that are disposed on both ends of the winding core portion, and a first wire and a second wire that are wound around the winding core portion, as described, for example, in Japanese Unexamined Patent Application Publication No. 2014-75533.

SUMMARY

As the size of the coil component decreases, the size of the core decreases, and the thickness of the winding core portion of the core and the thickness of the two flange portions decrease. Consequently, there is a risk that the deflection strength of the core decreases.

Thus, the present disclosure provides a coil component that enables the deflection strength of a core to be increased.

According to preferred embodiments of the present disclosure, a coil component includes a core including a winding core portion that extends in a length direction of the coil component and a first flange portion that is disposed on a first end portion of the winding core portion in the length direction, a first wire and a second wire that are wound around the winding core portion in the same direction, a first terminal electrode that is disposed on a bottom part of the first flange portion in a height direction of the coil component perpendicular to the length direction and that is connected to a first end portion of the first wire, a second terminal electrode that is disposed on the bottom part of the first flange portion and that is connected to a first end portion of the second wire. The winding core portion includes a first curved portion that is formed at a connection between a bottom surface of the winding core portion and the first flange portion. A ratio of a length of the first curved portion in the height direction to a distance in the height direction between the bottom surface of the winding core portion and the first terminal electrode is no less than 20% and no more than 60% (i.e., from 20% to 60%) in a section of the winding core portion that passes through a center of the winding core portion and that is along a plane extending in the length direction and in the height direction.

With this structure, when the ratio of the length of the first curved portion in the height direction to the distance in the height direction between the bottom surface of the winding core portion and the first terminal electrode is 20% or more, the length of the first curved portion can be increased, and flexural strength between the winding core portion and the first flange portion can be increased. Accordingly, the deflection strength of the core can be increased. When the ratio of the length of the first curved portion in the height direction to the distance in the height direction between the bottom surface of the winding core portion and the first terminal electrode is 60% or less, the thickness of the first flange portion can be inhibited from being excessively decreased in the length direction. Accordingly, the length of the first terminal electrode can be inhibited from being excessively decreased in the length direction, and the coil component can be appropriately mounted on a circuit board.

According to preferred embodiments of the present disclosure, a coil component includes a core including a winding core portion that extends in a length direction of the coil component and a first flange portion that is disposed on a first end portion of the winding core portion in the length direction, a first wire and a second wire that are wound around the winding core portion in the same direction, a first terminal electrode that is disposed on a bottom part of the first flange portion in a height direction of the coil component perpendicular to the length direction and that is connected to a first end portion of the first wire, a second terminal electrode that is disposed on the bottom part of the first flange portion and that is connected to a first end portion of the second wire. The winding core portion includes a first curved portion that is formed at a connection between a bottom surface of the winding core portion and the first flange portion. A curvature of the first curved portion varies in the length direction from the bottom surface of the winding core portion toward a surface of the first flange portion near the winding core portion in a section of the winding core portion that passes through a center of the winding core portion and that is along a plane extending in the length direction and in the height direction.

With this structure, the variation in the curvature of the first curved portion between the winding core portion and the first flange portion enables the deflection strength of the core to be increased, and enables the length of the first flange portion to be inhibited from being excessively decreased in the length direction. Accordingly, the length of the first terminal electrode is inhibited from being excessively decreased in the length direction, and the coil component can be more appropriately mounted on the circuit board.

According to preferred embodiments of the present disclosure, a coil component enables the deflection strength of a core to be increased.

Other features, elements, characteristics and advantages of the present disclosure will become more apparent from the following detailed description of preferred embodiments of the present disclosure with reference to the attached drawings.

DETAILED DESCRIPTION

Figure 1:
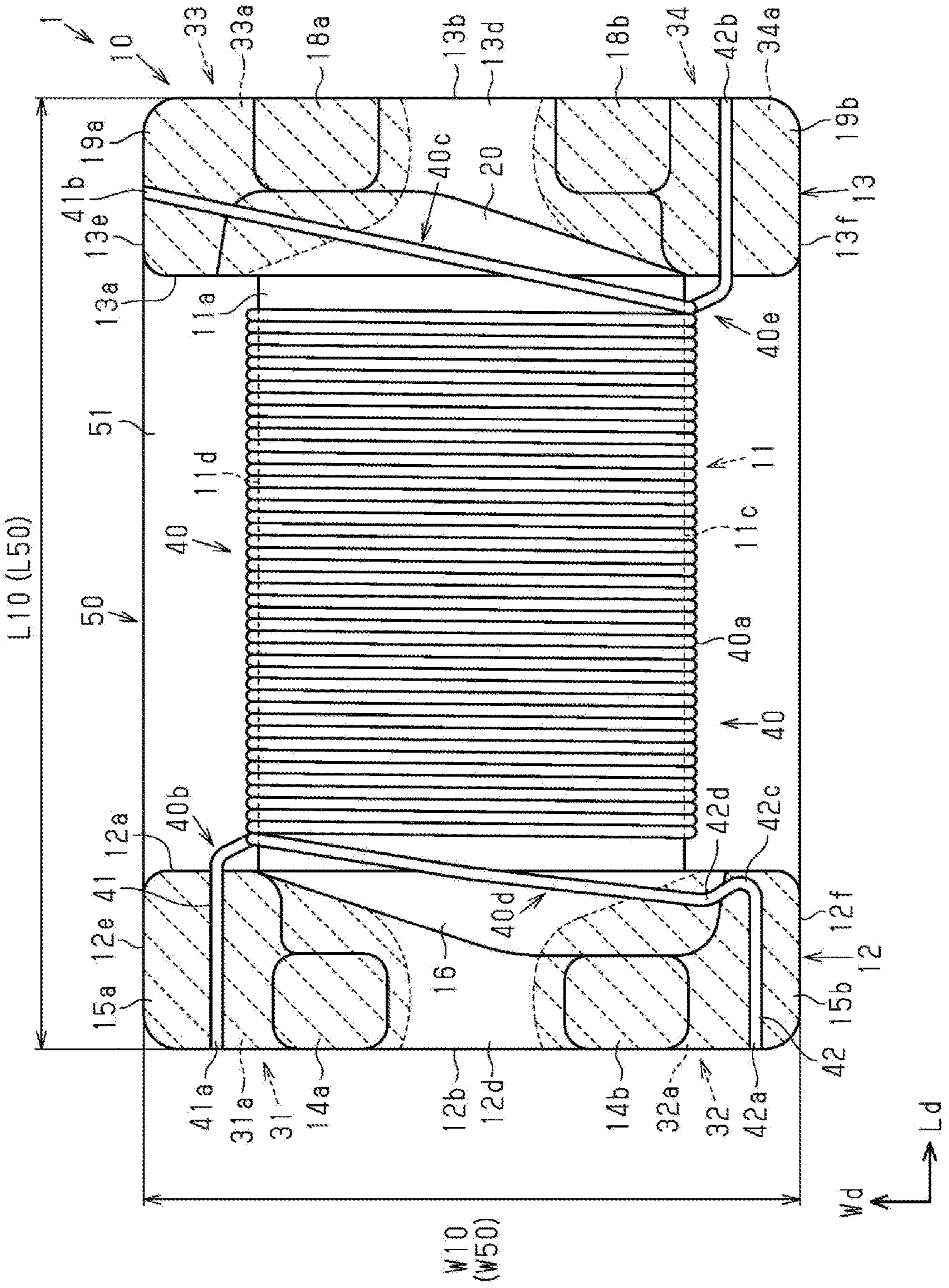
FIG. 1 is a schematic bottom view of a coil component according to an embodiment.

An embodiment will hereinafter be described. In some of the accompanying drawings, an illustration of components is enlarged to make the components easy to understand. The ratio of dimensions of some of the components differs from the actual ratio or differs between the different drawings. In sectional views, some of the components are not hatched to make the components easy to understand.

As illustrated in FIG. 1 to FIG. 4, a coil component 1 includes a core 10 and a coil 40 that is wound around the core 10. An example of the coil component 1 is a surface-mount-type coil component. An example of the coil component 1 according to the present embodiment is a common-mode choke coil.

The core 10 is composed of a nonconductive material, specifically, a non-magnetic material such as alumina or a magnetic material such as nickel (Ni)-zinc (Zn) ferrite. The core 10 is formed, for example, in a manner in which a molded body composed of a compressed nonconductive material is fired. The core 10 is not limited to the molded body that is composed of a compressed nonconductive material and that is fired. The core 10 may be formed by thermally curing a resin containing magnetic powder such as metal powder or ferrite powder, a resin containing non-magnetic powder such as silica powder, or a resin containing no filler.

As illustrated in FIG. 1 to FIG. 6, the core 10 includes a winding core portion 11 that extends in a length direction Ld of the coil component 1, a first flange portion 12 that is disposed on a first end portion of the winding core portion 11 in the length direction Ld, and a second flange portion 13 that is disposed on a second end portion of the winding core portion 11 in the length direction Ld. According to the present embodiment, the winding core portion 11, the first flange portion 12, and the second flange portion 13 are integrally formed. In the specification, the length direction Ld can also be referred to as a direction in which the first flange portion 12 and the second flange portion 13 are arranged. In the specification, a "height direction Td" and a "width direction Wd" of the coil component 1 are defined as follows. The height direction Td is perpendicular to the length direction Ld and is perpendicular to main surfaces of a circuit board with the coil component 1 mounted on the circuit board. The width direction Wd is perpendicular to the length direction Ld and is parallel to the main surfaces of the circuit board with the coil component 1 mounted on the circuit board. In the following description, a dimension in the length direction Ld is referred to as a "length dimension L", a dimension in the height direction Td is referred to as a "height dimension T", and a dimension in the width direction Wd is referred to as a "width dimension W".

Figure 3:
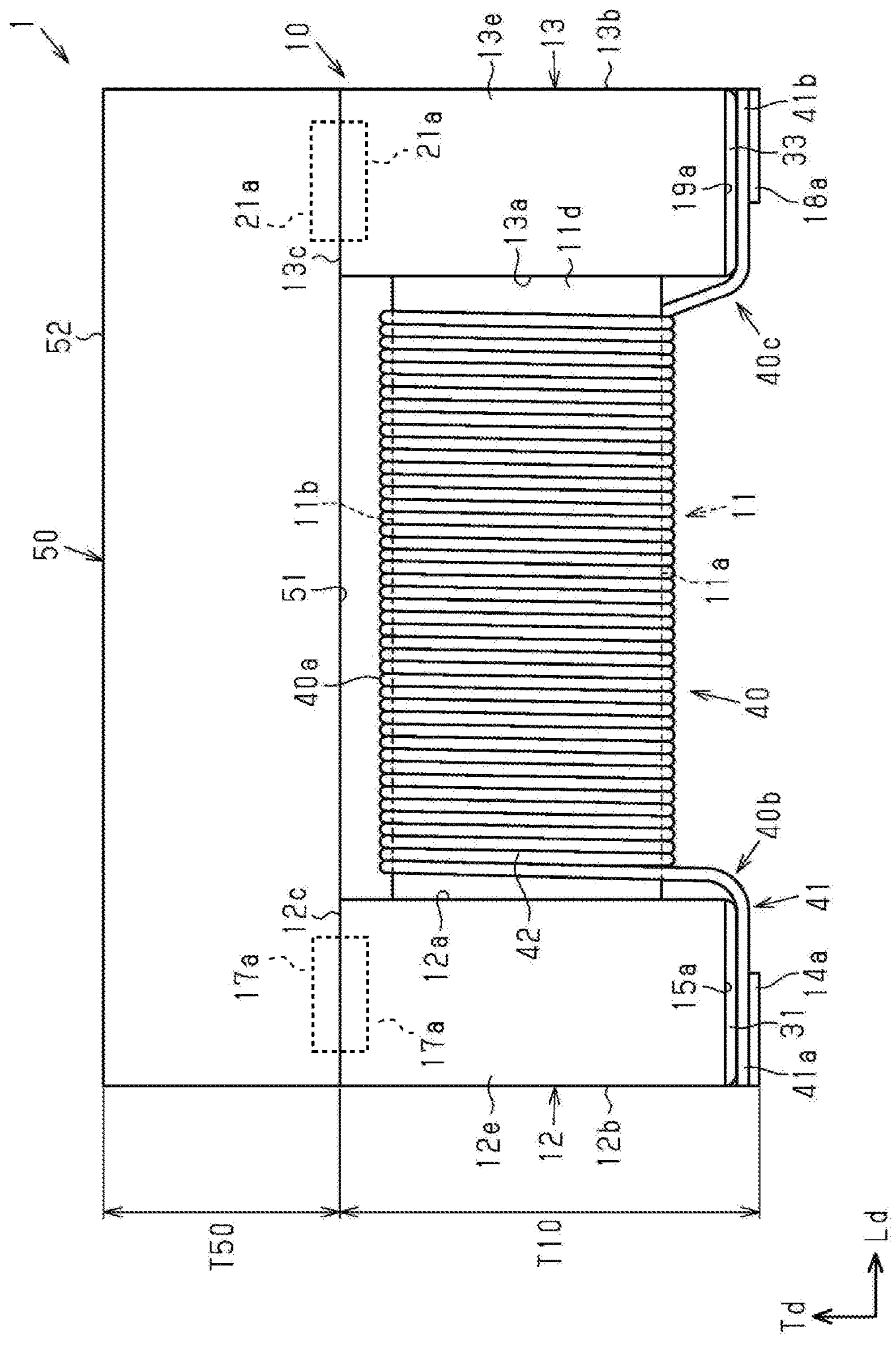
FIG. 3 is a schematic side view of the coil component according to the embodiment.
Figure 5:
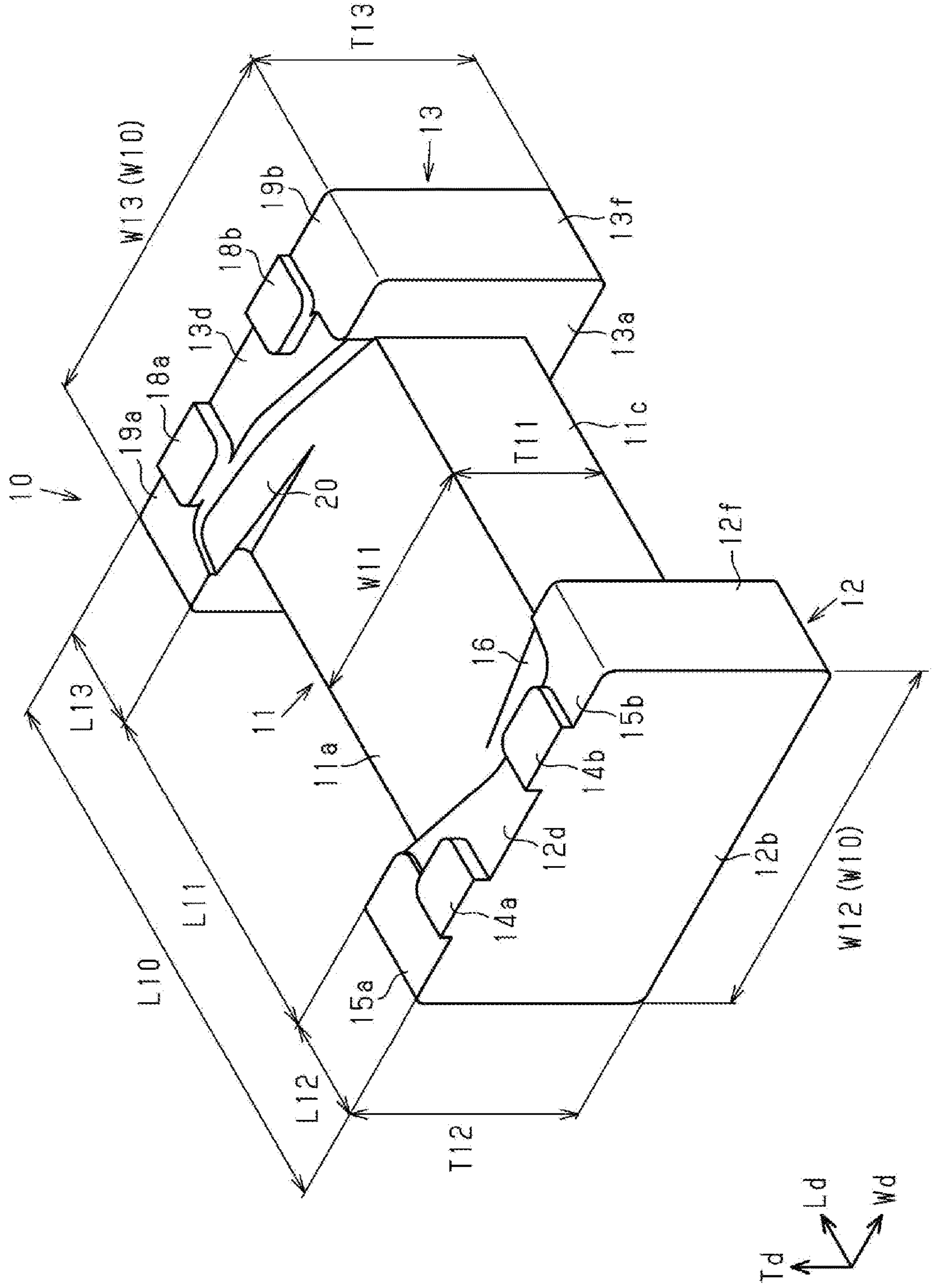
FIG. 5 is a perspective view of a core.

As illustrated in FIG. 3 and FIG. 5, the size of the core 10 is as follows. The length dimension L10 of the core 10 is about 4.6 mm, the width dimension W10 of the core 10 is about 3.2 mm, and the height dimension T10 of the core 10 is about 2.0 mm. The length dimension L10 is equal to the distance in the length direction Ld from an outer surface 12*b* of the first flange portion 12 to an outer surface 13*b* of the second flange portion 13. The width dimension W10 is equal to the distance in the width direction Wd from a first side surface 12*e* of the first flange portion 12 to a second side surface 12*f*. The height dimension T10 is equal to the distance in the height direction Td from an end surface of a leg portion 14*a* of the first flange portion 12 in the height direction Td to an upper surface 12*c* of the first flange portion 12 described later.

The length dimension L11 of the winding core portion 11 is larger than the width dimension W11 and the height dimension T11 of the winding core portion 11. The width dimension W11 is larger than the height dimension T11. According to the present embodiment, the width dimension W11 is about 0.6 mm. The width dimension W11 is preferably 1.0 mm or less. The height dimension T11 of the winding core portion 11 according to the present embodiment is smaller than the width dimension W11.

A cross-section of the winding core portion 11 perpendicular to the length direction Ld has a substantially polygonal shape. According to the present embodiment, a sectional shape of the winding core portion 11 is a substantially quadrilateral shape. In the specification, the "substantially polygonal shape" includes a shape a corner portion of which is chamfered, a shape a corner portion of which is rounded, and a shape a side of which is curved. The shape of the cross-section of the winding core portion 11 is not limited to the substantially polygonal shape and can be freely changed. An example of the shape of the cross-section of the winding core portion 11 may be a substantially circular, a substantially elliptic shape, or a combination of these shapes and a substantially polygonal shape.

According to the present embodiment, the winding core portion 11 has a bottom surface 11*a* and an upper surface 11*b* that face each other in the height direction Td, and a first side surface 11*c* and a second side surface 11*d* that face each other in the width direction Wd. Each of the bottom surface 11*a*, the upper surface 11*b*, the first side surface 11*c*, and the second side surface 11*d* is one of surfaces that define the winding core portion 11. According to the present embodiment, the bottom surface 11*a* is parallel to the upper surface 11*b*, and the first side surface 11*c* is parallel to the second side surface 11*d*. The bottom surface 11*a* faces the circuit board with the coil component 1 mounted on the circuit board.

Figure 6:
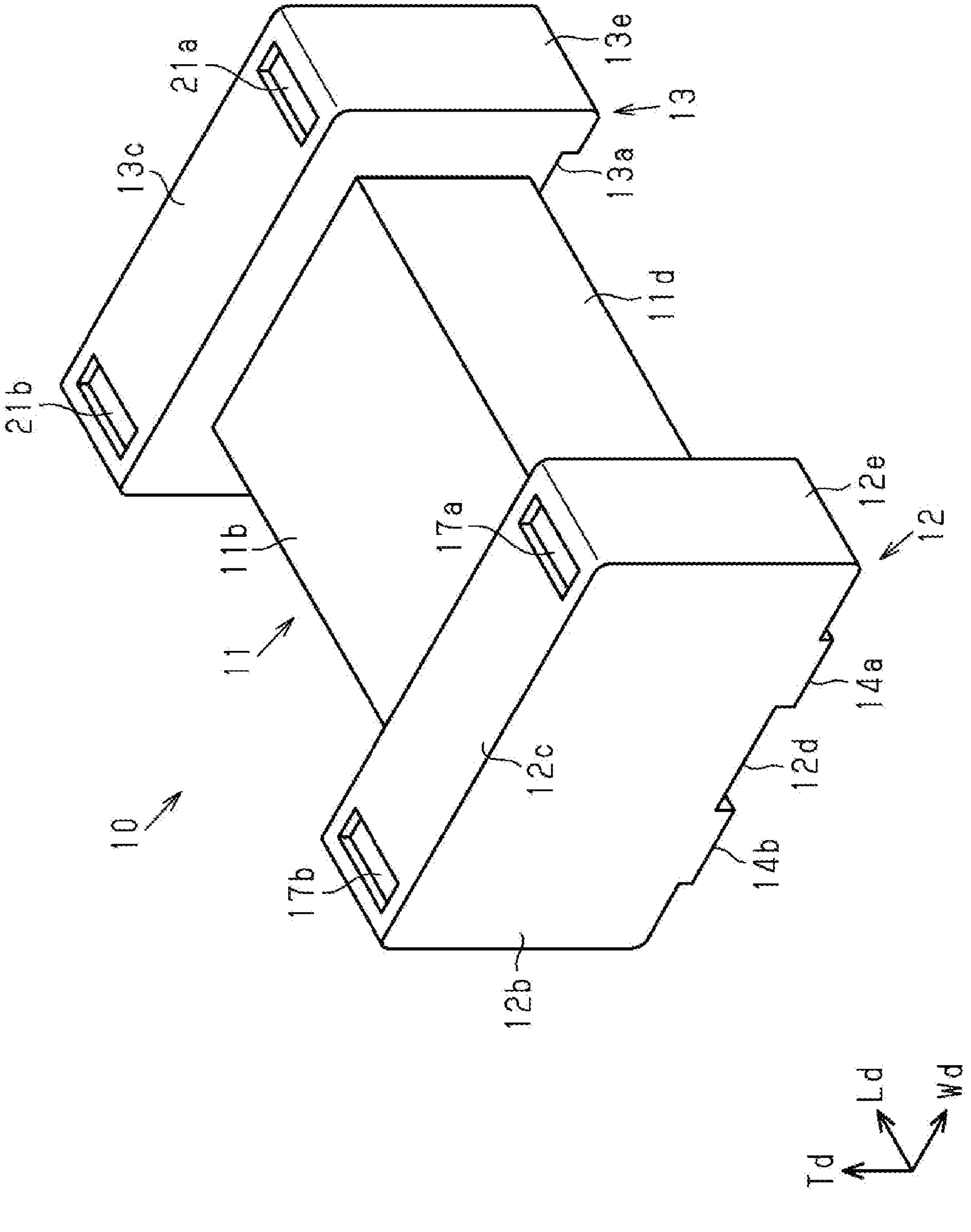
FIG. 6 is a perspective view of the core viewed at an angle that differs from that in FIG. 5.

As illustrated in FIG. 5 and FIG. 6, the shape of the first flange portion 12 is substantially the same as the shape of the second flange portion 13. The width dimension W12 of the first flange portion 12 and the width dimension W13 of the second flange portion 13 are larger than the height dimension T12 of the first flange portion 12 and the height dimension T13 of the second flange portion 13. The height dimension T12 of the first flange portion 12 and the height dimension T13 of the second flange portion 13 are larger than the length dimension L12 of the first flange portion 12 and the length dimension L13 of the second flange portion 13. The width dimension W12 of the first flange portion 12 and the width dimension W13 of the second flange portion 13 are larger than the width dimension W11 of the winding core portion 11. The height dimension T12 of the first flange portion 12 and the height dimension T13 of the second flange portion 13 are larger than the height dimension T11 of the winding core portion 11. The height dimension T12 of the first flange portion 12 is equal to the distance in the height direction Td from the upper surface 12*c* of the first flange portion 12 described later to a bottom surface 12*d*. The height dimension T13 of the second flange portion 13 is equal to the distance in the height direction Td from an upper surface 13*c* of the second flange portion 13 described later to a bottom surface 13*d*.

The first flange portion 12 has an inner surface 12*a*, the outer surface 12*b*, the upper surface 12*c*, the bottom surface 12*d*, the first side surface 12*e*, and the second side surface 12*f*. The inner surface 12*a* faces the winding core portion 11 in the length direction Ld. The outer surface 12*b* is opposite the inner surface 12*a* in the length direction Ld. The upper surface 12*c* and the bottom surface 12*d* face each other in the height direction Td and connect the inner surface 12*a* and the outer surface 12*b* to each other. A first end portion of the first flange portion 12 in the height direction Td has the bottom surface 12*d*. A second end portion of the first flange portion 12 in the height direction Td has the upper surface 12*c*. The bottom surface 12*d* faces the circuit board in the height direction Td with the coil component 1 mounted on the circuit board. The upper surface 12*c* is opposite the bottom surface 12*d* in the height direction Td. The first side surface 12*e* and the second side surface 12*f* face each other in the width direction Wd and connect the inner surface 12*a*, the outer surface 12*b*, the upper surface 12*c*, and the bottom surface 12*d* to each other. The second side surface 12*f* is opposite the first side surface 12*e* in the width direction Wd.

The second flange portion 13 has an inner surface 13*a*, the outer surface 13*b*, the upper surface 13*c*, the bottom surface 13*d*, a first side surface 13*e*, and a second side surface 13*f*. The inner surface 13*a* faces the winding core portion 11 in the length direction Ld. The outer surface 13*b* opposite the inner surface 13*a* in the length direction Ld. The upper surface 13*c* and the bottom surface 13*d* face each other in the height direction Td and connect the inner surface 13*a* and the outer surface 13*b* to each other. A first end portion of the second flange portion 13 in the height direction Td has the bottom surface 13*d*. A second end portion of the second flange portion 13 in the height direction Td has the upper surface 13*c*. The bottom surface 13*d* faces the circuit board in the height direction Td with the coil component 1 mounted on the circuit board. The upper surface 13*c* is opposite the bottom surface 13*d* in the height direction Td. The first side surface 13*e* and the second side surface 13*f* face each other in the width direction Wd and connect the inner surface 13*a*, the outer surface 13*b*, the upper surface 13*c*, and the bottom surface 13*d* to each other. The second side surface 13*f* is opposite the first side surface 13*e* in the width direction Wd.

The bottom surface 11*a* of the winding core portion 11 thus faces in the same height direction Td as the direction in which the bottom surface 12*d* of the first flange portion 12 and the bottom surface 13*d* of the second flange portion 13 face. The upper surface 11*b* of the winding core portion 11 faces in the same height direction Td as the direction in which the upper surface 12*c* of the first flange portion 12 and the upper surface 13*c* of the second flange portion 13 face.

As illustrated in FIG. 1 and FIG. 5, the first flange portion 12 includes two leg portions 14*a* and 14*b* that protrude from the bottom surface 12*d* in the height direction Td. The leg portion 14*a* and the leg portion 14*b* are spaced from each other in the width direction Wd. The leg portion 14*a* is disposed near the first side surface 12*e* of the first flange portion 12 in the width direction Wd. The leg portion 14*b* is disposed near the second side surface 12*f* of the first flange portion 12 in the width direction Wd. The leg portions 14*a* and 14*b* are between imaginary lines that extend in the length direction Ld from the first side surface 11*c* and the second side surface 11*d* of the winding core portion 11 when viewed in the length direction Ld. The length dimensions of the leg portions 14*a* and 14*b* in the length direction Ld are smaller than the length dimension L12 of the first flange portion 12 in the length direction Ld. A protruding portion 15*a* is formed on the first flange portion 12 between the leg portion 14*a* and the first side surface 12*e*. A protruding portion 15*b* is formed on the first flange portion 12 between the leg portion 14*b* and the second side surface 12*f*. The protruding portions 15*a* and 15*b* protrude from the bottom surface 12*d* in the height direction Td. The protruding portion 15*a* extends in the width direction Wd from the leg portion 14*a* to the first side surface 12*e* and extends in the length direction Ld from the inner surface 12*a* of the first flange portion 12 to the outer surface 12*b*. The protruding portion 15*b* extends in the width direction Wd from the leg portion 14*b* to the second side surface 12*f* and extends in the length direction Ld from the inner surface 12*a* of the first flange portion 12 to the outer surface 12*b*.

A sloping portion 16 is formed on the first flange portion 12 near the inner surface 12*a*. The sloping portion 16 extends in the width direction Wd. An end portion of the sloping portion 16 near the first side surface 12*e* in the width direction Wd is connected to the bottom surface 11*a* of the winding core portion 11. The sloping portion 16 slopes such that the distance in the height direction Td from the bottom surface 11*a* of the winding core portion 11 gradually increases in the width direction Wd from the first side surface 12*e* toward the second side surface 12*f*. An end portion of the sloping portion 16 near the second side surface 12*f* in the width direction Wd is connected to the protruding portion 15*b*. The length dimension, in the length direction Ld, of a part of the sloping portion 16 near the protruding portion 15*a* gradually decreases in the direction toward the protruding portion 15*a*. The length dimension, in the length direction Ld, of a part of the sloping portion 16 near the protruding portion 15*b* is constant.

As illustrated in FIG. 1, a first terminal electrode 31 and a second terminal electrode 32 are disposed on the first end portion of the first flange portion 12 in the height direction Td. The first terminal electrode 31 is disposed on the leg portion 14*a* and the protruding portion 15*a*, and the second terminal electrode 32 is disposed on the leg portion 14*b* and the protruding portion 15*b*, when viewed in the height direction Td. According to the present embodiment, the second terminal electrode 32 is disposed at a part of the sloping portion 16 near the protruding portion 15*b*.

As illustrated in FIG. 6, recessed portions 17*a* and 17*b* are formed on the second end portion of the first flange portion 12 in the height direction Td. The recessed portions 17*a* and 17*b* are formed so as to be recessed in the height direction Td from the upper surface 12*c* of the first flange portion 12. The two recessed portions 17*a* and 17*b* are spaced from each other in the width direction Wd. The recessed portion 17*a* is formed on a part of the first flange portion 12 that extends in the width direction Wd between an imaginary line that extends in the length direction Ld from the second side surface 11*d* of the winding core portion 11 and the first side surface 12*e*. The recessed portion 17*b* is formed on a part of the first flange portion 12 that extends in the width direction Wd between an imaginary line that extends in the length direction Ld from the first side surface 11*c* of the winding core portion 11 and the second side surface 12*f*. According to the present embodiment, the recessed portions 17*a* and 17*b* have the same shape and extend in the length direction Ld. The shape of each of the recessed portions 17*a* and 17*b* is a substantially rectangular shape when viewed in the height direction Td, the longitudinal direction thereof coincides with the length direction Ld, and the transverse direction thereof coincides with the width direction Wd. According to the present embodiment, the recessed portions 17*a* and 17*b* are spaced from the inner surface 12*a*, the outer surface 12*b*, the first side surface 12*e*, and the second side surface 12*f* of the first flange portion 12. The depth of the recessed portion 17*a* is equal to the depth of the recessed portion 17*b*. The depths of the recessed portions 17*a* and 17*b* are constant in the length direction Ld and in the width direction Wd. The depths of the recessed portions 17*a* and 17*b* mean the depths of the recessed portions 17*a* and 17*b* when viewed in the height direction Td and are defined by the height dimensions from the upper surface 12*c* of the first flange portion 12 to the bottom surfaces of the recessed portions 17*a* and 17*b*. The recessed portions 17*a* and 17*b* are formed when the core 10 is molded. For example, the recessed portions 17*a* and 17*b* are formed together with the core 10 by projections that are formed on a mold for molding the core 10. After the recessed portions 17*a* and 17*b* are formed together with the core 10, corner portions of the recessed portions 17*a* and 17*b* are rounded by a barrel process. For example, the corner portions of the recessed portions 17*a* and 17*b* connect the upper surface 12*c* of the first flange portion 12 and the inner side surfaces of the recessed portions 17*a* and 17*b* to each other. Also, as shown, for example, in hidden lines in FIGS. 3 and 4, the recessed portions 17*a* and 17*b* are formed on the upper surface 12*c* of the first flange portion 12 that faces the first surface 51 of the plate member 50, or in the plate member 50, or both.

As illustrated in FIG. 1 and FIG. 5, the second flange portion 13 includes two leg portions 18*a* and 18*b* that protrude from the bottom surface 13*d* in the height direction Td. The leg portion 18*a* and the leg portion 18*b* are spaced from each other in the width direction Wd. The leg portion 18*a* is disposed near the first side surface 13*e* of the second flange portion 13 in the width direction Wd. The leg portion 18*b* is disposed near the second side surface 13*f* of the second flange portion 13 in the width direction Wd. The leg portions 18*a* and 18*b* are between imaginary lines that extend in the length direction Ld from the first side surface 11*c* and the second side surface 11*d* of the winding core portion 11 when viewed in the length direction Ld. The length dimensions of the leg portions 18*a* and 18*b* in the length direction Ld are smaller than the length dimension L13 of the second flange portion 13 in the length direction Ld. A protruding portion 19*a* is formed on the second flange portion 13 between the leg portion 18*a* and the first side surface 13*e*. A protruding portion 19*b* is formed on the second flange portion 13 between the leg portion 18*b* and the second side surface 13*f*. The protruding portions 19*a* and 19*b* protrude from the bottom surface 13*d* of the second flange portion 13 in the height direction Td. The protruding portion 19*a* extends in the width direction Wd from the leg portion 18*a* to the first side surface 13*e* and extends in the length direction Ld from the inner surface 13*a* of the second flange portion 13 to the outer surface 13*b*. The protruding portion 19*b* extends in the width direction Wd from the leg portion 18*b* to the second side surface 13*f* and extends in the length direction Ld from the inner surface 13*a* of the second flange portion 13 to the outer surface 13*b*.

A sloping portion 20 is formed on the second flange portion 13 near the inner surface 13*a*. The sloping portion 20 extends in the width direction Wd. An end portion of the sloping portion 20 near the second side surface 13*f* in the width direction Wd is connected to the bottom surface 11*a* of the winding core portion 11. The sloping portion 20 slopes such that the distance in the height direction Td from the bottom surface 11*a* of the winding core portion 11 gradually increases in the width direction Wd from the second side surface 13*f* toward the first side surface 13*e*. That is, the direction of the slope of the sloping portion 20 is opposite the direction of the slope of the sloping portion 16. An end portion of the sloping portion 20 near the first side surface 13*e* in the width direction Wd is connected to the bottom surface 13*d*. The length dimension, in the length direction Ld, of a part of the sloping portion 20 near the protruding portion 19*a* is constant. The length dimension, in the length direction Ld, of a part of the sloping portion 20 near the protruding portion 19*b* gradually decreases in the direction toward the protruding portion 19*b*.

As illustrated in FIG. 1, a third terminal electrode 33 and a fourth terminal electrode 34 are disposed on the first end portion of the second flange portion 13 in the height direction Td. The third terminal electrode 33 is disposed on the leg portion 18*a* that is offset in the same width direction Wd as the leg portion 14*a* of the first flange portion 12 at which the first terminal electrode 31 is disposed. The fourth terminal electrode 34 is disposed on the leg portion 18*b* that is offset in the same width direction Wd as the leg portion 14*b* of the first flange portion 12 at which the second terminal electrode 32 is disposed. The third terminal electrode 33 is disposed on the leg portion 18*a* and the protruding portion 19*a*, and the fourth terminal electrode 34 is disposed on the leg portion 18*b* and the protruding portion 19*b*, when viewed in the height direction Td. According to the present embodiment, the third terminal electrode 33 is disposed at a part of the sloping portion 20 near the protruding portion 19*a*. The third terminal electrode 33 and the fourth terminal electrode 34 are not electrically connected to each other.

As illustrated in FIG. 6, recessed portions 21*a* and 21*b* are formed on the second end portion of the second flange portion 13 in the height direction Td. The recessed portions 21*a* and 21*b* are formed so as to be recessed in the height direction Td from the upper surface 13*c* of the second flange portion 13. The two recessed portions 21*a* and 21*b* are spaced from each other in the width direction Wd. The recessed portion 21*a* is formed on a part of the second flange portion 13 located nearer than the winding core portion 11 to the first side surface 13*e* in the width direction Wd. The recessed portion 21*b* is formed on a part of the second flange portion 13 located nearer than the winding core portion 11 to the second side surface 13*f* in the width direction Wd. According to the present embodiment, the recessed portions 21*a* and 21*b* have the same shape and extend in the length direction Ld. The shape of each of the recessed portions 21*a* and 21*b* is a substantially rectangular shape when viewed in the height direction Td, the longitudinal direction thereof coincides with the length direction Ld, and the transverse direction thereof coincides with the width direction Wd. According to the present embodiment, the depth of the recessed portion 21*a* is equal to the depth of the recessed portion 21*b*. The depths of the recessed portions 21*a* and 21*b* are constant in the length direction Ld and in the width direction Wd. The depths of the recessed portions 21*a* and 21*b* mean the depths of the recessed portions 21*a* and 21*b* when viewed in the height direction Td and are defined by the height dimensions from the upper surface 13*c* of the second flange portion 13 to the bottom surfaces of the recessed portions 21*a* and 21*b*. The recessed portions 21*a* and 21*b* are formed when the core 10 is molded. For example, the recessed portions 21*a* and 21*b* are formed together with the core 10 by projections that are formed on the mold for molding the core 10. After the recessed portions 21*a* and 21*b* are formed together with the core 10, corner portions of the recessed portions 21*a* and 21*b* are rounded by a barrel process. For example, the corner portions of the recessed portions 21*a* and 21*b* connect the upper surface 13*c* of the second flange portion 13 and the inner side surfaces of the recessed portions 21*a* and 21*b* to each other. According to the present embodiment, the shapes of the recessed portions 21*a* and 21*b* are the same as the shapes of the recessed portions 17*a* and 17*b* of the first flange portion 12. The shape of at least one of the recessed portions 17*a*, 17*b*, 21*a*, and 21*b* may differ from the shapes of the other recessed portions. Also, as with recessed portions 17*a* and 17*b*, and as shown, for example, in hidden lines in FIGS. 3 and 4, the recessed portions 21*a* and 21*b* are formed on the upper surface 13*c* of the second flange portion 13 that faces the first surface 51 of the plate member 50, or in the plate member 50, or both.

The first terminal electrode 31, the second terminal electrode 32, the third terminal electrode 33, and the fourth terminal electrode 34 each include, for example, an underlying electrode and a plating layer that is formed on a surface of the underlying electrode. Examples of the material of the underlying electrode include metal such as silver (Ag) and copper (Cu), and an alloy such as nickel (Ni)-chrome (Cr). Examples of the material of the plating layer include metal such as tin (Sn), Cu, and Ni, and an alloy such as Ni—Sn. The plating layer may have a multilayer structure.

The first terminal electrode 31 includes a first bottom surface electrode 31*a* (region surrounded by a dashed line in FIG. 1) that contains the end surface of the leg portion 14*a* in the height direction Td and a region of the bottom surface 12*d* around the leg portion 14*a* when viewed in the height direction Td. As illustrated in FIG. 1, the shape of the outer edge of the first bottom surface electrode 31*a* includes a convex curve. The outer edge of the first bottom surface electrode 31*a* corresponds to the boundary between the first bottom surface electrode 31*a* and the core 10. According to the present embodiment, the shape of a part of the outer edge of the first bottom surface electrode 31*a* includes a convex curve. This will be described in more detail. The shape of a part of the outer edge of the first bottom surface electrode 31*a* that is not in contact with the inner surface 12*a*, the outer surface 12*b*, and the first side surface 12*e* of the first flange portion 12 includes the convex curve. Specifically, the outer edge of the first bottom surface electrode 31*a* protrudes in the width direction Wd from the leg portion 14*a* toward the leg portion 14*b*, and the shape of the protruding end portion includes a convex curve in the direction toward the leg portion 14*b*.

Figure 7A:
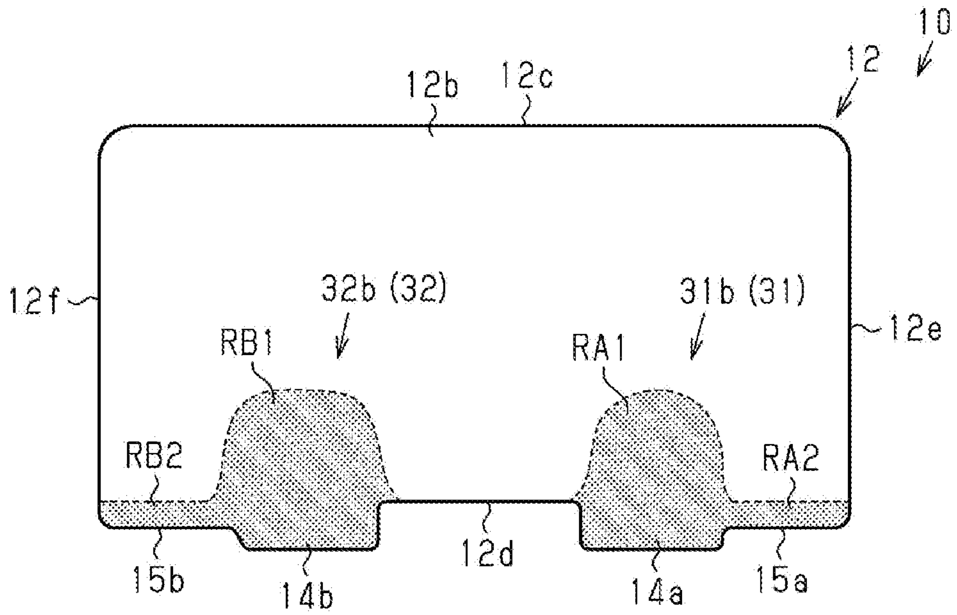
FIG. 7A is a front view of a first flange portion of the core.

As illustrated in FIG. 7A, the first terminal electrode 31 includes a first end surface electrode 31*b* that extends in the height direction Td from the bottom surface 12*d* of the first flange portion 12 when viewed in the length direction Ld in front of the outer surface 12*b* of the first flange portion 12. The first end surface electrode 31*b* is formed in a first region RA1 in which the leg portion 14*a* is disposed on the outer surface 12*b* of the first flange portion 12, and a second region RA2 located nearer than the first region RA1 to the first side surface 12*e* of the first flange portion 12. The first region RA1 extends in the height direction Td. The length of the first region RA1 in the height direction Td is longer than the length thereof in the width direction Wd. The shape of the outer edge of the first region RA1 includes a convex curve in the height direction Td toward the upper surface 12*c*. The outer edge of the first region RA1 corresponds to the boundary between a portion of the first end surface electrode 31*b* near the first region RA1 and the core 10. According to the present embodiment, the shape of a part of the outer edge of the first region RA1 includes a convex curve. This will be described in more detail. The shape of a part of the first region RA1 located nearer than the second region RA2 to the upper surface 12*c* includes the convex curve. The second region RA2 is located along the end portion of the outer surface 12*b* of the first flange portion 12 near the bottom surface 12*d* in the height direction Td. The length dimension of the second region RA2 in the height direction Td is constant.

As illustrated in FIG. 1, the second terminal electrode 32 includes a second bottom surface electrode 32*a* (region surrounded by a dashed line in FIG. 1) that contains the end surface of the leg portion 14*b* in the height direction Td and a region of the bottom surface 12*d* around the leg portion 14*b* when viewed in the height direction Td. As illustrated in FIG. 1, the shape of the outer edge of the second bottom surface electrode 32*a* includes a convex curve. The outer edge of the second bottom surface electrode 32*a* corresponds to the boundary between the second bottom surface electrode 32*a* and the core 10. According to the present embodiment, the shape of a part of the outer edge of the second bottom surface electrode 32*a* includes a convex curve. This will be described in more detail. The shape of a part of the outer edge of the second bottom surface electrode 32*a* that is not in contact with the inner surface 12*a*, the outer surface 12*b*, and the second side surface 12*f* of the first flange portion 12 includes the convex curve. Specifically, the second bottom surface electrode 32*a* protrudes in the width direction Wd from the leg portion 14*b* toward the leg portion 14*a*, the shape of the protruding end portion includes a convex curve in the direction toward the leg portion 14*a* and a convex curve in the direction toward the protruding portion 15*a* within the sloping portion 16.

As illustrated in FIG. 7A, the second terminal electrode 32 includes a second end surface electrode 32*b* that extends in the height direction Td from the bottom surface 12*d* of the first flange portion 12 when viewed in the length direction Ld in front of the outer surface 12*b* of the first flange portion 12. The second end surface electrode 32*b* is formed in a first region RB1 in which the leg portion 14*b* is disposed on the outer surface 12*b* of the first flange portion 12, and a second region RB2 located nearer than the first region RB1 to the second side surface 12*f* of the first flange portion 12. The first region RB1 extends in the height direction Td. The length of the first region RB1 in the height direction Td is longer than the length thereof in the width direction Wd. The shape of the outer edge of the first region RB1 includes a convex curve in the height direction Td toward the upper surface 12*c*. The outer edge of the first region RB1 corresponds to the boundary between a portion of the second end surface electrode 32*b* near the first region RB1 and the core 10. According to the present embodiment, the shape of a part of the outer edge of the first region RB1 includes a convex curve. This will be described in more detail. The shape of a part of the first region RB1 located nearer than the second region RB2 to the upper surface 12*c* includes the convex curve. The second region RB2 is located along the end portion of the outer surface 12*b* of the first flange portion 12 near the bottom surface 12*d* in the height direction Td. The length dimension of the second region RB2 in the height direction Td is constant.

As illustrated in FIG. 1, the third terminal electrode 33 includes a third bottom surface electrode 33*a* (region surrounded by a dashed line in FIG. 1) that contains the end surface of the leg portion 18*a* in the height direction Td and a region of the bottom surface 13*d* around the leg portion 18*a* when viewed in the height direction Td. As illustrated in FIG. 1, the shape of the outer edge of the third bottom surface electrode 33*a* includes a convex curve. The outer edge of the third bottom surface electrode 33*a* corresponds to the boundary between the third bottom surface electrode 33*a* and the core 10. According to the present embodiment, the shape of a part of the outer edge of the third bottom surface electrode 33*a* includes a convex curve. This will be described in more detail. The shape of a part of the outer edge of the third bottom surface electrode 33*a* that is not in contact with the inner surface 13*a*, the outer surface 13*b*, and the first side surface 13*e* of the second flange portion 13 includes the convex curve. Specifically, the third bottom surface electrode 33*a* protrudes in the width direction Wd from the leg portion 18*a* toward the leg portion 18*b*, the shape of the protruding end portion includes a convex curve in the direction toward the leg portion 18*b* and a convex curve in the direction toward the protruding portion 19*b* within the sloping portion 20.

Figure 7B:
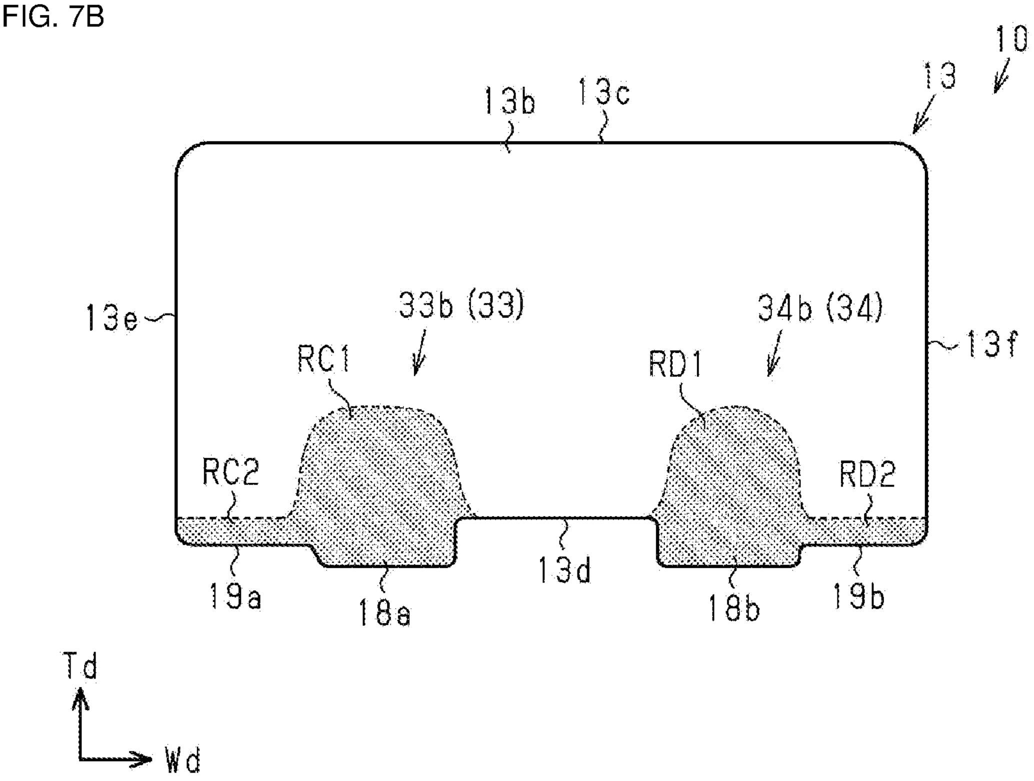
FIG. 7B is a front view of a second flange portion of the core.

As illustrated in FIG. 7B, the third terminal electrode 33 includes a third end surface electrode 33*b* that extends in the height direction Td from the bottom surface 13*d* of the second flange portion 13 when viewed in the length direction Ld in front of the outer surface 13*b* of the second flange portion 13. The third end surface electrode 33*b* is formed in a first region RC1 in which the leg portion 18*a* is disposed on the outer surface 13*b* of the second flange portion 13, and a second region RC2 located nearer than the first region RC1 to the first side surface 13*e* of the second flange portion 13. The first region RC1 extends in the height direction Td. The length of the first region RC1 in the height direction Td is longer than the length thereof in the width direction Wd. The shape of the outer edge of the first region RC1 includes a convex curve in the height direction Td toward the upper surface 13*c*. The outer edge of the first region RC1 corresponds to the boundary between a portion of the third end surface electrode 33*b* near the first region RC1 and the core 10. According to the present embodiment, the shape of a part of the outer edge of the first region RC1 includes a convex curve. This will be described in more detail. The shape of a part of the first region RC1 located nearer than the second region RC2 to the upper surface 13*c* includes the convex curve. The second region RC2 is located along the end portion of the outer surface 13*b* of the second flange portion 13 near the bottom surface 13*d* in the height direction Td. The length dimension of the second region RC2 in the height direction Td is constant.

As illustrated in FIG. 1, the fourth terminal electrode 34 includes a fourth bottom surface electrode 34*a* (region surrounded by a dashed line in FIG. 1) that contains the end surface of the leg portion 18*b* in the height direction Td and a region of the bottom surface 13*d* around the leg portion 18*b* when viewed in the height direction Td. As illustrated in FIG. 1, the shape of the outer edge of the fourth bottom surface electrode 34*a* includes a convex curve. The outer edge of the fourth bottom surface electrode 34*a* corresponds to the boundary between the fourth bottom surface electrode 34*a* and the core 10. According to the present embodiment, the shape of a part of the outer edge of the fourth bottom surface electrode 34*a* includes a convex curve. This will be described in more detail. The shape of a part of the outer edge of the fourth bottom surface electrode 34*a* that is not in contact with the inner surface 13*a*, the outer surface 13*b*, and the second side surface 13*f* of the second flange portion 13 includes the convex curve. Specifically, the fourth bottom surface electrode 34*a* protrudes in the width direction Wd from the leg portion 18*b* toward the leg portion 18*a*, and the shape of the protruding end portion includes a convex curve.

As illustrated in FIG. 7B, the fourth terminal electrode 34 includes a fourth end surface electrode 34*b* that extends in the height direction Td from the bottom surface 13*d* of the second flange portion 13 when viewed in the length direction Ld in front of the outer surface 13*b* of the second flange portion 13. The fourth end surface electrode 34*b* is formed in a first region RD1 in which the leg portion 18*b* is disposed on the outer surface 13*b* of the second flange portion 13, and a second region RD2 located nearer than the first region RD1 to the second side surface 13*f* of the second flange portion 13. The first region RD1 extends in the height direction Td. The length of the first region RD1 in the height direction Td is longer than the length thereof in the width direction Wd. The shape of the outer edge of the first region RD1 includes a convex curve in the height direction Td toward the upper surface 13*c*. The outer edge of the first region RD1 corresponds to the boundary between a portion of the fourth end surface electrode 34*b* near the first region RD1 and the core 10. According to the present embodiment, the shape of a part of the outer edge of the first region RD1 includes a convex curve. This will be described in more detail. The shape of a part of the first region RD1 located nearer than the second region RD2 to the upper surface 13*c* includes the convex curve. The second region RD2 is located along the end portion of the outer surface 13*b* of the second flange portion 13 near the bottom surface 13*d* in the height direction Td. The length dimension of the second region RD2 in the height direction Td is constant.

Figure 8:
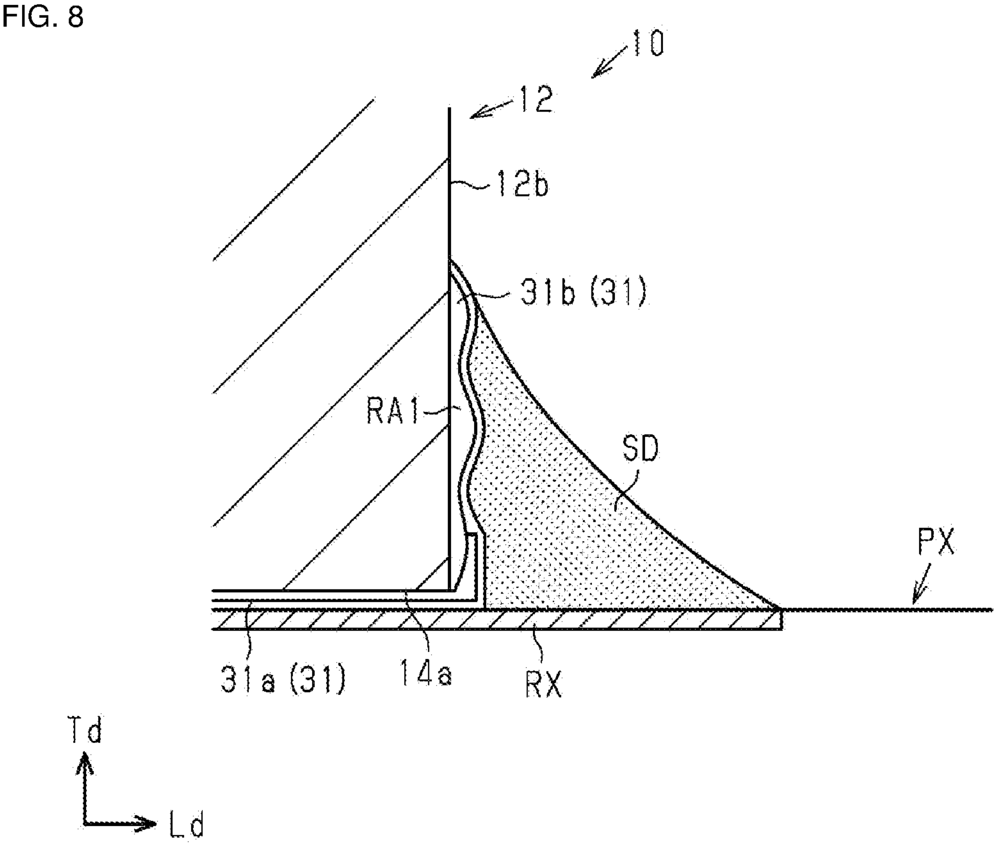
FIG. 8 is a schematic sectional view of a connection structure between a circuit board and an end portion of the first flange portion that faces the circuit board with the coil component mounted on the circuit board.

The following description with reference to FIG. 8 includes the structure of the first terminal electrode 31, and a joint structure between the first terminal electrode 31 and a land RX of a circuit board PX with the coil component 1 mounted on the circuit board PX. The second to fourth terminal electrodes 32 to 34 have the same structure as the structure of the first terminal electrode 31 and have the same structure as the joint structure between the first terminal electrode 31 and the land RX, and a description thereof is omitted.

As illustrated in FIG. 8, the first bottom surface electrode 31*a* of the first terminal electrode 31 is connected to the first end surface electrode 31*b*. When the first bottom surface electrode 31*a* is formed, an end portion of the first end surface electrode 31*b* in the second region RA2 and an end portion of the first end surface electrode 31*b* in the first region RA1 are formed near the bottom surface 12*d* (see FIG. 7A) of the first flange portion 12. For this reason, the end portion of the first end surface electrode 31*b* in the first region RA1 near the bottom surface 12*d* of the first flange portion 12 has a region in which the underlying electrode of the first end surface electrode 31*b* and the underlying electrode of the first bottom surface electrode 31*a* overlap. The thickness of the end portion of the first end surface electrode 31*b* in the first region RA1 near the bottom surface 12*d* of the first flange portion 12 is more than the thickness of a portion thereof in the first region RA1 near the upper surface 12*c* of the first flange portion 12. The underlying electrode of the first end surface electrode 31*b* and the underlying electrode of the first bottom surface electrode 31*a* overlap along the outer surface 12*b* of the first flange portion 12 opposite the winding core portion 11 (see, for example, FIG. 6). The underlying electrode of the first bottom surface electrode 31*a* overlaps a first outer side portion of the underlying electrode of the first end surface electrode 31*b* in the length direction Ld in the first region RA1.

As illustrated in FIG. 8, the first terminal electrode 31 has a plating layer that is formed on a surface of the underlying electrode of the first bottom surface electrode 31*a* and a surface of the underlying electrode of the first end surface electrode 31*b*. The plating layer is formed on the surface of the underlying electrode of the first bottom surface electrode 31*a* in the region in which the underlying electrode of the first bottom surface electrode 31*a* and the underlying electrode of the first end surface electrode 31*b* overlap.

A surface (surface of the plating layer) of the first end surface electrode 31*b* has irregularities. More specifically, the irregularities are on the portion of the first end surface electrode 31*b* in the first region RA1 located nearer than the end portion thereof (region in which the underlying electrode of the first end surface electrode 31*b* and the underlying electrode of the first bottom surface electrode 31*a* overlap) near the bottom surface 12*d* of the first flange portion 12 to the upper surface 12*c* of the first flange portion 12 in the height direction Td.

In the case where the coil component 1 is mounted on the circuit board PX, as illustrated in FIG. 8, the leg portion 14*a* of the core 10 is connected to the land RX of the circuit board PX with solder SD. The solder SD is interposed between the first bottom surface electrode 31*a* that covers the leg portion 14*a* and the land RX. The solder SD connects the land RX and the first end surface electrode 31*b* to each other. The solder SD is connected to the first end surface electrode 31*b* so as to be in a recessed portion on a surface of the first end surface electrode 31*b*. The solder SD and the plating layer of the first end surface electrode 31*b* are integrally formed with the coil component 1 mounted on the land RX of the circuit board PX.

Figure 9:
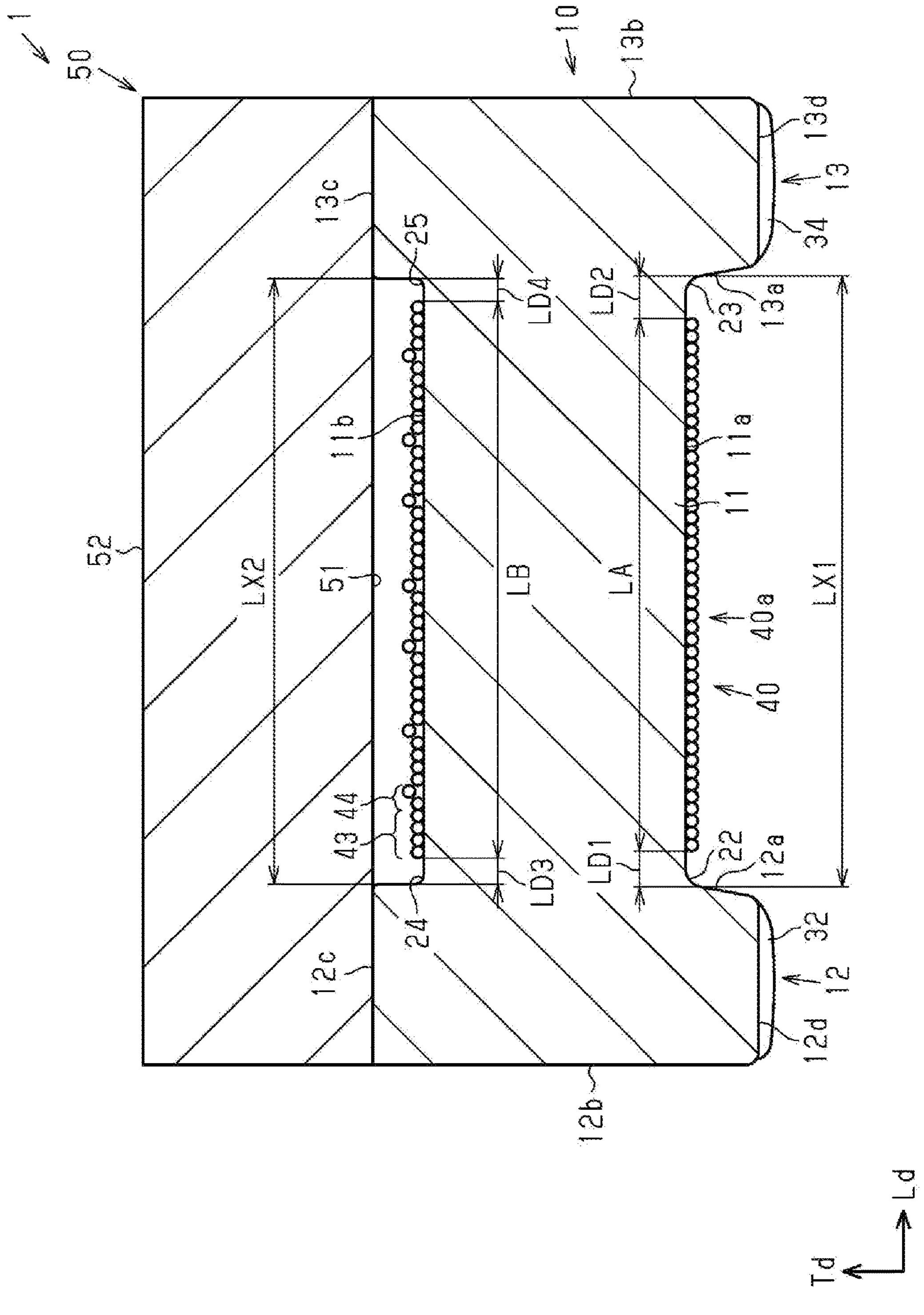
FIG. 9 is a sectional view of the coil component taken along a plane extending in a direction in which the winding core portion extends.

As illustrated in FIG. 9, the connection structure between the inner surface 12*a* of the first flange portion 12 and the bottom surface 11*a* of the winding core portion 11 differs from the connection structure between the inner surface 12*a* of the first flange portion 12 and the upper surface 11*b* of the winding core portion 11. The connection structure of the inner surface 13*a* of the second flange portion 13 and the bottom surface 11*a* of the winding core portion 11 differs from the connection structure between the inner surface 13*a* of the second flange portion 13 and the upper surface 11*b* of the winding core portion 11.

Figure 10A:
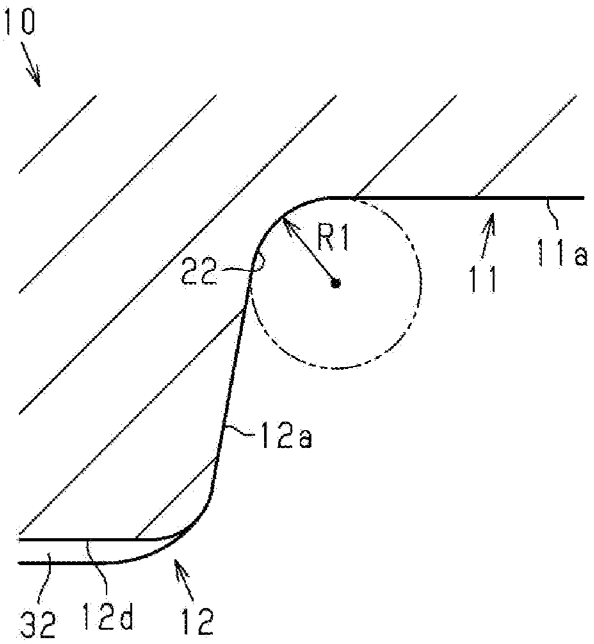
FIG. 10A is an enlarged view of a connection between the bottom surface of the winding core portion and the first flange portion in FIG. 9.
Figure 11A:
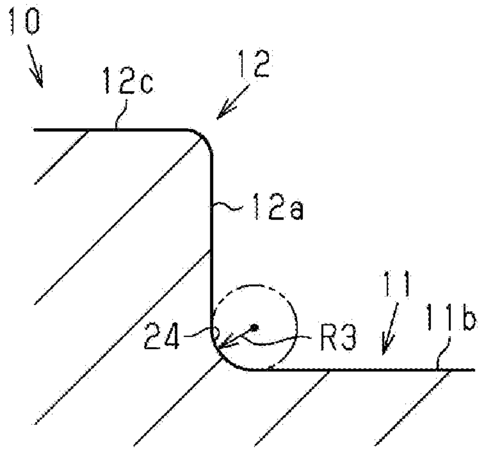
FIG. 11A is an enlarged view of a connection between the upper surface of the winding core portion and the first flange portion in FIG. 9.

This will be described in more detail. As illustrated in FIG. 10A, a first curved portion 22 is formed at a connection between the inner surface 12*a* of the first flange portion 12 and the bottom surface 11*a* of the winding core portion 11. According to the present embodiment, the shape of the first curved portion 22 includes a curve that partly defines a substantially true-circular shape in a section parallel to the length direction Ld and to the height direction Td (perpendicular to the width direction Wd). Specifically, the shape of the first curved portion 22 includes a curve that defines about ¼ of a substantially true circle in a section perpendicular to the width direction Wd. As illustrated in FIG. 11A, a third curved portion 24 is formed at a connection between the inner surface 12*a* of the first flange portion 12 and the upper surface 11*b* of the winding core portion 11. According to the present embodiment, the shape of the third curved portion 24 includes a curve that partly defines a substantially true-circular shape in a section perpendicular to the width direction Wd. Specifically, the shape of the third curved portion 24 includes a curve that defines about ¼ of a substantially true circle in a section perpendicular to the width direction Wd. The radius R1 of the substantially true circle (imaginary circle of a two-dot chain line) that is partly defined by the curve of the first curved portion 22 in a section perpendicular to the width direction Wd as illustrated in FIG. 10A is larger than the radius R3 of the substantially true circle (imaginary circle of a two-dot chain line) that is partly defined by the curve of the third curved portion 24 in a section perpendicular to the width direction Wd as illustrated in FIG. 11A. That is, the first curved portion 22 and the third curved portion 24 are formed such that the radius of curvature of the curve of the first curved portion 22 is larger than the radius of curvature of the curve of the third curved portion 24.

A ratio of the length of the first curved portion 22 in the height direction Td to the maximum distance in the height direction Td from the bottom surface 11*a* of the winding core portion 11 to the first bottom surface electrode 31*a* of the first terminal electrode 31 on the first flange portion 12 and from the bottom surface 11*a* to the second bottom surface electrode 32*a* of the second terminal electrode 32 is preferably no less than 20% and no more than 60% (i.e., from 20% to 60%). According to the present embodiment, the maximum distance in the height direction Td from the bottom surface 11*a* of the winding core portion 11 to the first bottom surface electrode 31*a* of the first terminal electrode 31 on the first flange portion 12 and from the bottom surface 11*a* to the second bottom surface electrode 32*a* of the second terminal electrode 32 is about 0.56 mm. The length of the first curved portion 22 in the height direction Td is no less than 0.1 mm and no more than 0.3 mm (i.e., from 0.1 mm to 0.3 mm). In other words, the radius R1 of the curve of the first curved portion 22 in a section perpendicular to the width direction Wd is no less than 0.1 mm and no more than 0.3 mm (i.e., from 0.1 mm to 0.3 mm). In this case, the above ratio is no less than 20% and no more than 60% (i.e., from 20% to 60%).

The length of the third curved portion 24 in the height direction Td is about 0.05 mm. In other words, the radius R3 of the third curved portion 24 is about 0.05 mm. That is, according to the present embodiment, a ratio of the length of the third curved portion 24 in the height direction Td to the maximum distance in the height direction Td from the upper surface 11*b* of the winding core portion 11 to the upper surface 12*c* of the first flange portion 12 is less than 20%. According to the present embodiment, the maximum distance in the height direction Td from the bottom surface 11*a* of the winding core portion 11 to the first bottom surface electrode 31*a* of the first terminal electrode 31 on the first flange portion 12 and from the bottom surface 11*a* to the second bottom surface electrode 32*a* of the second terminal electrode 32 is defined by the distances in the height direction Td between the bottom surface 11*a* of the winding core portion 11 and the first bottom surface electrode 31*a* that is formed on the leg portion 14*a* of the first flange portion 12 and between the bottom surface 11*a* and the second bottom surface electrode 32*a* that is formed on the leg portion 14*b* of the first flange portion 12.

Figure 10B:
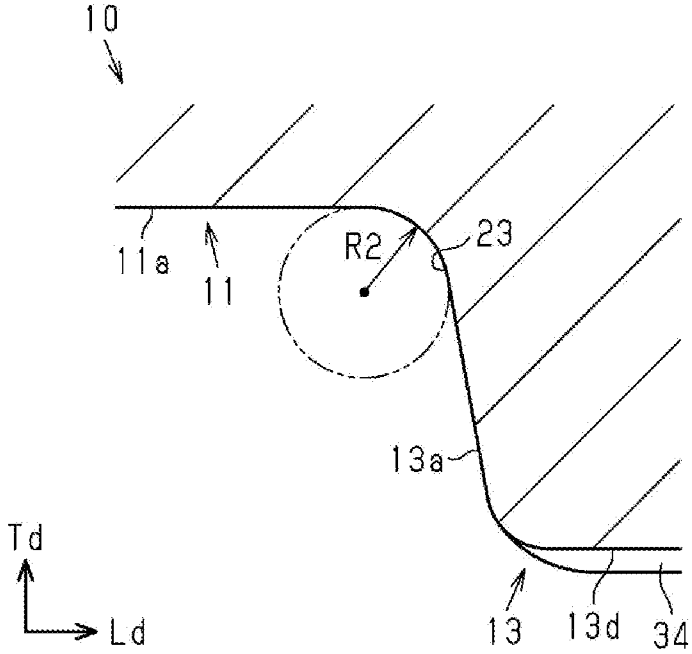
FIG. 10B is an enlarged view of a connection between the bottom surface of the winding core portion and the second flange portion in FIG. 9.
Figure 11B:
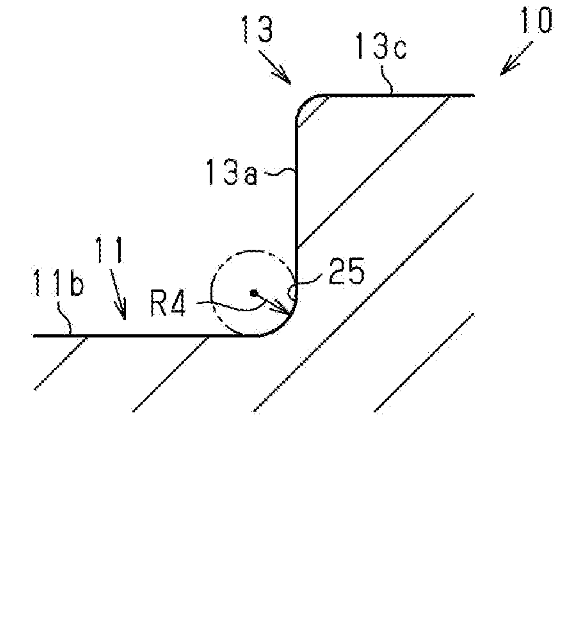
FIG. 11B is an enlarged view of a connection between the upper surface of the winding core portion and the second flange portion in FIG. 9.

As illustrated in FIG. 10B, a second curved portion 23 is formed at a connection between the inner surface 13*a* of the second flange portion 13 and the bottom surface 11*a* of the winding core portion 11. According to the present embodiment, the shape of the second curved portion 23 includes a curve that partly defines a substantially true-circular shape in a section parallel to the length direction Ld and to the height direction Td (perpendicular to the width direction Wd). Specifically, the shape of the second curved portion 23 includes a curve that defines about ¼ of a substantially true circle in a section perpendicular to the width direction Wd. As illustrated in FIG. 11B, a fourth curved portion 25 is formed at a connection between the inner surface 13*a* of the second flange portion 13 and the upper surface 11*b* of the winding core portion 11. According to the present embodiment, the shape of the fourth curved portion 25 includes a curve that partly defines a substantially true-circular shape in a section perpendicular to the width direction Wd. Specifically, the shape of the fourth curved portion 25 includes a curve that defines about ¼ of a substantially true circle in a section perpendicular to the width direction Wd. The radius R2 of the substantially true circle (imaginary circle of a two-dot chain line) that is partly defined by the curve of the second curved portion 23 in a section perpendicular to the width direction Wd as illustrated in FIG. 10B is larger than the radius R4 of the substantially true circle (imaginary circle of a two-dot chain line) that is partly defined by the curve of the fourth curved portion 25 in a section perpendicular to the width direction Wd as illustrated in FIG. 11B. That is, the second curved portion 23 and the fourth curved portion 25 are formed such that the radius of curvature of the curve of the second curved portion 23 is larger than the radius of curvature of the curve of the fourth curved portion 25.

According to the present embodiment, the radius of curvature (the radius R1 of the imaginary circle in FIG. 10A) of the curve of the first curved portion 22 in a section perpendicular to the width direction Wd is equal to the radius of curvature (the radius R2 of the imaginary circle in FIG. 10B) of the curve of the second curved portion 23. That is, a ratio of the length of the second curved portion 23 in the height direction Td to the maximum distance in the height direction Td from the bottom surface 11*a* of the winding core portion 11 to the third bottom surface electrode 33*a* of the third terminal electrode 33 on the second flange portion 13 and from the bottom surface 11*a* to the fourth bottom surface electrode 34*a* of the fourth terminal electrode 34 is preferably no less than 20% and no more than 60% (i.e., from 20% to 60%). The radius of curvature (the radius R3 of the imaginary circle in FIG. 11A) of the curve of the third curved portion 24 is equal to the radius of curvature (the radius R4 of the imaginary circle in FIG. 11B) of the curve of the fourth curved portion 25. That is, according to the present embodiment, a ratio of the length of the fourth curved portion 25 in the height direction Td to the maximum distance in the height direction Td from the upper surface 11*b* of the winding core portion 11 to the upper surface 13*c* of the second flange portion 13 is less than 20%. According to the present embodiment, the maximum distance in the height direction Td from the bottom surface 11*a* of the winding core portion 11 to the third bottom surface electrode 33*a* of the third terminal electrode 33 on the second flange portion 13 and from the bottom surface 11*a* to the fourth bottom surface electrode 34*a* of the fourth terminal electrode 34 is defined by the distances in the height direction Td between the bottom surface 11*a* of the winding core portion 11 and the third bottom surface electrode 33*a* that is formed on the leg portion 18*a* of the second flange portion 13 and between the bottom surface 11*a* and the fourth bottom surface electrode 34*a* that is formed on the leg portion 18*b* of the second flange portion 13.

As illustrated in FIG. 9, a distance LX1 in the length direction Ld between the first curved portion 22 and the second curved portion 23 is longer than a distance LX2 in the length direction Ld between the third curved portion 24 and the fourth curved portion 25 in a section perpendicular to the width direction Wd. The distance LX1 is equal to the distance in the length direction Ld from the boundary between the curve of the first curved portion 22 nearest to the bottom surface 12*d* and a straight line of the inner surface 12*a* to the boundary between the curve of the second curved portion 23 nearest to the bottom surface 13*d* and a straight line of the inner surface 13*a* in a section perpendicular to the width direction Wd. The distance LX2 is equal to the distance in the length direction Ld from the boundary between the curve of the third curved portion 24 nearest to the upper surface 12*c* and a straight line of the inner surface 12*a* to the boundary between the curve of the fourth curved portion 25 nearest to the upper surface 13*c* and a straight line of the inner surface 13*a* in a section perpendicular to the width direction Wd. For this reason, the distance in the length direction Ld between the inner surface 12*a* of the first flange portion 12 and the inner surface 13*a* of the second flange portion 13 near the bottom surface 11*a* of the winding core portion 11 is longer than the distance in the length direction Ld between the inner surface 12*a* of the first flange portion 12 of the winding core portion 11 and the inner surface 13*a* of the second flange portion 13 near the upper surface 11*b*. This increases the distance in the length direction Ld between the first terminal electrode 31 and the third terminal electrode 33 and the distance between the second terminal electrode 32 and the fourth terminal electrode 34.

As illustrated in FIG. 9, the inner surface 12*a* of the end portion (end portion of the first flange portion 12 that protrudes toward the bottom surface 11*a* of the winding core portion 11) of the first flange portion 12 in the height direction Td slopes such that the distance in the length direction Ld from the winding core portion 11 gradually increases in the height direction Td away from the bottom surface 11*a*. The inner surface 13*a* of the end portion (end portion of the second flange portion 13 that protrudes toward the bottom surface 11*a* of the winding core portion 11) of the second flange portion 13 in the height direction Td slopes such that the distance in the length direction Ld from the winding core portion 11 gradually increases in the height direction Td away from the bottom surface 11*a*.

As illustrated in FIG. 9, the coil component 1 includes a plate member 50. The plate member 50 has a substantially rectangular cuboid shape. The plate member 50 has a first surface 51 that faces the core 10 in the height direction Td and a second surface 52 opposite the first surface 51. The plate member 50 connects the upper surface 12*c* of the first flange portion 12 and the upper surface 13*c* of the second flange portion 13 to each other. According to the present embodiment, the plate member 50 is mounted on the first flange portion 12 so as to cover the entire upper surface 12*c* of the first flange portion 12 and is mounted on the second flange portion 13 so as to cover the entire upper surface 13*c* of the second flange portion 13. The plate member 50 is composed of a nonconductive material, specifically, a nonmagnetic material such as alumina or a magnetic material such as nickel (Ni)-zinc (Zn) ferrite. The plate member 50 is formed, for example, in a manner in which a molded body composed of a compressed nonconductive material is fired. The plate member 50 is not limited to the molded body that is composed of a compressed nonconductive material and that is fired. The plate member 50 may be formed by thermally curing a resin containing magnetic powder such as metal powder or ferrite powder, a resin containing nonmagnetic powder such as silica powder, or a resin containing no filler.

The second surface 52 of the plate member 50 that has the substantially rectangular cuboid shape serves as a suction surface when the coil component 1 is moved. For this reason, for example, when the coil component 1 is mounted on the circuit board, the coil component 1 is readily placed on the circuit board by a suction conveyance device. The plate member 50 may be composed of a magnetic material as in the core 10. When the plate member 50 that is composed of a magnetic material, the core 10 and the plate member 50 can form a closed magnetic circuit in corporation with each other, and the efficiency of obtaining an inductance value is improved.

As illustrated in FIG. 1 and FIG. 3, the length dimension L50 of the plate member 50 is about 3.2 mm, the width dimension W50 thereof is about 2.5 mm, the height dimension T50 thereof is about 0.7 mm. The height dimension T50 of the plate member 50 is preferably 0.7 mm to 1.3 mm. When the height dimension T50 is 0.7 mm or more, the inductance value can be ensured. When the height dimension T50 is 1.3 mm or less, the height can be decreased. The length dimension L50 and the width dimension W50 of the plate member 50 are preferably larger than the length dimension L10 and the width dimension W10 of the core 10 by about 0.1 mm. In this case, the area of contact (magnetic circuit) between the plate member 50 and the first flange portion 12 and between the plate member 50 and the second flange portion 13 is ensured, and the inductance value is inhibited from decreasing, although the plate member 50 and the core 10 are likely to be offset in the length direction Ld and in the width direction Wd when being stuck to each other.

Figure 12A:
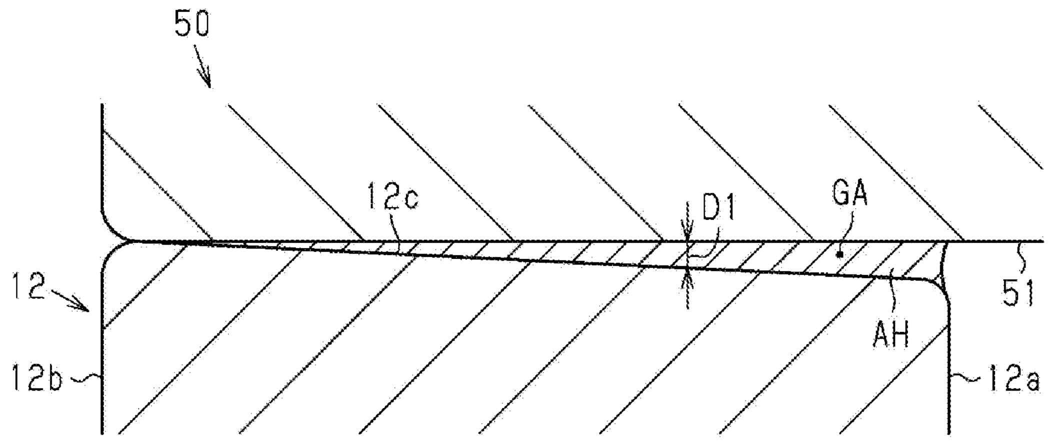
FIG. 12A is an enlarged view of a connection structure between a plate member and the first flange portion in FIG. 9.
Figure 12B:
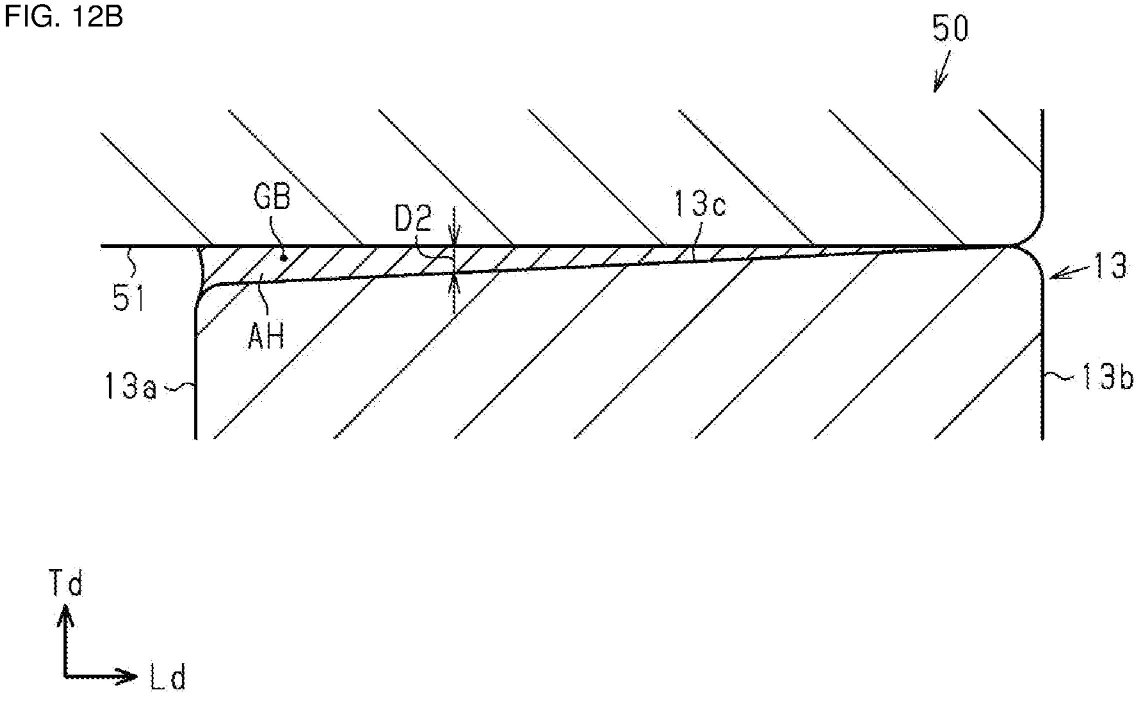
FIG. 12B is an enlarged view of a connection structure between the plate member and the second flange portion in FIG. 9.

The plate member 50 is mounted on the core 10 with adhesive AH (see FIG. 12A and FIG. 12B). An example of the adhesive AH is epoxy resin adhesive. The adhesive AH preferably contains inorganic filler. This decreases the coefficient of linear expansion of the adhesive AH and improves thermal shock resistance. According to the present embodiment, silica filler is contained as the inorganic filler.

The plate member 50 is preferably subjected to chemical cleaning. This improves wettability of the adhesive AH and adhesion between the plate member 50 and the core 10. The flatness of the first surface 51 of the plate member 50 is preferably 5 μm or less. This decreases gaps between the plate member 50 and the first flange portion 12 in contact therewith and between the plate member 50 and the second flange portion 13 in contact therewith, and the inductance value is inhibited from decreasing.

Figure 4:
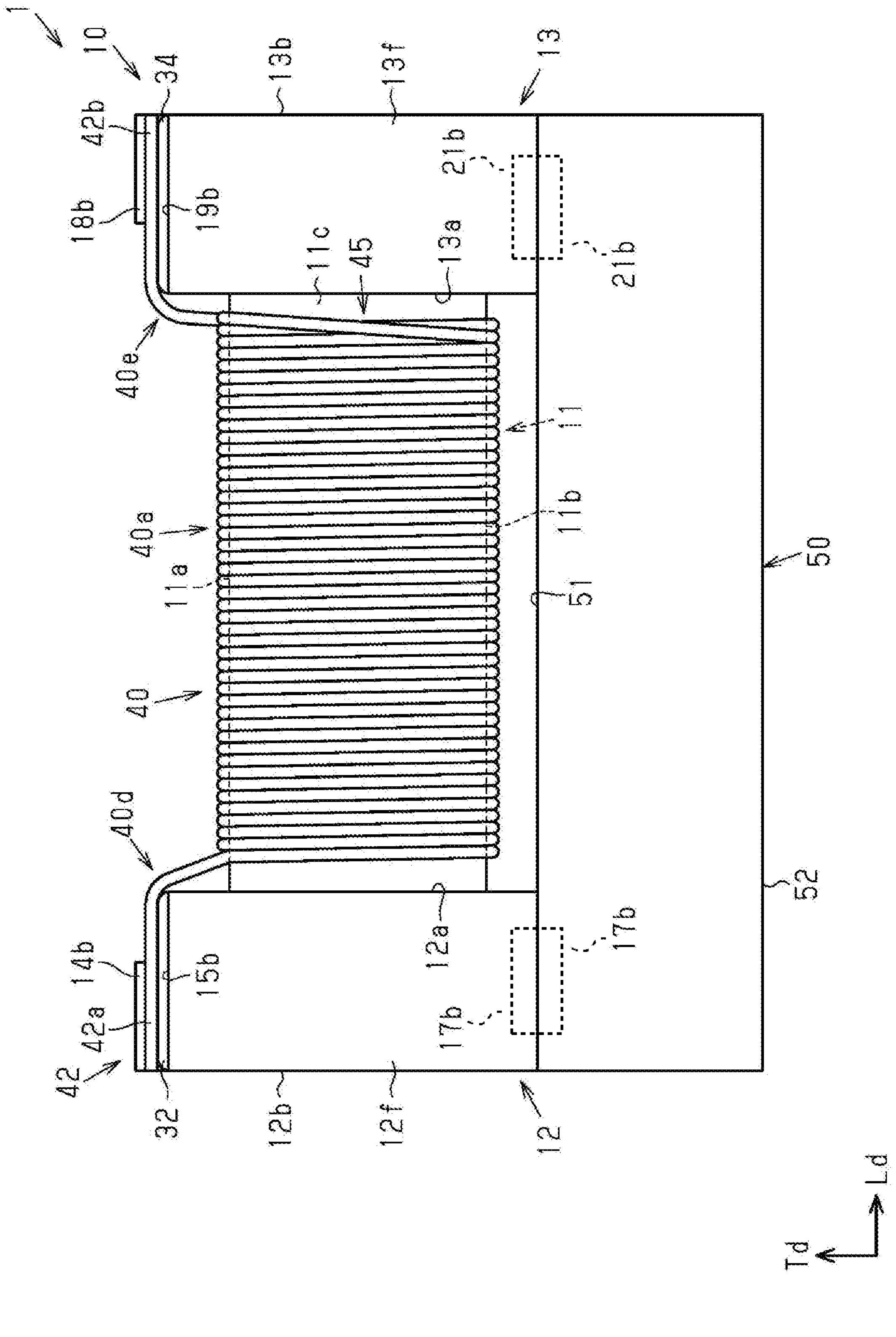
FIG. 4 is a schematic side view of the coil component according to the embodiment viewed in the direction opposite the direction of the schematic side view in FIG. 3.

As illustrated in FIG. 3, FIG. 4, and FIG. 9, the distances in the height direction Td between the upper surface 11*b* of the winding core portion 11 and the upper surface 12*c* of the first flange portion 12 and between the upper surface 11*b* and the upper surface 13*c* of the second flange portion 13 are shorter than the distances in the height direction Td between the bottom surface 11*a* of the winding core portion 11 and the leg portion 14*a* (14*b*) of the first flange portion 12 and between the bottom surface 11*a* and the leg portion 18*a* (18*b*) of the second flange portion 13. For this reason, the distance between the upper surface 11*b* of the winding core portion 11 and the first surface 51 of the plate member 50 can be decreased. Accordingly, even when the length dimension of the plate member 50 in the height direction Td increases, the length of the coil component 1 in the height direction Td can be inhibited from increasing. The relationship among the distances is also described as follows. The distances in the height direction Td between the bottom surface 11*a* of the winding core portion 11 and the leg portion 14*a* (14*b*) of the first flange portion 12 and between the bottom surface 11*a* and the leg portion 18*a* (18*b*) of the second flange portion 13 are longer than the distances in the height direction Td between the upper surface 11*b* of the winding core portion 11 and the upper surface 12*c* of the first flange portion 12 and between the upper surface 11*b* and the upper surface 13*c* of the second flange portion 13. For this reason, in the case where the coil component 1 is mounted on the circuit board PX (see FIG. 8), the distance in the height direction Td between a winding portion 40*a* and the circuit board PX increases.

A distance D1 in the height direction Td between the plate member 50 and the first flange portion 12 varies in the length direction Ld. According to the present embodiment, the distance D1 at a position on the first flange portion 12 nearer than the center of the first flange portion 12 in the length direction Ld to the winding core portion 11 is longer than the distance at a position on the opposite side of the center in the length direction Ld from the winding core portion 11. In other words, the distance D1 at a position on the first flange portion 12 on the opposite side of the center in the length direction Ld from the winding core portion 11 is shorter than the distance at a position nearer than the center in the length direction Ld to the winding core portion 11.

Specifically, as illustrated in FIG. 12A, the first flange portion 12 and the plate member 50 are formed such that the distance D1 gradually increases in the direction from the outer surface 12*b* of the first flange portion 12 toward the inner surface 12*a*. In other words, the distance D1 gradually decreases in the direction toward a position on the opposite side of the first flange portion 12 from the winding core portion 11 (see, for example, FIG. 6). According to the present embodiment, the upper surface 12*c* of the first flange portion 12 slopes such that a distance from the plate member 50 gradually increases in the direction from the outer surface 12*b* of the first flange portion 12 toward the inner surface 12*a*. The first surface 51 of the plate member 50 that faces the core 10 is perpendicular to the height direction Td. The distance D1 is defined by the distance in the height direction Td between the upper surface 12*c* of the first flange portion 12 and the plate member 50 that faces the upper surface 12*c* in the height direction Td in a section along a plane perpendicular to the width direction Wd at the center of the winding core portion 11 in the width direction Wd. According to the present embodiment, the distance D1 at a position near the outer surface 12*b* of the first flange portion 12 is no less than 0 μm and no more than 3 μm (i.e., from 0 μm to 3 μm), and the distance D1 at a position near the inner surface 12*a* of the first flange portion 12 is no less than 3 μm and no more than 15 μm (i.e., from 3 μm to 15 μm).

The first surface 51 of the plate member 50 is in contact with a part of the end portion of the upper surface 12*c* of the first flange portion 12 near the outer surface 12*b* of the first flange portion 12 in the length direction Ld but is not in contact with a part of the end portion located nearer than the part of the end portion to the inner surface 12*a* of the first flange portion 12 in the length direction Ld. That is, a gap GA is formed between the first surface 51 of the plate member 50 and the upper surface 12*c* of the first flange portion 12. The length of the gap GA in the height direction Td gradually increases in the direction from the outer surface 12*b* of the first flange portion 12 toward the inner surface 12*a*. In other words, the length of the gap GA in the height direction Td gradually decreases in the direction from the inner surface 12*a* of the first flange portion 12 toward the outer surface 12*b*. The adhesive AH for sticking the plate member 50 and the core 10 to each other is in the gap GA. The adhesive AH is also in the two recessed portions 17*a* and 17*b* (see FIG. 6) of the first flange portion 12.

The distance D2 in the height direction Td between the plate member 50 and the second flange portion 13 varies in the length direction Ld. According to the present embodiment, the distance D2 at a position on the second flange portion 13 nearer than the center of the second flange portion 13 in the length direction Ld to the winding core portion 11 is longer than the distance at a position on the opposite side of the center in the length direction Ld from the winding core portion 11. In other words, the distance D2 at a position on the second flange portion 13 on the opposite side of the center in the length direction Ld from the winding core portion 11 is shorter than the distance at a position nearer than the center in the length direction Ld to the winding core portion 11.

Specifically, as illustrated in FIG. 12B, the second flange portion 13 and the plate member 50 are formed such that the distance D2 gradually increases in the direction from the outer surface 13*b* of the second flange portion 13 toward the inner surface 13*a*. In other words, the distance D2 gradually decreases in the direction toward a position on the opposite side of the second flange portion 13 from the winding core portion 11 (see, for example, FIG. 6). According to the present embodiment, the upper surface 13*c* of the second flange portion 13 slopes such that the distance from the first surface 51 of the plate member 50 gradually increases in the direction from the outer surface 13*b* of the second flange portion 13 toward the inner surface 13*a*. The distance D2 is defined by the distance in the height direction Td between the upper surface 13*c* of the second flange portion 13 and the plate member 50 that faces the upper surface 13*c* in the height direction Td in a section along a plane perpendicular to the width direction Wd at the center of the winding core portion 11 in the width direction Wd. According to the present embodiment, the distance D2 at a position near the outer surface 13*b* of the second flange portion 13 is no less than 0 μm and no more than 3 μm (i.e., from 0 μm to 3 μm), and the distance D2 at a position near the inner surface 13*a* of the second flange portion 13 is no less than 3 μm and no more than 15 μm (i.e., from 3 μm to 15 μm) as in the distance D1.

The first surface 51 of the plate member 50 is in contact with a part of the end portion of the upper surface 13*c* of the second flange portion 13 near the outer surface 13*b* of the second flange portion 13 in the length direction Ld but is not in contact with a part of the end portion located nearer than the part of the end portion to the inner surface 13*a* of the second flange portion 13 in the length direction Ld. That is, a gap GB is formed between the plate member 50 and the upper surface 13*c* of the second flange portion 13. The length of the gap GB in the height direction Td gradually increases in the direction from the outer surface 13*b* of the second flange portion 13 toward the inner surface 13*a*. In other words, the length of the gap GB in the height direction Td gradually decreases in the direction from the inner surface 13*a* of the second flange portion 13 toward the outer surface 13*b*. The adhesive AH for sticking the plate member 50 and the core 10 to each other is in the gap GB. The adhesive AH is also in the two recessed portions 21*a* and 21*b* (see FIG. 6) of the second flange portion 13.

As illustrated in FIG. 1 to FIG. 4, the coil 40 includes a first wire 41 and a second wire 42 that are wound around the winding core portion 11. The first wire 41 includes a first end portion 41*a* and a second end portion 41*b*. According to the present embodiment, the first end portion 41*a* of the first wire 41 corresponds to an end portion at which the first wire 41 starts to be wound, and the second end portion 41*b* of the first wire 41 corresponds to an end portion at which the first wire 41 ends to be wound. The second wire 42 includes a first end portion 42*a* and a second end portion 42*b*. According to the present embodiment, the first end portion 42*a* of the second wire 42 corresponds to an end portion at which the second wire 42 starts to be wound, and the second end portion 42*b* of the second wire 42 corresponds to an end portion at which the second wire 42 ends to be wound.

The first end portion 41*a* of the first wire 41 is connected to the first terminal electrode 31. The second end portion 41*b* of the first wire 41 is connected to the third terminal electrode 33. The first end portion 42*a* of the second wire 42 is connected to the second terminal electrode 32. The second end portion 42*b* of the second wire 42 is connected to the fourth terminal electrode 34. More specifically, the first end portion 41*a* of the first wire 41 is connected to a portion of the first bottom surface electrode 31*a* of the first terminal electrode 31 that corresponds to the protruding portion 15*a*, and the first end portion 42*a* of the second wire 42 is connected to a portion of the second bottom surface electrode 32*a* of the second terminal electrode 32 that corresponds to the protruding portion 15*b*. For this reason, the protruding portions 15*a* and 15*b* form a first connection that is connected to the first end portion 41*a* of the first wire 41 and the first end portion 42*a* of the second wire 42. The leg portions 14*a* and 14*b* that are mounted on the circuit board PX form a second connection that is mounted on a wiring pattern (land RX) of the circuit board PX with the coil component 1 mounted on the circuit board PX. The second end portion 41*b* of the first wire 41 is connected to a portion of the third bottom surface electrode 33*a* of the third terminal electrode 33 that corresponds to the protruding portion 19*a*. The second end portion 42*b* of the second wire 42 is connected to a portion of the fourth bottom surface electrode 34*a* of the fourth terminal electrode 34 that corresponds to the protruding portion 19*b*. For this reason, the protruding portions 19*a* and 19*b* form a third connection that is connected to the second end portion 41*b* of the first wire 41 and the second end portion 42*b* of the second wire 42. The leg portions 18*a* and 18*b* that are mounted on the circuit board PX form a fourth connection that is mounted on the wiring pattern (land RX) of the circuit board PX with the coil component 1 mounted on the circuit board PX.

The relationship in the height direction Td among the protruding portions 15*a* and 15*b* and the leg portions 14*a* and 14*b* is preferably set such that the first end portion 41*a* of the first wire 41 that is connected to the protruding portion 15*a* of the first flange portion 12 and the first end portion 42*a* of the second wire 42 that is connected to the protruding portion 15*b* do not protrude from the leg portions 14*a* and 14*b* of the first flange portion 12 in the height direction Td. The relationship in the height direction Td among the protruding portions 19*a* and 19*b* and the leg portions 18*a* and 18*b* is preferably set such that the first end portion 42*a* of the first wire 41 that is connected to the protruding portion 19*a* of the second flange portion 13 and the second end portion 42*b* of the second wire 42 that is connected to the protruding portion 19*b* do not protrude from the leg portions 18*a* and 18*b* of the second flange portion 13 in the height direction Td.

The first wire 41 and the second wire 42 are connected to the terminal electrodes 31 to 34 by, for example, thermo-compression bonding, brazing, or welding. When the coil component 1 is mounted on the circuit board, the first terminal electrode 31, the second terminal electrode 32, the third terminal electrode 33, and the fourth terminal electrode 34 face the circuit board. At this time, the winding core portion 11 is parallel to the main surfaces of the circuit board PX. That is, the coil 40 according to the present embodiment is a common-mode choke coil that has a horizontal winding structure (horizontal type) in which the winding axes of the first wire 41 and the second wire 42 are parallel to the main surfaces of the circuit board PX.

The first wire 41 and the second wire 42 each include a highly conductive wire composed of copper (Cu), silver (Ag), or gold (Au) and an insulating coating that covers the conductive wire and that is composed of, for example, polyurethane, polyamide imide, or fluorine resin. For example, the diameter of the conductive wire is preferably about 15 to 100 μm. For example, the thickness of the insulating coating is preferably about 8 to 20 μm. According to the present embodiment, the diameter of the conductive wire is about 30 μm. The thickness of the insulating coating is about 10 μm.

The first wire 41 and the second wire 42 are wound around the winding core portion 11 in the same direction. Consequently, when an antiphase signal such as a differential signal is inputted into the first wire 41 and the second wire 42 from the same flange portion of the first flange portion 12 and the second flange portion 13, magnetic flux from the first wire 41 and magnetic flux from the second wire 42 cancel out each other, the function of the coil component 1 as an inductor is reduced, and the antiphase signal is allowed to pass. When an in-phase signal such as an extraneous noise is inputted into the first wire 41 and the second wire 42 from the same flange portion of the first flange portion 12 and the second flange portion 13, magnetic flux from the first wire 41 and magnetic flux from the second wire 42 enhance each other, the function of the coil component 1 as an inductor is improved, and the in-phase signal is blocked. Accordingly, the coil component 1 functions as a common-mode choke coil that reduces the transmission loss of a signal in a differential mode such as a differential signal and that attenuates a signal in a common mode such as an extraneous noise.

The coil 40 includes the winding portion 40*a* that is wound around the winding core portion 11, a first extension portion 40*b*, a second extension portion 40*c*, a third extension portion 40*d*, and a fourth extension portion 40*e* on both sides of the winding portion 40*a*. Each of the extension portions 40*b*, 40*c*, 40*d*, and 40*e* includes the vicinity of the end portions of the first wire 41 and the second wire 42 that are connected to the terminal electrodes 31 to 34. The first extension portion 40*b* connects the first end portion 41*a* of the first wire 41 that is connected to the first terminal electrode 31 and the winding portion 40*a* to each other. The second extension portion 40*c* connects the second end portion 41*b* of the first wire 41 that is connected to the third terminal electrode 33 and the winding portion 40*a* to each other. The third extension portion 40*d* connects the first end portion 42*a* of the second wire 42 that is connected to the second terminal electrode 32 and the winding portion 40*a* to each other. The fourth extension portion 40*e* connects the second end portion 42*b* of the second wire 42 that is connected to the fourth terminal electrode 34 and the winding portion 40*a* to each other.

As illustrated in FIG. 9, the length LA of a part of the winding portion 40*a* in the length direction Ld near the bottom surface 11*a* of the winding core portion 11 is shorter than the length LB of a part of the winding portion 40*a* in the length direction Ld near the upper surface 11*b* of the winding core portion 11. The distance LX1 in the length direction Ld between the first curved portion 22 and the second curved portion 23 is longer than the distance LX2 in the length direction Ld between the third curved portion 24 and the fourth curved portion 25 as described above. For this reason, the distance LD1 in the length direction Ld between the part of the winding portion 40*a* near the bottom surface 11*a* of the winding core portion 11 and the inner surface 12*a* of the first flange portion 12 is longer than the distance LD3 in the length direction Ld between the part of the winding portion 40*a* near the upper surface 11*b* of the winding core portion 11 and the inner surface 12*a* of the first flange portion 12. The distance LD2 in the length direction Ld between the part of the winding portion 40*a* near the bottom surface 11*a* of the winding core portion 11 and the inner surface 13*a* of the second flange portion 13 is longer than the distance LD4 in the length direction Ld between the part of the winding portion 40*a* near the upper surface 11*b* of the winding core portion 11 and the inner surface 13*a* of the second flange portion 13. According to the present embodiment, the distance LD2 is longer than the distance LD1. The distances LD1 and LD2 are longer than the distances LD3 and LD4. That is, the distance LD1 is longer than the distance LD3, or the distance LD4, or both, and the distance LD2 is longer than the distance LD3, or the distance LD4, or both.

According to the present embodiment, the distance LD2 is longer than the distance LD1. That is, a space in which the first extension portion 40*b* and the third extension portion 40*d* extend in the length direction Ld is smaller than a space in which the second extension portion 40*c* and the fourth extension portion 40*e* extend. With this structure, when the first wire 41 and the second wire 42 that are wound around the winding core portion 11 are connected to the third terminal electrode 33 and the fourth terminal electrode 34, the first wire 41 and the second wire 42 can be inhibited from interfering with the inner surface 13*a* of the second flange portion 13. Accordingly, the first wire 41 and the second wire 42 can be smoothly connected to the third terminal electrode 33 and the fourth terminal electrode 34.

The relationship between the distance LD1 and the distance LD2 can be freely changed. For example, the distance LD1 may be longer than the distance LD2. That is, the space in which the second extension portion 40*c* and the fourth extension portion 40*e* extend may be smaller than the space in which the first extension portion 40*b* and the third extension portion 40*d* extend. With this structure, while the first wire 41 that is connected to the first terminal electrode 31 and the second wire 42 that is connected to the second terminal electrode 32 are wound around the winding core portion 11, the second extension portion 40*c* and the fourth extension portion 40*e* can be inhibited from being excessively bent. Accordingly, concentration of a stress on the second extension portion 40*c* and the fourth extension portion 40*e* can be reduced, and risk of breakage of the second extension portion 40*c* and the fourth extension portion 40*e* can be reduced.

Figure 2:
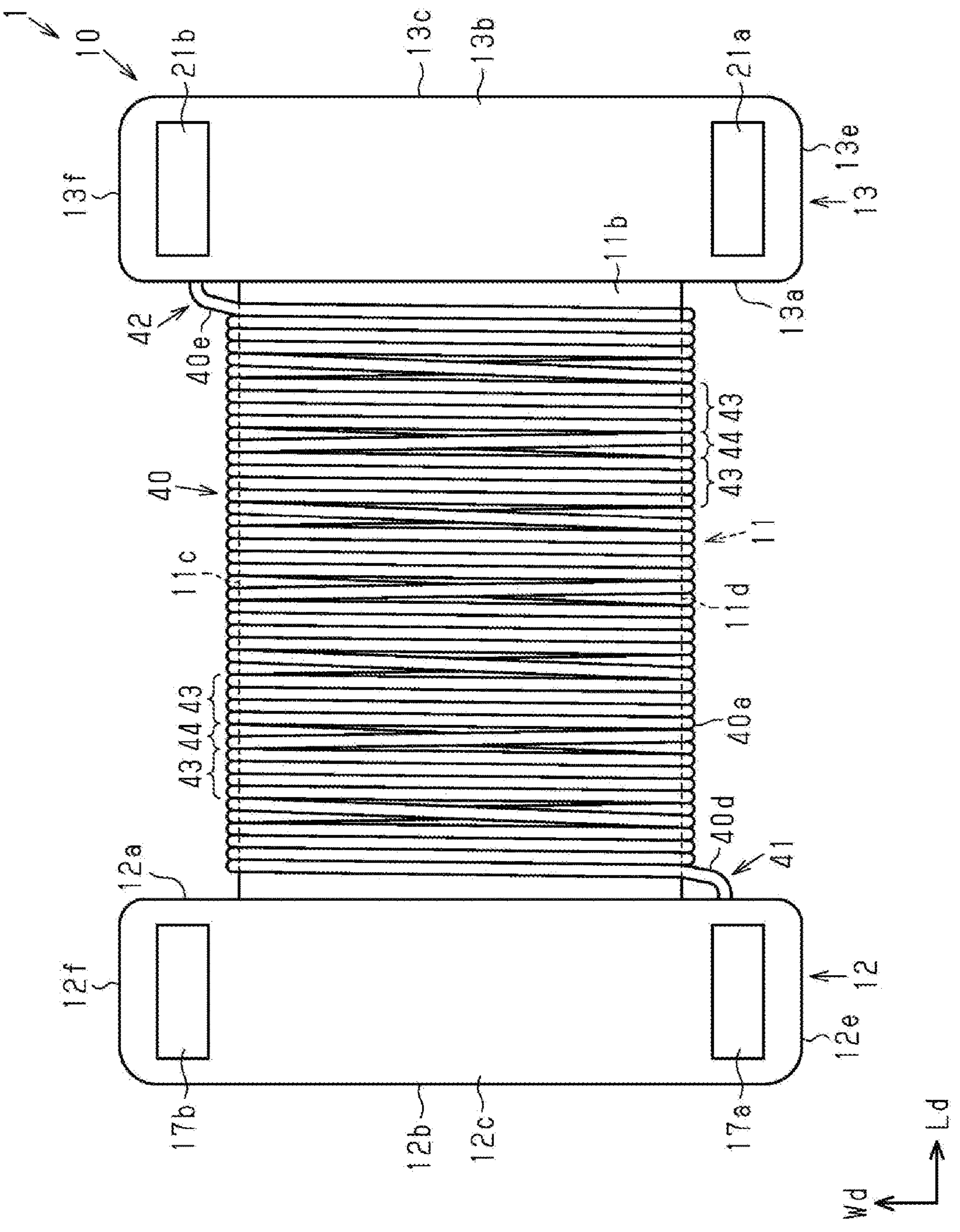
FIG. 2 is a schematic plan view of the coil component according to the embodiment with a top plate omitted from the coil component.

As illustrated in FIG. 2, the winding portion 40*a* includes first winding portions 43, first intersecting portions 44, and a second intersecting portion 45 (see FIG. 4). At each of the first winding portions 43, the first wire 41 and the second wire 42 are arranged along the winding core portion 11 and wound therearound in the same direction to have a predetermined number of turns. The number of the first winding portions 43 that are arranged in the length direction Ld is N (N is an even number equal to or more than 2). At each of the first intersecting portions 44, the first wire 41 and the second wire 42 intersect each other along the upper surface 11*b* of the winding core portion 11. The first intersecting portions 44 are formed between the first winding portions 43 adjacent to each other in the length direction Ld. That is, the winding portion 40*a* includes the first winding portions 43 and the first intersecting portions 44 that are alternately formed in the length direction Ld. According to the present embodiment, the number of the first intersecting portions 44 is less than the number of the first winding portions 43 by one. The second intersecting portion 45 is formed at a position on the winding portion 40*a* nearest to the second flange portion 13. At the second intersecting portion 45, the first wire 41 and the second wire 42 intersect each other along the first side surface 11*c* of the winding core portion 11. Specifically, the first wire 41 and the second wire 42 pass through the first side surface 11*c* from the bottom surface 11*a* of the winding core portion 11 toward the upper surface 11*b*, and in the course of passing, the first wire 41 and the second wire 42 intersect each other at the second intersecting portion 45 with the first wire 41 and the second wire 42 spaced from the first side surface 11*c* in the width direction Wd. The number of the second intersecting portion 45 is 1. That is, the number of the first winding portions 43 is equal to the total number of the first intersecting portions 44 and the second intersecting portion 45.

As illustrated in FIG. 1, the first extension portion 40*b* that extends in the height direction Td toward the bottom surface 11*a* of the winding core portion 11 extends in the width direction Wd from the second side surface 11*d* of the winding core portion 11 toward the protruding portion 15*a* of the first flange portion 12 with the first extension portion 40*b* spaced from the winding core portion 11 toward the first side surface 12*e* of the first flange portion 12. At the first extension portion 40*b*, the first wire 41 is bent so as to be placed on the protruding portion 15*a* and extends in the length direction Ld. A portion of the first wire 41 that is placed on the protruding portion 15*a* and that extends in the length direction Ld corresponds to the first end portion 41*a* of the first wire 41. The first end portion 41*a* of the first wire 41 is connected to the portion of the first bottom surface electrode 31*a* of the first terminal electrode 31 that corresponds to the protruding portion 15*a* and that is spaced from the leg portion 14*a* in the width direction Wd. According to the present embodiment, the first end portion 41*a* of the first wire 41 is located nearer than the second side surface 11*d* of the winding core portion 11 to the first side surface 12*e* of the first flange portion 12 in the width direction Wd.

The third extension portion 40*d* that extends in the height direction Td toward the bottom surface 11*a* of the winding core portion 11 extends obliquely from the winding core portion 11 toward the first flange portion 12 while extending from the second side surface 11*d* of the winding core portion 11 toward the first side surface 11*c* and is placed on the sloping portion 16 of the first flange portion 12. The first end portion 42*a* of the second wire 42 extends in the length direction Ld and is connected to the portion of the second bottom surface electrode 32*a* of the second terminal electrode 32 that corresponds to the protruding portion 15*b* and that is spaced from the leg portion 14*b* in the width direction Wd. An end portion of the third extension portion 40*d* near the first end portion 42*a* of the second wire 42 includes a first bent portion 42*c*. The first bent portion 42*c* is formed so as to have a convex shape toward the inner surface 12*a* of the first flange portion 12 in the length direction Ld. According to the present embodiment, on the opposite side of the first bent portion 42*c* from the first end portion 42*a* of the second wire 42, the third extension portion 40*d* includes a second bent portion 42*d* that extends from the first bent portion 42*c* and that is bent in the length direction Ld opposite the direction in which the first bent portion 42*c* is bent. Consequently, the end portion of the third extension portion 40*d* that is placed on the sloping portion 16 and that is near the second bent portion 42*d* is located nearer than the inner surface 12*a* of the first flange portion 12 to the outer surface 12*b*.

According to the present embodiment, the first end portion 42*a* of the second wire 42 is located nearer than the first side surface 11*c* of the winding core portion 11 to the second side surface 12*f* of the first flange portion 12 in the width direction Wd. The first end portion 42*a* of the second wire 42 is located nearer than the second end portion 42*b* of the second wire 42 to the second side surface 12*f* of the first flange portion 12 (the second side surface 13*f* of the second flange portion 13) in the width direction Wd when viewed in the length direction Ld in front of the first flange portion 12.

As illustrated in FIG. 2, at the first winding portion 43 that is formed at the end portion of the winding portion 40*a* near the second flange portion 13, the first wire 41 and the second wire 42 are arranged in this order in the length direction Ld from the first flange portion 12 toward the second flange portion 13. As illustrated in FIG. 4, at the second intersecting portion 45 that is formed at the end portion of the winding portion 40*a* near the second flange portion 13, the first wire 41 and the second wire 42 intersect each other along the first side surface 11*c* of the winding core portion 11, and the second wire 42 and the first wire 41 are arranged in this order in the length direction Ld from the first flange portion 12 toward the second flange portion 13 and extend in the height direction Td toward the bottom surface 11*a* of the winding core portion 11. At the end portion of the winding portion 40*a* near the second flange portion 13, the second intersecting portion 45 is thus formed as a part of the first winding portion 43.

As illustrated in FIG. 3, the first extension portion 40*b* does not intersect the second wire 42 along the second side surface 11*d* of the winding core portion 11. Specifically, as illustrated in FIG. 2, at the end portion of the winding portion 40*a* near the first flange portion 12, the first wire 41 and the second wire 42 are arranged in this order in the length direction Ld from the second flange portion 13 toward the first flange portion 12. At the end portion of the winding portion 40*a* near the first flange portion 12, only the first winding portion 43 is thus formed.

As illustrated in FIG. 1, the fourth extension portion 40*e* that extends in the height direction Td toward the bottom surface 11*a* of the winding core portion 11 extends in the width direction Wd from the first side surface 11*c* of the winding core portion 11 toward the protruding portion 19*b* of the second flange portion 13 with the fourth extension portion 40*e* spaced from the winding core portion 11 toward the second side surface 13*f* of the second flange portion 13. The second wire 42 is bent so as to be placed on the protruding portion 19*b* and extends in the length direction Ld. A portion of the second wire 42 that is placed on the protruding portion 19*b* and that extends in the length direction Ld corresponds to the second end portion 42*b* of the second wire 42. The second end portion 42*b* of the second wire 42 is connected to the fourth terminal electrode 34. According to the present embodiment, the second end portion 42*b* of the second wire 42 is located nearer than the first side surface 11*c* of the winding core portion 11 to the second side surface 13*f* of the second flange portion 13 in the width direction Wd.

The second extension portion 40*c* that extends in the height direction Td toward the bottom surface 11*a* of the winding core portion 11 extends obliquely from the winding core portion 11 toward the second flange portion 13 while extending from the first side surface 11*c* of the winding core portion 11 toward the second side surface 11*d* and is placed on the sloping portion 20 of the second flange portion 13. The second end portion 41*b* of the first wire 41 is connected to the third terminal electrode 33. There is thus no bent portion over a region from the second extension portion 40*c* to the second end portion 41*b* of the first wire 41, and a stress does not concentrate on the second extension portion 40*c* and the second end portion 41*b*. Accordingly, the distance in the length direction Ld between the winding portion 40*a* and the inner surface 13*a* of the second flange portion 13 can be decreased, and the number of turns of the winding portion 40*a* can be increased.

Method of Manufacturing Coil Component

Figure 13:
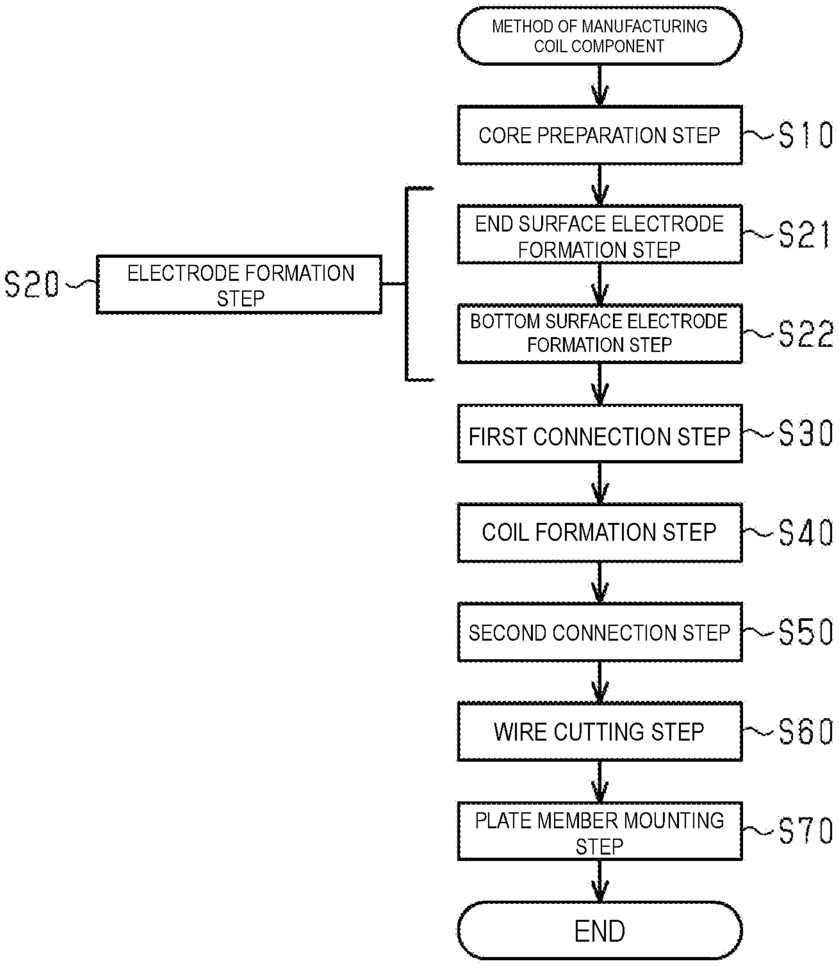
FIG. 13 is a flowchart illustrating a method of manufacturing the coil component according to the embodiment.

A method of manufacturing the coil component 1 will be described with reference to FIG. 13 to FIG. 17. As illustrated in FIG. 13, the method of manufacturing the coil component 1 includes a core preparation step (step S10), an electrode formation step (step S20), a first connection step (step S30), a coil formation step (step S40), a second connection step (step S50), a wire cutting step (step S60), and a plate member mounting step (step S70).

In the core preparation step, the core on which the first to fourth terminal electrodes 31 to 34 are not formed is prepared. The core is formed by firing a molded body composed of a compressed nonconductive material with a mold. According to the present embodiment, when the core is formed with the mold, the first curved portion 22, the second curved portion 23, the third curved portion 24, the fourth curved portion 25, the recessed portions 17*a* and 17*b*, and the recessed portions 21*a* and 21*b* are formed. That is, the shape of the first curved portion 22, the shape of the second curved portion 23, the shape of the third curved portion 24, and the shape of the fourth curved portion 25 is adjusted depending on the shape of the mold. The shapes of the recessed portions 17*a* and 17*b* and the shapes of the recessed portions 21*a* and 21*b* depend on the shape of the mold.

The electrode formation step includes an end surface electrode formation step (step S21) and a bottom surface electrode formation step (step S22). According to the present embodiment, the bottom surface electrode formation step is performed after the end surface electrode formation step.

Figure 14A:
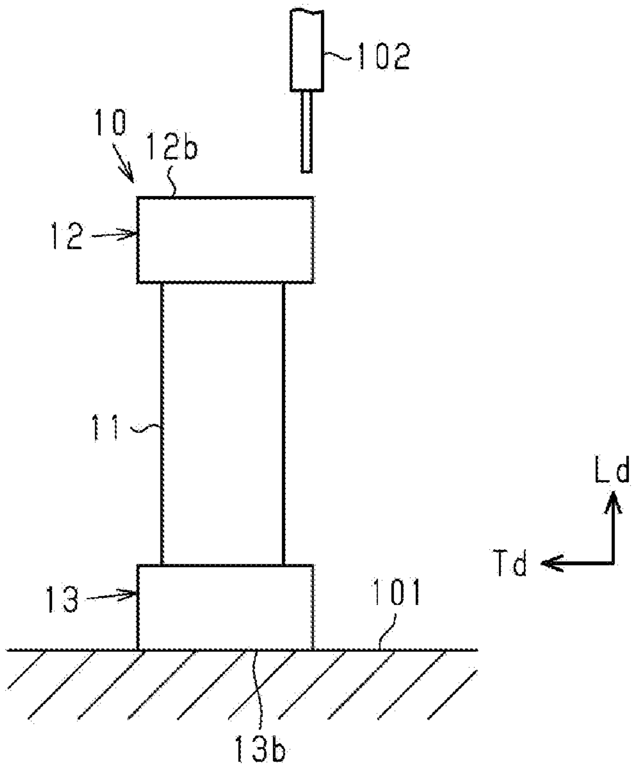
FIG. 14A illustrates an end surface electrode formation step.
Figure 14B:
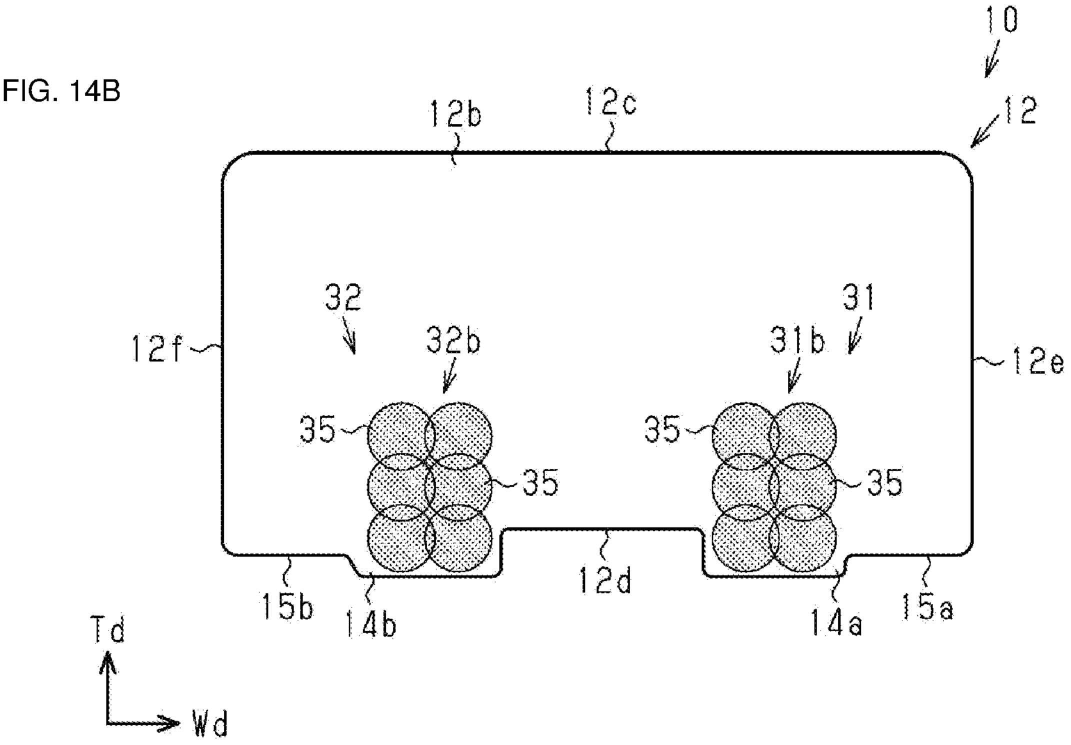
FIG. 14B is a front view of the first flange portion of the core during the end surface electrode formation step.

In the end surface electrode formation step, as illustrated in FIG. 14A, the core 10 is first placed on a reference surface 101 of an applicator 100 with the outer surface 13*b* of the second flange portion 13 of the core 10 being in contact therewith. In this case, a dispenser 102 of the applicator 100 faces the outer surface 12*b* of the first flange portion 12 of the core 10. Paste (silver (Ag) paste according to the present embodiment) is applied to the outer surface 12*b* of the first flange portion 12 of the core 10 by using the dispenser 102, and the paste is applied as a liquid for forming the underlying electrode of the first end surface electrode 31*b* of the first terminal electrode 31 and the underlying electrode of the second end surface electrode 32*b* of the second terminal electrode 32. According to the present embodiment, as illustrated in FIG. 14B, the applicator 100 applies the paste to form applied portions 35 in three columns in the height direction Td and in two rows in the width direction Wd in regions in which the first end surface electrode 31*b* of the first terminal electrode 31 and the second end surface electrode 32*b* of the second terminal electrode 32 are to be formed. Each of the applied portions 35 has a spherical shape having the maximum thickness at the center thereof in the height direction Td and in the width direction Wd of the applied portion 35 above the outer surface 12*b* of the first flange portion 12. According to the present embodiment, the applied portions 35 adjacent to each other in the height direction Td partly overlap, and the applied portions 35 adjacent to each other in the width direction Wd partly overlap. The applied portions 35 (six applied portions 35 according to the present embodiment) are thus integrally formed into the underlying electrodes of the end surface electrodes 31*b* and 32*b*. For this reason, the underlying electrodes of the end surface electrodes 31*b* and 32*b* are each formed to have an uneven shape. The number of the applied portions 35 can be freely changed. The number of the applied portions 35 may be freely changed depending on the size of the applied portions 35 that are formed when the applicator 100 applies the paste above the outer surface 12*b* of the first flange portion 12 at one time, and the size of the end surface electrodes 31*b* and 32*b*.

The underlying electrode of the third end surface electrode 33*b* of the third terminal electrode 33 and the underlying electrode of the fourth end surface electrode 34*b* of the fourth terminal electrode 34 are formed by using the applicator 100 as in the underlying electrode of the first end surface electrode 31*b* of the first terminal electrode 31 and the underlying electrode of the second end surface electrode 32*b* of the second terminal electrode 32.

Figure 15A:
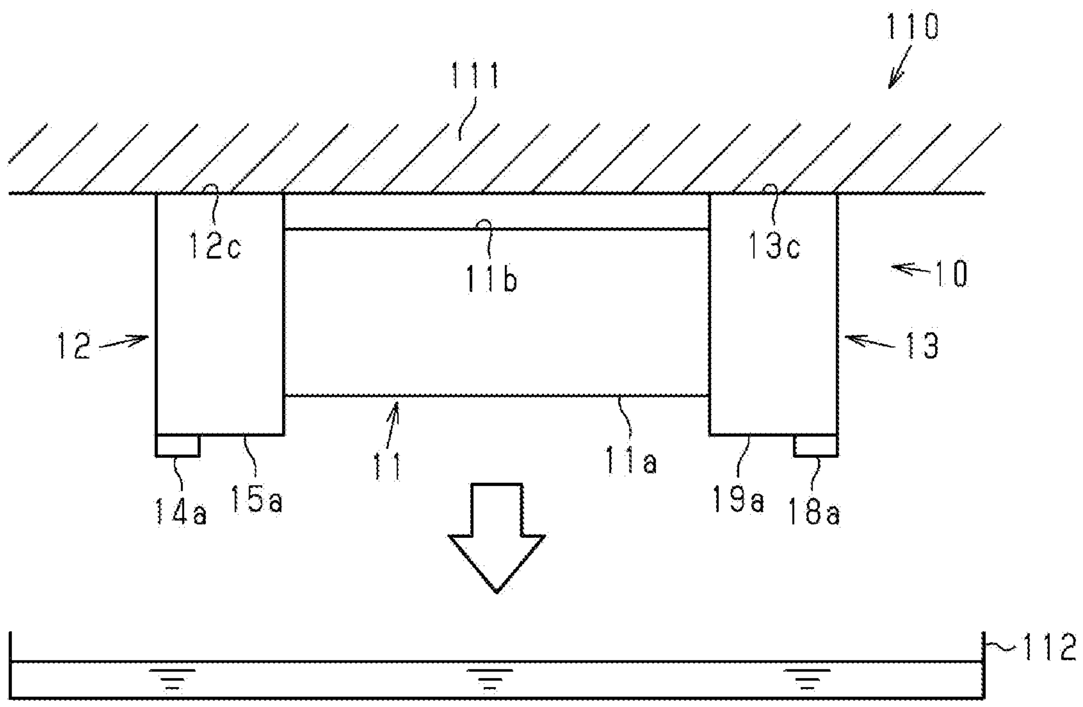
FIG. 15A and FIG. 15B illustrate a bottom surface electrode formation step.
Figure 15B:
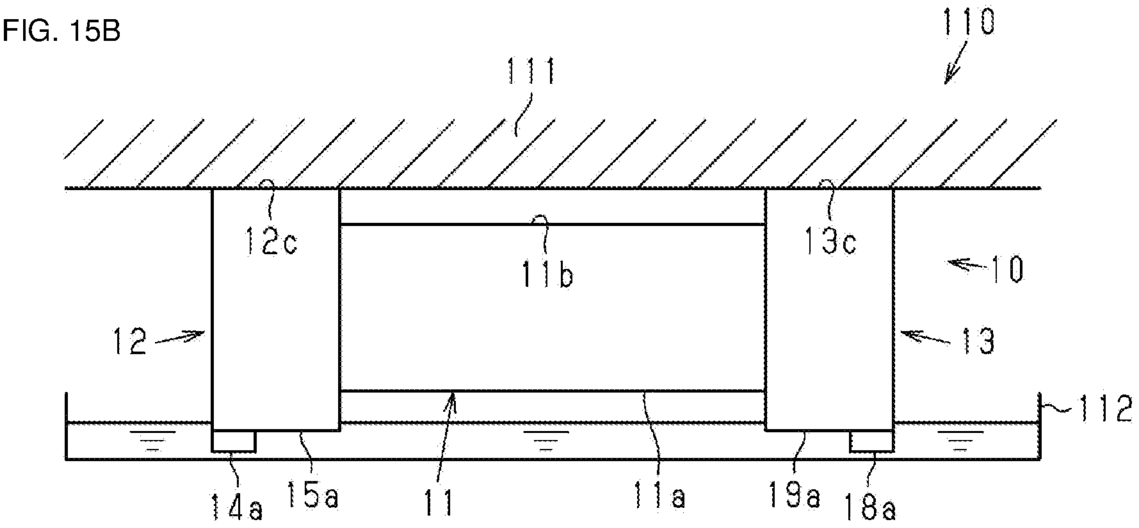

In the bottom surface electrode formation step, as illustrated in FIG. 15A and FIG. 15B, the underlying electrodes of the bottom surface electrodes 31*a* to 34*a* of the terminal electrodes 31 to 34 are formed on the leg portions 14*a* and 14*b* and the bottom surface 12*d* of the first flange portion 12 and the leg portions 18*a* and 18*b* and the bottom surface 13*d* of the second flange portion 13 of the core 10 by using a dip coating device 110. According to the present embodiment, as illustrated in FIG. 15A, a holding device 111 holds the core 10 such that the bottom surface 12*d* of the first flange portion 12 and the bottom surface 13*d* of the second flange portion 13 of the core 10 faces a coating tank 112. The coating tank 112 contains silver (Ag) glass paste. As illustrated in FIG. 15B, the holding device 111 inserts the core 10 into the coating tank 112 such that the leg portions 14*a* and 14*b* and the protruding portions 15*a* and 15*b* of the first flange portion 12 and the leg portions 18*a* and 18*b* and the protruding portions 19*a* and 19*b* of the second flange portion 13 of the core 10 are immersed in the Ag glass paste. Subsequently, the Ag glass paste is fired to form the underlying electrodes of the bottom surface electrodes 31*a* to 34*a* of the terminal electrodes 31 to 34. In the end surface electrode formation step, the underlying electrodes of the end surface electrodes 31*b* to 34*b* of the terminal electrodes 31 to 34 are formed in advance. Accordingly, the underlying electrode of the first bottom surface electrode 31*a* partly overlaps the underlying electrode of the first end surface electrode 31*b*, the underlying electrode of the second bottom surface electrode 32*a* partly overlaps the underlying electrode of the second end surface electrode 32*b*, the underlying electrode of the third bottom surface electrode 33*a* partly overlaps the underlying electrode of the third end surface electrode 33*b*, and the underlying electrode of the fourth bottom surface electrode 34*a* partly overlaps the underlying electrode of the fourth end surface electrode 34*b*.

As illustrated in FIG. 8, the underlying electrode of the first bottom surface electrode 31*a* overlaps the underlying electrode of the first end surface electrode 31*b*. This will be described in detail. In the bottom surface electrode formation step, a portion of the first bottom surface electrode 31*a* in the second region RA2 illustrated in FIG. 7A and a portion thereof that overlaps the first end surface electrode 31*b* in the first region RA1 are formed. A portion of the second bottom surface electrode 32*a* in the second region RB2 and a portion thereof that overlaps the second end surface electrode 32*b* in the first region RB1 are formed. A portion of the third bottom surface electrode 33*a* in the second region RC2 and a portion thereof that overlaps the third end surface electrode 33*b* in the first region RC1 are formed. A portion of the fourth bottom surface electrode 34*a* in the second region RD2 and a portion thereof that overlaps the fourth end surface electrode 34*b* in the first region RD1 are formed. The height dimension of the portion that overlaps the first end surface electrode 31*b* in the first region RA1, the height dimension of the portion that overlaps the second end surface electrode 32*b* in the first region RB1, the height dimension of the portion that overlaps the third end surface electrode 33*b* in the first region RC1, and the height dimension of the portion that overlaps the fourth end surface electrode 34*b* in the first region RD1 are set depending on the depth at which the core 10 is inserted in the coating tank 112.

The underlying electrode of the second bottom surface electrode 32*a* overlaps the underlying electrode of the second end surface electrode 32*b*, the underlying electrode of the third bottom surface electrode 33*a* overlaps the underlying electrode of the third end surface electrode 33*b*, and the underlying electrode of the fourth bottom surface electrode 34*a* overlaps the underlying electrode of the fourth end surface electrode 34*b* in the same manner as the underlying electrode of the first bottom surface electrode 31*a* overlaps the underlying electrode of the first end surface electrode 31*b*.

After the underlying electrodes of the bottom surface electrodes 31*a* to 34*a* and the underlying electrodes of the end surface electrodes 31*b* to 34*b* of the terminal electrodes 31 to 34 are formed, the plating layers are formed by, for example, electroless barrel plating so as to be stacked on the underlying electrodes of the bottom surface electrodes 31*a* to 34*a* and the underlying electrodes of the end surface electrodes 31*b* to 34*b*. Each of the plating layers is formed in order of a nickel (Ni) layer and a tin (Sn) layer.

Figure 16:
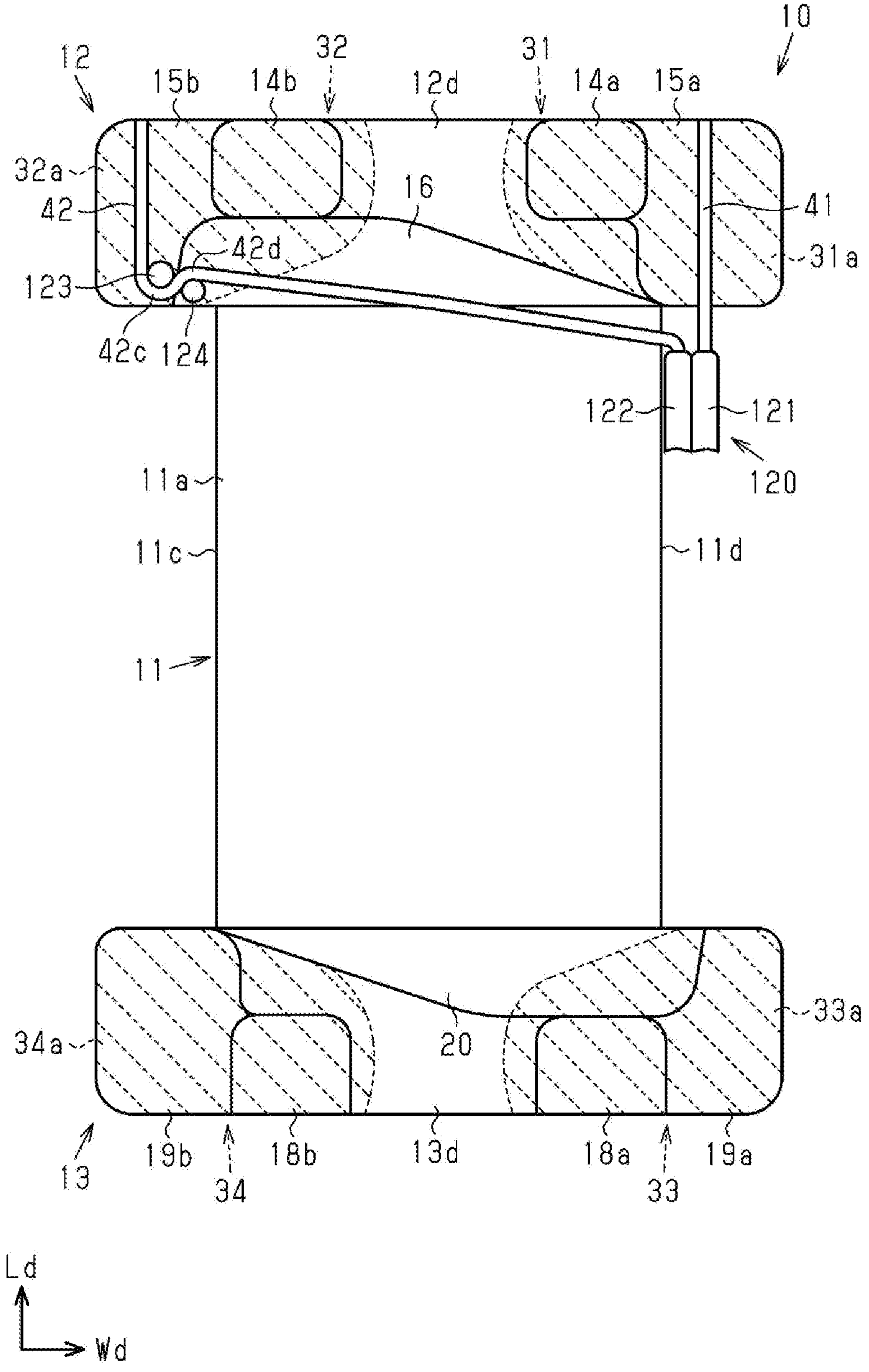
FIG. 16 is a schematic bottom view of the core for a description of a first connection step.

In the first connection step, the first wire 41 is connected to the first bottom surface electrode 31*a* of the first terminal electrode 31, and the second wire 42 is connected to the second bottom surface electrode 32*a* of the second terminal electrode 32. Specifically, the core 10 is first set on a winder 120. As illustrated in FIG. 16, the first wire 41 is fed from a first nozzle 121 of the winder 120 and placed on the first bottom surface electrode 31*a* of the first terminal electrode 31 that is formed on the protruding portion 15*a* of the first flange portion 12. The first wire 41 is pressure-bonded to the first bottom surface electrode 31*a* of the first terminal electrode 31 by using a pressure bonding device not illustrated. The second wire 42 is fed from a second nozzle 122 and placed on the second bottom surface electrode 32*a* of the second terminal electrode 32 that is formed on the protruding portion 15*b*. The second wire 42 is pressure-bonded to the second bottom surface electrode 32*a* of the second terminal electrode 32 by using the pressure bonding device.

When the coil formation step is performed, the second nozzle 122 moves toward the second side surface 11*d* of the winding core portion 11 of the core 10. At this time, the second wire 42 that is connected to the second terminal electrode 32 is bent by using a first hook 123 of the winder 120 to form the first bent portion 42*c*. The second wire 42 is bent by using a second hook 124 of the winder 120 to form the second bent portion 42*d*. The second wire 42 that extends from the second bent portion 42*d* toward the second side surface 11*d* of the winding core portion 11 is placed on the sloping portion 16 of the core 10.

In the coil formation step, the first nozzle 121 and the second nozzle 122 revolve around the winding core portion 11 to wind the first wire 41 and the second wire 42 around the winding core portion 11. At this time, the first nozzle 121 and the second nozzle 122 operate such that the first wire 41 and the second wire 42 intersect each other at one time whenever the first wire 41 and the second wire 42 are wound predetermined times (the number of turns).

In the coil formation step, the first nozzle 121 and the second nozzle 122 finish winding the first wire 41 and the second wire 42 around the winding core portion 11 at positions on the first side surface 11*c* of the winding core portion 11. At this time, the first nozzle 121 and the second nozzle 122 operate such that the first wire 41 and the second wire 42 intersect each other along the first side surface 11*c* of the winding core portion 11.

Figure 17:
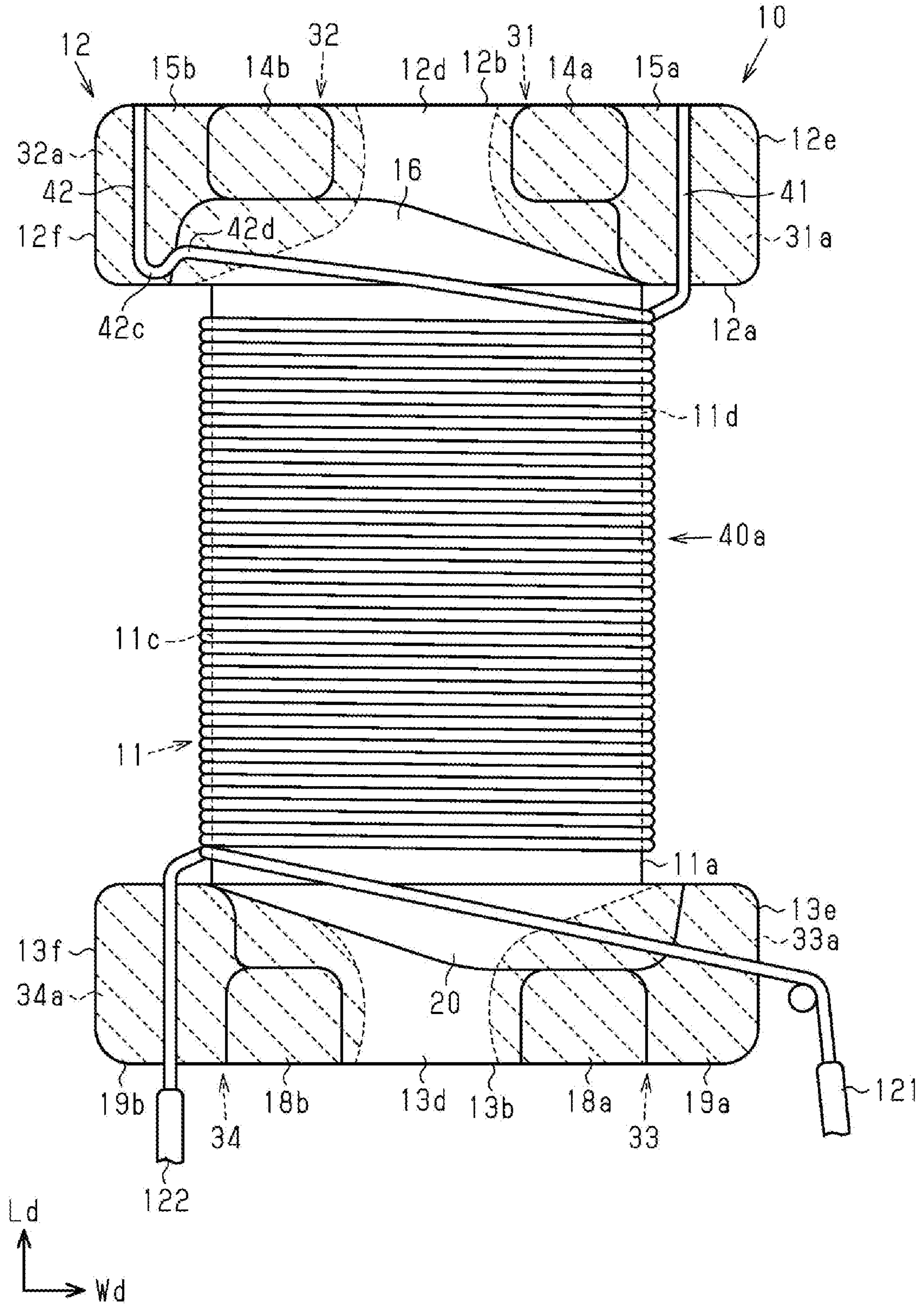
FIG. 17 is a schematic bottom view of the core for a description of a second connection step.

In the second connection step, the first wire 41 is connected to the third terminal electrode 33, and the second wire 42 is connected to the fourth terminal electrode 34. Specifically, as illustrated in FIG. 17, the first nozzle 121 of the winder 120 operates such that the first wire 41 is placed on the third bottom surface electrode 33*a* of the third terminal electrode 33 that is formed on the protruding portion 19*a* of the second flange portion 13. At this time, the first nozzle 121 moves such that the first wire 41 is placed on the sloping portion 20 of the second flange portion 13 from the first side surface 11*c* of the winding core portion 11. The second nozzle 122 of the winder 120 operates such that the second wire 42 is placed on the fourth bottom surface electrode 34*a* of the fourth terminal electrode 34 that is formed on the protruding portion 19*b* of the second flange portion 13. The first wire 41 is pressure-bonded to the third bottom surface electrode 33*a* of the third terminal electrode 33, and the second wire 42 is pressure-bonded to the fourth bottom surface electrode 34*a* of the fourth terminal electrode 34 by using the pressure bonding device.

In the wire cutting step, a portion of the first wire 41 that extends from the contact between the first wire 41 and the first bottom surface electrode 31*a* of the first terminal electrode 31 toward the opposite side of the first flange portion 12 from the winding core portion 11 is cut by using a cutting device not illustrated. Consequently, the contact between the first wire 41 and the first terminal electrode 31 corresponds to the first end portion 41*a* of the first wire 41. A portion of the first wire 41 that extends from the first nozzle 121 and that protrudes from the contact between the first wire 41 and the third bottom surface electrode 33*a* of the third terminal electrode 33 to the outside of the first side surface 13*e* of the second flange portion 13 is cut by using the cutting device. Consequently, the contact between the first wire 41 and the third bottom surface electrode 33*a* of the third terminal electrode 33 corresponds to the second end portion 41*b* of the first wire 41.

In the wire cutting step, a portion of the second wire 42 that extends from the contact between the second wire 42 and the second bottom surface electrode 32*a* of the second terminal electrode 32 toward the opposite side of the first flange portion 12 from the winding core portion 11 is cut by using the cutting device. Consequently, the contact between the second wire 42 and the second bottom surface electrode 32*a* of the second terminal electrode 32 corresponds to the first end portion 42*a* of the second wire 42. A portion of the second wire 42 that extends from the second nozzle 122 and that protrudes from the contact between the second wire 42 and the fourth bottom surface electrode 34*a* of the fourth terminal electrode 34 to the opposite side of the second flange portion 13 from the winding core portion 11 is cut by using the cutting device. Consequently, the contact between the second wire 42 and the fourth bottom surface electrode 34*a* of the fourth terminal electrode 34 corresponds to the second end portion 42*b* of the second wire 42.

In the plate member mounting step, the plate member 50 is mounted on the core 10 with adhesive. According to the present embodiment, the adhesive AH is applied to the upper surface 12*c* of the first flange portion 12 and the upper surface 13*c* of the second flange portion 13 of the core 10. The adhesive AH is epoxy resin adhesive that contains silica filler. The adhesive AH can be applied by a known method. At this time, the adhesive AH is applied to the entire upper surface 12*c* of the first flange portion 12. Subsequently, the plate member 50 is pressed against the core 10 with the first surface 51 of the plate member 50 faces the upper surface 12*c* of the first flange portion 12 and the upper surface 13*c* of the second flange portion 13 of the core 10. At this time, excess adhesive AH between the first surface 51 of the plate member 50 and the upper surface 12*c* of the first flange portion 12 enters the recessed portions 17*a* and 17*b* of the first flange portion 12, and the end portion of the first flange portion 12 near the outer surface 12*b* comes into contact with the first surface 51 of the plate member 50. Since the excess adhesive AH enters the recessed portions 17*a* and 17*b*, the adhesive AH is unlikely to protrude from the gap GA illustrated in FIG. 12A. Similarly, excess adhesive AH between the first surface 51 of the plate member 50 and the upper surface 13*c* of the second flange portion 13 enters the recessed portions 21*a* and 21*b* of the second flange portion 13, and the end portion of the second flange portion 13 near the outer surface 13*b* comes into contact with the first surface 51 of the plate member 50. Since the excess adhesive AH enters the recessed portions 21*a* and 21*b*, the adhesive AH is unlikely to protrude from the gap GB illustrated in FIG. 12B. Through the above processes, the coil component 1 is manufactured.

According to the present embodiment, the following effects are achieved. (1) The first curved portion 22 is formed at the connection between the bottom surface 11*a* of the winding core portion 11 and the inner surface 12*a* of the first flange portion 12 of the core 10. The ratio of the length of the first curved portion 22 in the height direction Td to the distance between the bottom surface 11*a* of the winding core portion 11 and the first terminal electrode 31 in the height direction Td is no less than 20% and no more than 60% (i.e., from 20% to 60%). With this structure, when the ratio of the length of the first curved portion 22 in the height direction Td to the distance between the bottom surface 11*a* of the winding core portion 11 and the first terminal electrode 31 in the height direction Td is 20% or more, the first curved portion 22 can be enlarged, and flexural strength between the winding core portion 11 and the first flange portion 12 can be increased. Accordingly, the deflection strength of the core 10 can be increased. When the ratio of the length of the first curved portion 22 in the height direction Td to the distance between the bottom surface 11*a* of the winding core portion 11 and the first terminal electrode 31 in the height direction Td is 60% or less, the thickness of the first flange portion 12 can be inhibited from being excessively decreased in the length direction Ld. Accordingly, the length of the first bottom surface electrode 31*a* of the first terminal electrode 31 and the length of the second bottom surface electrode 32*a* of the second terminal electrode 32 can be inhibited from being excessively decreased in the length direction Ld, and the coil component 1 can be more appropriately mounted on the circuit board PX.

The second curved portion 23 is formed at the connection between the bottom surface 11*a* of the winding core portion 11 and the inner surface 13*a* of the second flange portion 13. The ratio of the length of the second curved portion 23 in the height direction Td to the distance in the height direction Td between the bottom surface 11*a* of the winding core portion 11 and the third terminal electrode 33 is no less than 20% and no more than 60% (i.e., from 20% to 60%). With this structure, when the ratio of the length of the second curved portion 23 in the height direction Td to the distance in the height direction Td between the bottom surface 11*a* of the winding core portion 11 and the third terminal electrode 33 is 20% or more, the second curved portion 23 can be enlarged, and flexural strength between the winding core portion 11 and the second flange portion 13 can be increased. Accordingly, the deflection strength of the core 10 can be increased. When the ratio of the length of the second curved portion 23 in the height direction Td to the distance in the height direction Td between the bottom surface 11*a* of the winding core portion 11 and the third terminal electrode 33 is 60% or less, the thickness of the second flange portion 13 can be inhibited from being excessively decreased in the length direction Ld. Accordingly, the length of the third bottom surface electrode 33*a* of the third terminal electrode 33 and the length of the fourth bottom surface electrode 34*a* of the fourth terminal electrode 34 can be inhibited from being excessively decreased in the length direction Ld, and the coil component 1 can be more appropriately mounted on the circuit board PX.

(2) The first curved portion 22 has a curve having a substantially true-circular shape in a section perpendicular to the width direction Wd. With this structure, the first curved portion 22 can be readily formed unlike the case where the curvature of the first curved portion 22 varies, for example, in the case of having a curve of a substantially elliptic shape in a section perpendicular to the width direction Wd.

The second curved portion 23 has a curve having a substantially true-circular shape in a section perpendicular to the width direction Wd. With this structure, the second curved portion 23 can be more readily formed unlike the case where the curvature of the second curved portion 23 varies, for example, in the case of having a curve of a substantially elliptic shape in a section perpendicular to the width direction Wd.

(3) The third curved portion 24 is formed at the connection between the upper surface 11*b* of the winding core portion 11 and the inner surface 12*a* of the first flange portion 12 of the core 10. The length of the first curved portion 22 in the height direction Td is longer than the length of the third curved portion 24 in the height direction Td. With this structure, the flexural strength of the core 10 of the coil component 1 at a position near the circuit board PX is increased, and the reliability of connection between the coil component 1 and the circuit board PX can be improved.

The fourth curved portion 25 is formed at the connection between the upper surface 11*b* of the winding core portion 11 and the inner surface 13*a* of the second flange portion 13. The length of the second curved portion 23 in the height direction Td is longer than the length of the fourth curved portion 25 in the height direction Td. With this structure, the flexural strength of the core 10 of the coil component 1 at a position near the circuit board PX is increased, and the reliability of connection between the coil component 1 and the circuit board PX can be further improved.

(4) The length of the first curved portion 22 in the length direction Ld is longer than the length of the third curved portion 24 in the length direction Ld in a section perpendicular to the width direction Wd. This structure increases the distances between the end portion (portion of the winding portion 40*a* that faces the bottom surface 11*a*) of the winding portion 40*a* that is near the circuit board PX in the height direction Td and that is near the first flange portion 12 in the length direction Ld and the first terminal electrode 31 of the first flange portion 12 and between the end portion and the second terminal electrode 32. Accordingly, heat that the first terminal electrode 31 and the second terminal electrode 32 generate is unlikely to affect the winding portion 40*a*, and the quality of the coil component 1 is improved.

The length of the second curved portion 23 in the length direction Ld is longer than the length of the fourth curved portion 25 in the length direction Ld in a section perpendicular to the width direction Wd. This structure increases the distances between the end portion of the winding portion 40*a* that is near the circuit board PX in the height direction Td and that is near the second flange portion 13 in the length direction Ld and the third terminal electrode 33 of the second flange portion 13 and between the end portion and the fourth terminal electrode 34. Accordingly, heat that the third terminal electrode 33 and the fourth terminal electrode 34 generate is unlikely to affect the winding portion 40*a*, and the quality of the coil component 1 is improved.

(5) The distance LX1 in the length direction Ld between the first curved portion 22 and the second curved portion 23 is longer than the distance LX2 in the length direction Ld between the third curved portion 24 and the fourth curved portion 25 in a section of the winding core portion 11 along a plane extending in the length direction Ld. With this structure, the distance in the length direction Ld between the winding portion 40*a* along the bottom surface 11*a* of the winding core portion 11 and the inner surface 12*a* of the first flange portion 12 is longer than the distance in the length direction Ld between the winding portion 40*a* along the upper surface 11*b* of the winding core portion 11 and the inner surface 12*a* of the first flange portion 12 when viewed in the height direction Td. This increases the distances between the first terminal electrode 31 and the winding portion 40*a* and between the second terminal electrode 32 and the winding portion 40*a*, and heat that the first terminal electrode 31 and the second terminal electrode 32 generate is unlikely to affect the winding portion 40*a*. Accordingly, the quality of the coil component 1 is improved.

The distance in the length direction Ld between the winding portion 40*a* along the bottom surface 11*a* of the winding core portion 11 and the inner surface 13*a* of the second flange portion 13 is longer than the distance in the length direction Ld between the winding portion 40*a* along the upper surface 11*b* of the winding core portion 11 and the inner surface 13*a* of the second flange portion 13 when viewed in the height direction Td. This increases the distances between each of the terminal electrodes 31 to 34 and the winding portion 40*a*, and heat that the terminal electrodes 31 to 34 generate is unlikely to affect the winding portion 40*a*. Accordingly, the quality of the coil component 1 is improved.

(6) The coil component 1 includes the plate member 50 that faces the upper surface 12*c* of the first flange portion 12 and the upper surface 13*c* of the second flange portion 13 in the height direction Td. The distance in the height direction Td between the first surface 51 of the plate member 50 and the upper surface 12*c* of the first flange portion 12 varies in the length direction Ld. With this structure, when the plate member 50 is composed of a magnetic material, the magnetic circuit between the core 10 and the plate member 50 is restricted because the distance in the height direction Td between the first surface 51 of the plate member 50 and the upper surface 12*c* of the first flange portion 12 partly decreases at a position between the plate member 50 and the first flange portion 12. Accordingly, a variation in the length of the magnetic circuit in the coil component 1 is decreased, and the inductance value of the coil component 1 can be inhibited from varying.

The distance in the height direction Td between the first surface 51 of the plate member and the upper surface 13*c* of the second flange portion 13 varies in the length direction Ld of the second flange portion 13. Accordingly, regarding the second flange portion 13, the magnetic circuit between the core 10 and the plate member 50 is restricted as in the first flange portion 12. The variation in the length of the magnetic circuit in the coil component 1 is decreased, and the inductance value of the coil component 1 can be further inhibited from varying.

In the case where the plate member 50 is secured to the first flange portion 12 and the second flange portion 13 with the adhesive AH, the adhesive AH moves from the position at which the distance in the height direction Td between the first surface 51 of the plate member 50 and the upper surface 12*c* of the first flange portion 12 decreases to the position at which the distance in the height direction Td between the first surface 51 of the plate member 50 and the upper surface 12*c* of the first flange portion 12 increases. For this reason, the adhesive AH is inhibited from protruding to the outside of the core 10 and the plate member 50.

Regarding the second flange portion 13, the adhesive AH moves from the position at which the distance in the height direction Td between the first surface 51 of the plate member 50 and the upper surface 13*c* of the second flange portion 13 decreases to the position at which the distance in the height direction Td between the first surface 51 of the plate member 50 and the upper surface 13*c* of the second flange portion 13 increases. For this reason, the adhesive AH is further inhibited from protruding to the outside of the core 10 and the plate member 50.

(7) The position at which the distance in the height direction Td between the first surface 51 of the plate member 50 and the upper surface 12*c* of the first flange portion 12 increases is near the inner surface 12*a* of the first flange portion 12. With this structure, the adhesive AH between the first surface 51 of the plate member 50 and the upper surface 12*c* of the first flange portion 12 moves toward the inner surface 12*a* of the first flange portion 12 and is unlikely to move toward the outer surface 12*b*. For this reason, the adhesive AH is unlikely to protrude to the outside of the core 10 and the plate member 50.

Regarding the second flange portion 13, the position at which the distance in the height direction Td between the first surface 51 of the plate member 50 and the upper surface 13*c* of the second flange portion 13 increases is near the inner surface 13*a* of the second flange portion 13. Accordingly, the adhesive AH between the first surface 51 of the plate member 50 and the upper surface 13*c* of the second flange portion 13 moves toward the inner surface 13*a* of the second flange portion 13 and is unlikely to move toward the outer surface 13*b*. For this reason, the adhesive AH is more unlikely to protrude to the outside of the core 10 and the plate member 50.

(8) The distance D1 in the height direction Td between the first surface 51 of the plate member 50 and the upper surface 12*c* of the first flange portion 12 gradually decreases in the direction from the inner surface 12*a* of the first flange portion 12 toward the outer surface 12*b*. With this structure, the magnetic circuit between the core 10 and the plate member 50 is restricted by the inner surface 12*a* of the first flange portion 12. Accordingly, the variation in the length of the magnetic circuit in the coil component 1 is decreased, and the inductance value of the coil component 1 can be inhibited from varying.

In the case where the plate member 50 and the first flange portion 12 are secured to each other with the adhesive AH, the adhesive AH between the first surface 51 of the plate member 50 and the upper surface 12*c* of the first flange portion 12 near the outer surface 12*b* in the length direction Ld moves toward the inner surface 12*a* in the length direction Ld. For this reason, the adhesive AH is inhibited from protruding to the outside of the core 10 and the plate member 50.

Regarding the second flange portion 13, the distance D2 in the height direction Td between the first surface 51 of the plate member 50 and the upper surface 13*c* of the second flange portion 13 gradually decreases in the direction from the inner surface 13*a* of the second flange portion 13 toward the outer surface 13*b* as in the first flange portion 12. Accordingly, the variation in the length of the magnetic circuit in the coil component 1 is decreased, and the inductance value of the coil component 1 can be inhibited from varying. The adhesive AH that secures the plate member 50 and the second flange portion 13 to each other moves from a position near the outer surface 13*b* in the length direction Ld between the first surface 51 of the plate member 50 and the upper surface 13*c* of the second flange portion 13 toward the inner surface 13*a* in the length direction Ld. For this reason, the adhesive AH is further inhibited from protruding to the outside of the core 10 and the plate member 50.

(9) As discussed above, the recessed portions 17*a* and 17*b* are formed on the upper surface 12*c* of the first flange portion 12 that faces the first surface 51 of the plate member 50, or in the plate member 50, or both, at positions outside the winding core portion 11 in the width direction Wd. With this structure, in the case where the plate member 50 is secured to the first flange portion 12 and the second flange portion 13 with the adhesive AH, the adhesive AH enters the recessed portions 17*a* and 17*b*, and the adhesive AH is further inhibited from protruding to the outside of the core 10 and the plate member 50.

Since the recessed portions 17*a* and 17*b* are formed at the positions outside the winding core portion 11 in the width direction Wd, the recessed portions 17*a* and 17*b* inhibit the plate member 50 from affecting the magnetic circuit between the core 10 and the plate member 50 within the range of the width of the winding core portion 11, and the distance between the plate member 50 and the first flange portion 12 is not increased. Accordingly, the inductance value of the coil component 1 can be inhibited from decreasing.

The recessed portions 21*a* and 21*b* are formed on the upper surface 13*c* of the second flange portion 13 as in the first flange portion 12. Also, as discussed above, the recessed portions 21*a* and 21*b* are formed on the upper surface 13*c* of the first flange portion 12 that faces the first surface 51 of the plate member 50, or in the plate member 50, or both, at positions outside the winding core portion 11 in the width direction Wd. Accordingly, the adhesive AH can be further inhibited from protruding to the outside of the core 10 and the plate member 50. In addition, the magnetic circuit between the core 10 and the plate member 50 is further inhibited from being affected. Accordingly, the inductance value of the coil component 1 can be further inhibited from decreasing.

(10) The shape of the outer edge of the first end surface electrode 31*b* of the first terminal electrode 31 includes the convex curve. With this structure, a stress is unlikely to concentrate on the outer edge of the first end surface electrode 31b of the first terminal electrode 31, and the first end surface electrode 31b of the first terminal electrode 31 is unlikely to be separated from the core 10. Accordingly, the reliability of the coil component 1 can be improved.

The shape of the outer edge of the second end surface electrode 32b of the second terminal electrode 32, the outer edge of the third end surface electrode 33b of the third terminal electrode 33, and the outer edge of the fourth end surface electrode 34b of the fourth terminal electrode 34 includes the convex curve. With this structure, a stress is unlikely to concentrate on the outer edges of the end surface electrodes 32b to 34b of the terminal electrodes 32 to 34, and the end surface electrodes 32b to 34b of the terminal electrodes 32 to 34 are unlikely to be separated from the core 10. Accordingly, the reliability of the coil component 1 can be further improved.

(11) The shape of the outer edge of the first bottom surface electrode 31a of the first terminal electrode 31 includes the convex curve. With this structure, a stress is unlikely to concentrate on the outer edge of the first bottom surface electrode 31a of the first terminal electrode 31, and the first bottom surface electrode 31a of the first terminal electrode 31 is unlikely to be separated from the core 10. Accordingly, the reliability of the coil component 1 can be improved.

The shape of the outer edge of the second bottom surface electrode 32a of the second terminal electrode 32, the outer edge of the third bottom surface electrode 33a of the third terminal electrode 33, and the outer edge of the fourth bottom surface electrode 34a of the fourth terminal electrode 34 includes the convex curve. With this structure, a stress is unlikely to concentrate on the outer edges of the bottom surface electrodes 32a to 34a of the terminal electrodes 32 to 34, and the bottom surface electrodes 32a to 34a of the terminal electrodes 32 to 34 are unlikely to be separated from the core 10. Accordingly, the reliability of the coil component 1 can be further improved.

(12) The first end surface electrode 31b of the first terminal electrode 31 is formed to have an uneven shape when viewed in the width direction Wd or the height direction Td. With this structure, in the case where the coil component 1 is mounted on the circuit board PX with a conductive connection member such as solder SD, the conductive connection member enters an uneven portion of the first end surface electrode 31b of the first terminal electrode 31. This increases connection strength between the coil component 1 and the circuit board PX.

The second end surface electrode 32b of the second terminal electrode 32, the third end surface electrode 33b of the third terminal electrode 33, and the fourth end surface electrode 34b of the fourth terminal electrode 34 are each formed to have an uneven shape when viewed in the width direction Wd or the height direction Td. With this structure, in the case where the coil component 1 is mounted on the circuit board PX with the conductive connection member such as solder SD, the conductive connection member enters uneven portions of the end surface electrodes 32b to 34b of the terminal electrodes 32 to 34. This further increases the connection strength between the coil component 1 and the circuit board PX.

(13) The first flange portion 12 includes the protruding portions 15a and 15b that are connected to the first end portion 41a of the first wire 41 and the first end portion 42a of the second wire 42, and the leg portions 14a and 14b that are to be mounted on the wiring pattern (land RX) of the circuit board PX in the case where the coil component is mounted on the circuit board PX. The second flange portion 13 includes the protruding portions 19a and 19b that is connected to the second end portion 41b of the first wire 41 and the second end portion 42b of the second wire 42, and the leg portions 18a and 18b that are to be mounted on the wiring pattern (land RX) of the circuit board PX in the case where the coil component is mounted on the circuit board PX. The leg portions 14a, 14b, 18a, and 18b protrude from the protruding portions 15a, 15b, 19a, and 19b toward the circuit board PX. The first bottom surface electrode 31a of the first terminal electrode 31 is disposed at a portion that corresponds to the leg portion 14a and the protruding portion 15a, and the second bottom surface electrode 32a of the second terminal electrode 32 is disposed at a portion that corresponds to the leg portion 14b and the protruding portion 15b. The third bottom surface electrode 33a of the third terminal electrode 33 is disposed at a portion that corresponds to the leg portion 18a and the protruding portion 19a. The fourth bottom surface electrode 34a of the fourth terminal electrode 34 is disposed at a portion that corresponds to the leg portion 18b and the protruding portion 19b. With this structure, the first wire 41 and the second wire 42 are electrically connected to the terminal electrodes 31 to 34, and the coil component can be mounted on the circuit board PX without being affected by the end portions 41a and 41b of the first wire 41 and the end portions 42a and 42b of the second wire 42 by using the leg portions 14a, 14b, 18a, and 18b. Accordingly, the coil component 1 is prevented from sloping with respect to the circuit board PX by bringing the end portions 41a and 41b of the first wire 41 and the end portions 42a and 42b of the second wire 42 into contact with the circuit board PX, and the coil component 1 is appropriately connected to the circuit board PX.

(14) In the end surface electrode formation step in the method of manufacturing the coil component 1, the end surface electrodes 31b to 34b of the terminal electrodes 31 to 34 are formed by using the applicator 100 (dispenser). This facilitates formation of the uneven shapes of the end surface electrodes 31b to 34b of the terminal electrodes 31 to 34 by forming the applied portions 35 in rows in the width direction Wd and in columns in the height direction Td.

(15) The bottom surface electrode formation step is performed with the outer surface 12b of the first flange portion 12 and the outer surface 13b of the second flange portion 13 placed on the reference surface 101 of the applicator 100. Assuming that the bottom surface electrodes 31a to 34a of the terminal electrodes 31 to 34 are first formed, in some cases where portions of the bottom surface electrodes 31a to 34a are formed to reach the outer surface 12b of the first flange portion 12 and the outer surface 13b of the second flange portion 13, the core 10 slopes with respect to the reference surface 101 of the applicator 100 due to the bottom surface electrodes 31a to 34a. For this reason, it is necessary to form the end surface electrodes 31b to 34b of the terminal electrodes 31 to 34 in consideration for the slope of the core 10 with respect to the reference surface 101 of the applicator 100.

In view of this, in the electrode formation step of the method of manufacturing of the coil component 1, the end surface electrode formation step is performed before the bottom surface electrode formation step. In this case, when the core 10 is placed on the reference surface 101 of the applicator 100, the terminal electrodes 31 to 34 do not have the bottom surface electrodes 31a to 34a, and the core 10 is inhibited from sloping with respect to the reference surface 101. Accordingly, it is not necessary to consider the slope of the core 10 with respect to the reference surface 101, and the end surface electrodes 31*b* to 34*b* of the terminal electrodes 31 to 34 can be more accurately formed by using the applicator 100.

(16) The winding portion 40*a* includes the N (N is an even number equal to or more than 2) first winding portions 43 and the first intersecting portions 44, and at each of the first winding portions 43, the first wire 41 and the second wire 42 are arranged along the winding core portion 11 and wound therearound in the same direction to have the predetermined number of turns. At each of the first intersecting portions 44, the first wire 41 and the second wire 42 intersect each other at one time between the first winding portions 43 adjacent to each other in the length direction Ld. For this reason, the first winding portions 43 on both sides of each first intersecting portion 44 in the length direction Ld have opposite polarities. There are an even number of such structures, which enables the polarity of the winding portion 40*a* to balance.

The first wire 41 and the second wire 42 intersect each other to form the second intersecting portion 45 along the first side surface 11*c* of the winding core portion 11 in the first winding portion 43 of the winding portion 40*a* at the position nearest to the second flange portion 13. For this reason, the second intersecting portion 45 is not formed to be adjacent in the length direction Ld of the first winding portions 43, and the winding portion 40*a* is inhibited from being excessively close to the third terminal electrode 33 and the fourth terminal electrode 34 of the second flange portion 13. Accordingly, the quality of the coil component 1 is improved. In the case where the first wire 41 and the second wire 42 are connected to the third terminal electrode 33 and the fourth terminal electrode 34, the first wire 41 and the second wire 42 can be gently bent, and the risk of breakage of the first wire 41 and the second wire 42 can be reduced.

(17) The second intersecting portion 45 is formed along the first side surface 11*c* of the winding core portion 11 in the first winding portion 43 of the winding portion 40*a* at the position nearest to the second flange portion 13. With this structure, from the intersection between the first wire 41 and the second wire 42 at the second intersecting portion 45, the first wire 41 can extend toward the third terminal electrode 33, and the second wire 42 can extend toward the fourth terminal electrode 34. Accordingly, the degree of freedom of the first wire 41 and the second wire 42 that are connected to the third terminal electrode 33 and the fourth terminal electrode 34 increases. In addition, the first wire 41 and the second wire 42 can be connected to the third terminal electrode 33 and the fourth terminal electrode 34 with the first wire 41 and the second wire 42 gently bent, and a stress can be inhibited from concentrating on the second extension portion 40*c* and the fourth extension portion 40*e*.

(18) The winding portion 40*a* is formed by winding the first wire 41 and the second wire 42 in a bifilar winding manner. With this structure, the first wire 41 and the second wire 42 adjacent each other in the length direction Ld of the winding portion 40*a* enable the noise of the first wire 41 and the noise of the second wire 42 to cancel out each other. Accordingly, the quality of the coil component 1 can be improved.

(19) The second wire 42 includes the first end portion 42*a* that extends in the length direction Ld, the first bent portion 42*c* that is bent from the first end portion 42*a* toward the outer surface 12*b* of the first flange portion 12, and the second bent portion 42*d* that is bent from the first bent portion 42*c* in the width direction Wd. With this structure, the first bent portion 42*c* and the second bent portion 42*d* enable the third extension portion 40*d* to be disposed near the first flange portion 12. Accordingly, the extension portion 40*b* of the second wire 42 can be appropriately placed on the sloping portion 16 of the first flange portion 12.

(20) The third extension portion 40*d* is disposed so as to extend along the sloping portion 16 of the first flange portion 12. With this structure, it is not necessary to use a so-called point-to-point construction in which the third extension portion 40*d* is disposed so as to be spaced from the first flange portion 12 in the height direction Td, and the risk of breakage of the second wire 42 can be reduced. The second extension portion 40*c* is disposed so as to extend along the sloping portion 20 of the second flange portion 13. With this structure, the second extension portion 40*c* is inhibited from being disposed so as to be spaced from the second flange portion 13 in the height direction Td, and the risk of breakage of the first wire 41 can be reduced.

(21) The length LA of the winding portion 40*a* in the length direction Ld along the bottom surface 11*a* of the winding core portion 11 is shorter than the length LB of the winding portion 40*a* along the upper surface 11*b* of the winding core portion 11. With this structure, the distance between the winding portion 40*a* and the land RX of the circuit board PX with the coil component 1 mounted on the circuit board PX is increased. Accordingly, thermal effect on the winding portion 40*a* due to the land RX of the circuit board PX can be further reduced.

(22) The distance LD1 in the length direction Ld between the inner surface 12*a* of the first flange portion 12 and the winding portion 40*a* along the bottom surface 11*a* of the winding core portion 11 is longer than the distance LD3 in the length direction Ld between the inner surface 12*a* of the first flange portion 12 and the winding portion 40*a* along the upper surface 11*b* of the winding core portion 11, or the distance LD4 in the length direction Ld between the inner surface 13*a* of the second flange portion 13 and the winding portion 40*a* along the upper surface 11*b* of the winding core portion 11, or both. With this structure, the distance between the winding portion 40*a* and the land RX of the circuit board PX with the coil component 1 mounted on the circuit board PX is increased. Accordingly, the thermal effect on the winding portion 40*a* due to the land RX of the circuit board PX can be further reduced.

The distance LD2 in the length direction Ld between the inner surface 13*a* of the second flange portion 13 and the winding portion 40*a* along the bottom surface 11*a* of the winding core portion 11 is longer than the distance LD3 in the length direction Ld between the inner surface 12*a* of the first flange portion 12 and the winding portion 40*a* along the upper surface 11*b* of the winding core portion 11, or the distance LD4 in the length direction Ld between the inner surface 13*a* of the second flange portion 13 and the winding portion 40*a* along the upper surface 11*b* of the winding core portion 11, or both. Accordingly, the second flange portion 13 enables the thermal effect on the winding portion 40*a* due to the land RX of the circuit board PX to be further reduced as in the first flange portion 12.

(23) The distance in the length direction Ld between the winding portion 40*a* along the bottom surface 11*a* of the winding core portion 11 and the inner surface 13*a* of the second flange portion 13 is longer than the distance between the winding portion 40*a* along the bottom surface 11*a* of the winding core portion 11 and the inner surface 12*a* of the first flange portion 12. This structure ensures the space in which the first wire 41 and the second wire 42 extend from the winding portion 40*a* at the second extension portion 40*c* and the fourth extension portion 40*e* and increases the degree of freedom of the first wire 41 and the second wire 42 at the end of winding.

(24) The distance in the height direction Td between an end portion of the first flange portion 12 and the bottom surface 11*a* of the winding core portion 11 is longer than the distance in the height direction Td between the other end portion of the first flange portion 12 and the upper surface 11*b* of the winding core portion 11. With this structure, the distance in the height direction Td between the winding portion 40*a* and the circuit board PX with the coil component 1 mounted on the circuit board PX is increased. Accordingly, thermal effect on the winding portion 40*a* due to the circuit board PX can be further reduced. The structure of the second flange portion 13 may be the same as the structure of the first flange portion 12, and the thermal effect can be further reduced.

(25) The first wire 41 and the second wire 42 that form the first intersecting portions 44 intersect each other along the upper surface 11*b* of the winding core portion 11. With this structure, the distance in the height direction Td between the winding portion 40*a* and a main surface of the circuit board PX with the coil component 1 mounted on the circuit board PX is longer than that in the case where the first wire 41 and the second wire 42 that form the first intersecting portions 44 intersect each other along the bottom surface 11*a* of the winding core portion 11. Accordingly, thermal effect of the circuit board PX and the terminal electrodes 31 to 34 on the winding portion 40*a* can be further reduced when the coil component 1 is mounted on the circuit board PX.

Modification

The above embodiment is one of embodiments of a coil component and a method of manufacturing the coil component according to the present disclosure. There is no intention to limit the embodiments. The embodiments of the coil component and the method of manufacturing of the coil component according to the present disclosure can differ from the embodiment described above by way of example. One of the embodiments is obtained by replacing, modifying, or omitting a feature of the above embodiment, or by adding a new feature into the above embodiment. According to modifications described below, components common to those according to the above embodiment are designated by reference characters like to those according to the above embodiment, and a description thereof is omitted.

Modification Related to Shape of First Flange Portion and Shape of Second Flange Portion According to the above embodiment, the protruding portions 15*a* and 15*b* may be omitted from the first flange portion 12. In this case, for example, the leg portions 14*a* and 14*b* are formed up to a region that contains the protruding portions 15*a* and 15*b*. In this case, the first end portion 41*a* of the first wire 41 is connected to the first bottom surface electrode 31*a* of the first terminal electrode 31 that is formed on the leg portion 14*a*, and the first end portion 42*a* of the second wire 42 is connected to the second bottom surface electrode 32*a* of the second terminal electrode 32 that is formed on the leg portion 14*b*.

According to the above embodiment, the protruding portions 19*a* and 19*b* may be omitted from the second flange portion 13. In this case, for example, the leg portions 18*a* and 18*b* are formed up to a region that contains the protruding portions 19*a* and 19*b*. In this case, the second end portion 41*b* of the first wire 41 is connected to the third bottom surface electrode 33*a* of the third terminal electrode 33 that is formed on the leg portion 18*a*, and the second end portion 42*b* of the second wire 42 is connected to the fourth bottom surface electrode 34*a* of the fourth terminal electrode 34 that is formed on the leg portion 18*b*.

According to the above embodiment, the inner surface 12*a* of a bottom part (end portion of the first flange portion 12 that protrudes toward the bottom surface 11*a* of the winding core portion 11) of the first flange portion 12 in the height direction Td, or a bottom part (end portion of the second flange portion 13 that protrudes toward the bottom surface 11*a* of the winding core portion 11) of the second flange portion 13 in the height direction Td, or both may extend in the height direction Td.

According to the above embodiment, the inner surface 12*a* of a top part (end portion of the first flange portion 12 that protrudes toward the upper surface 11*b* of the winding core portion 11) of the first flange portion 12 in the height direction Td, or a top part (end portion of the second flange portion 13 that protrudes toward the upper surface 11*b* of the winding core portion 11) of the second flange portion 13 in the height direction Td, or both may slope in the length direction Ld away from the winding core portion 11 while extending in the height direction Td away from the upper surface 11*b*.

Modification Related to Connection Among Winding Core Portion, First Flange Portion, and Second Flange Portion According to the above embodiment, the shape of the first curved portion 22 that connects the inner surface 12*a* of the first flange portion 12 and the bottom surface 11*a* of the winding core portion 11 of the core 10 to each other, or the shape of the second curved portion 23 that connects the inner surface 13*a* of the second flange portion 13 and the bottom surface 11*a* of the winding core portion 11 to each other, or both can be freely changed. The curvature of the curve of the first curved portion 22 may vary at positions in the length direction Ld from the bottom surface 11*a* of the winding core portion 11 to the inner surface 12*a* of the first flange portion 12 in a section perpendicular to the width direction Wd. The variation in the curvature of the first curved portion 22 between the winding core portion 11 and the first flange portion 12 enables the deflection strength of the core 10 to be increased, and enables the length of the first flange portion 12 to be inhibited from being excessively decreased in the length direction Ld. Accordingly, the length of the first terminal electrode 31 is inhibited from being excessively decreased in the length direction Ld, and the coil component 1 can be appropriately mounted on the circuit board PX. The second curved portion 23 that has the same shape as the first curved portion 22 achieves the same effect.

Figure 18A:
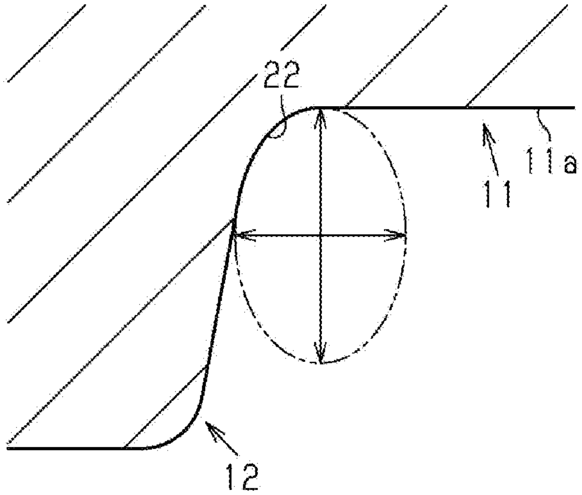
FIG. 18A is a sectional view of a connection between the bottom surface of the winding core portion and the first flange portion according to a modification.

For example, as illustrated in FIG. 18A, the first curved portion 22 is formed to have a curved shape along a part of a substantially elliptic shape (imaginary circle of the two-dot chain line) having a major axis in the height direction Td and a minor axis in the length direction Ld in a section parallel to the length direction Ld and to the height direction Td (perpendicular to the width direction Wd). With this structure, a flat portion of the bottom surface 11*a* of the winding core portion 11 that extends in the length direction Ld and in the width direction Wd is enlarged in the length direction Ld. Accordingly, a range in the length direction Ld in which the winding portion 40*a* can be formed is increased, and the number of turns of the coil 40 can be increased. The shape of the second curved portion 23 can be changed into the same shape as that of the first curved portion 22 in FIG. 18A.

Figure 18B:
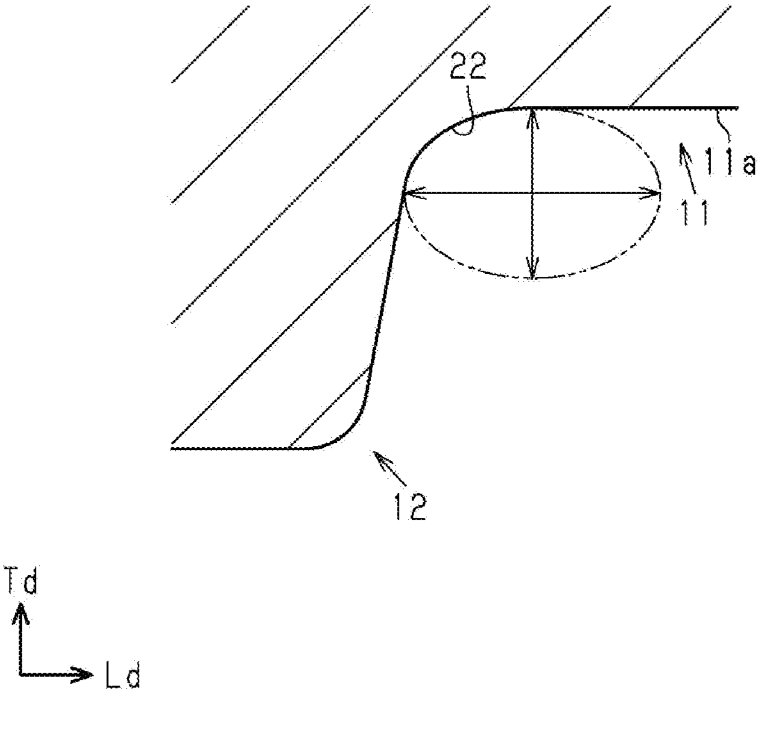
FIG. 18B is an enlarged view of the connection between the bottom surface of the winding core portion and the first flange portion according to the modification.

As illustrated in FIG. 18B, the first curved portion 22 has a substantially elliptic shape in a section parallel to the length direction Ld and to the height direction Td (perpendicular to the width direction Wd) and is formed to have a curved shape along a part of a substantially elliptic shape (imaginary circle of the two-dot chain line) having a major axis in the length direction Ld and a minor axis in the height direction Td. With this structure, the first wire 41 and the second wire 42 can be wound around the winding core portion 11 also at the first curved portion 22. Accordingly, the range in the length direction Ld in which the winding portion 40*a* can be formed is increased, and the number of the turns of the coil 40 can be increased. The shape of the second curved portion 23 can be changed into the same shape as that of the first curved portion 22 in FIG. 18B.

According to the above embodiment, the first curved portion 22 and the second curved portion 23 may have different shapes in a section parallel to the length direction Ld and to the height direction Td (perpendicular to the width direction Wd). For example, the first curved portion 22 or the second curved portion 23 has a curve of a substantially true-circular shape in a section perpendicular to the width direction Wd, and the curvature of the other curved portion of the first curved portion 22 and the second curved portion 23 varies in a section perpendicular to the width direction Wd as in the case of a substantially elliptic shape. The third curved portion 24 and the fourth curved portion 25 may have different shapes in a section perpendicular to the width direction Wd.

According to the above embodiment, the length of the first curved portion 22, or the second curved portion 23, or both in the height direction Td may be equal to or shorter than the lengths of the third curved portion 24 and of the fourth curved portion 25 in the height direction Td in a section perpendicular to the width direction Wd.

According to the above embodiment, the length of the first curved portion 22, or the second curved portion 23, or both in the length direction Ld may be equal to or shorter than the lengths of the third curved portion 24 and of the fourth curved portion 25 in the length direction Ld in a section perpendicular to the width direction Wd.

According to the above embodiment, the first curved portion 22 may be omitted from the connection between the inner surface 12*a* of the first flange portion 12 and the portion nearer than the center of the winding core portion 11 in the width direction Wd to the first side surface 12*e* of the first flange portion 12. In this case, for example, the bottom surface 11*a* of the winding core portion 11 is flush with the sloping portion 16 that corresponds to the portion nearer than the center of the winding core portion 11 in the width direction Wd to the first side surface 12*e* of the first flange portion 12.

According to the above embodiment, the second curved portion 23 may be omitted from the connection between the inner surface 13*a* of the second flange portion 13 and the portion nearer than the center of the winding core portion 11 in the width direction Wd to the second side surface 13*f* of the second flange portion 13. In this case, for example, the bottom surface 11*a* of the winding core portion 11 is flush with the sloping portion 20 that corresponds to the portion nearer than the center of the winding core portion 11 in the width direction Wd to the second side surface 13*f* of the second flange portion 13.

According to the above embodiment, when the ratio of the length of the first curved portion 22 in the height direction Td to the distance in the height direction Td between the bottom surface 11*a* of the winding core portion 11 and the first terminal electrode 31 is no less than 20% and less than 60% (i.e., from 20% to less than 60%), the ratio of the length of the second curved portion 23 in the height direction Td to the distance in the height direction Td between the bottom surface 11*a* of the winding core portion 11 and the third terminal electrode 33 may be less than 20% or larger than 60%.

According to the above embodiment, when the ratio of the length of the second curved portion 23 in the height direction Td to the distance in the height direction Td between the bottom surface 11*a* of the winding core portion 11 and the third terminal electrode 33 is no less than 20% and less than 60% (i.e., from 20% to less than 60%), the ratio of the length of the first curved portion 22 in the height direction Td to the distance in the height direction Td between the bottom surface 11*a* of the winding core portion 11 and the first terminal electrode 31 may be less than 20% or larger than 60%.

According to the above embodiment, the ratio of the length of the first curved portion 22 in the height direction Td to the distance in the height direction Td between the bottom surface 11*a* of the winding core portion 11 and the first terminal electrode 31, or the ratio of the length of the second curved portion 23 in the height direction Td to the distance in the height direction Td between the bottom surface 11*a* of the winding core portion 11 and the third terminal electrode 33, or both may be less than 20% or larger than 60%.

When the ratio of the length of the first curved portion 22 in the height direction Td to the distance in the height direction Td between the bottom surface 11*a* of the winding core portion 11 and the first terminal electrode 31 is less than 20% or larger than 60%, the curvature of the curve of the first curved portion 22 preferably varies at positions in the length direction Ld from the bottom surface 11*a* of the winding core portion 11 to the inner surface 12*a* of the first flange portion 12 in a section perpendicular to the width direction Wd.

When the ratio of the length of the second curved portion 23 in the height direction Td to the distance in the height direction Td between the bottom surface 11*a* of the winding core portion 11 and the third terminal electrode 33 is less than 20% or larger than 60%, the curvature of the curve of the second curved portion 23 preferably varies at positions in the length direction Ld from the bottom surface 11*a* of the winding core portion 11 to the inner surface 13*a* of the second flange portion 13 in a section perpendicular to the width direction Wd.

When the ratio of the length of the first curved portion 22 in the height direction Td to the distance in the height direction Td between the bottom surface 11*a* of the winding core portion 11 and the first terminal electrode 31 and the ratio of the length of the second curved portion 23 in the height direction Td to the distance in the height direction Td between the bottom surface 11*a* of the winding core portion 11 and the third terminal electrode 33 are less than 20% or larger than 60%, the curvature of the curve of the first curved portion 22 preferably varies at positions in the length direction Ld from the bottom surface 11*a* of the winding core portion 11 to the inner surface 12*a* of the first flange portion 12 in a section perpendicular to the width direction Wd. In addition, the curvature of the curve of the second curved portion 23 preferably varies at positions in the length direction Ld from the bottom surface 11*a* of the winding core portion 11 to the inner surface 13*a* of the second flange portion 13 in a section perpendicular to the width direction Wd.

According to the above embodiment, the ratio of the length of the third curved portion 24 in the height direction Td to the distance in the height direction Td between the upper surface 11*b* of the winding core portion 11 and the upper surface 12*c* of the first flange portion 12, or the ratio of the length of the fourth curved portion 25 in the height direction Td to the distance in the height direction Td between the upper surface 11*b* of the winding core portion 11 and the upper surface 13*c* of the second flange portion 13, or both may be no less than 20% and no more than 60% (i.e., from 20% to less than 60%). With this structure, when the ratio of the length of the third curved portion 24 in the height direction Td to the distance in the height direction Td between the upper surface 11*b* of the winding core portion 11 and the upper surface 12*c* of the first flange portion 12, or the ratio of the length of the fourth curved portion 25 in the height direction Td to the distance in the height direction Td between the upper surface 11*b* of the winding core portion 11 and the upper surface 13*c* of the second flange portion 13, or both are 20% or more, the length of the third curved portion 24, or the length of the fourth curved portion 25, or both can be increased, and the flexural strength between the winding core portion 11 and the first flange portion 12, or the flexural strength between the winding core portion 11 and the second flange portion 13, or both can be increased. Accordingly, the deflection strength of the core 10 can be increased. When the ratio of the length of the third curved portion 24 in the height direction Td to the distance in the height direction Td between the upper surface 11*b* of the winding core portion 11 and the upper surface 12*c* of the first flange portion 12, or the ratio of the length of the fourth curved portion 25 in the height direction Td to the distance in the height direction Td between the upper surface 11*b* of the winding core portion 11 and the upper surface 13*c* of the second flange portion 13, or both are 60% or less, the length of the first flange portion 12, or the length of the second flange portion 13, or both can be inhibited from being excessively decreased in the length direction Ld. Accordingly, the length of the upper surface 12*c* of the first flange portion 12 and the length of the upper surface 13*c* of the second flange portion 13 are inhibited from being excessively decreased in the length direction Ld, and the strength of adhesion between the core 10 and the plate member 50 can be ensured.

According to the above embodiment, the shape of the third curved portion 24, or the shape of the fourth curved portion 25, or both may be changed into a substantially elliptic shape as in the first curved portion 22 illustrated in FIG. 18A and the second curved portion 23 illustrated in FIG. 18B. That is, the curvature of the third curved portion 24, or the curvature of the fourth curved portion 25, or both may vary at positions from the upper surface 11*b* of the winding core portion 11 to the inner surface 12*a* of the first flange portion 12 or the inner surface 13*a* of the second flange portion 13.

Modification Related to Connection Structures Between First Flange Portion and Plate Member and Between Second Flange Portion and Plate Member of Core According to the above embodiment, the connection structures between the first flange portion 12 and the plate member 50 and between the second flange portion 13 and the plate member 50 can be freely changed.

Figure 19A:
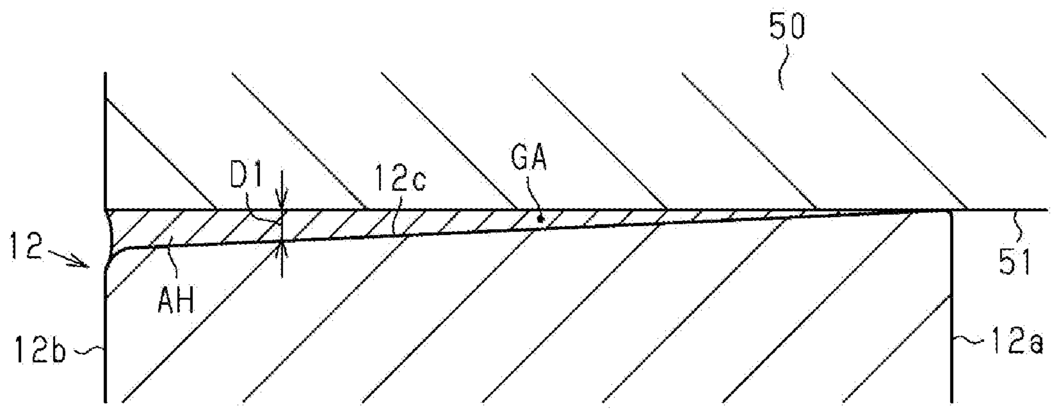
FIG. 19A to FIG. 19C illustrate sectional views of the connection structure between the plate member and the first flange portion according to a modification.

In the first example, as illustrated in FIG. 19A, a portion of the upper surface 12*c* of the first flange portion 12 near the inner surface 12*a* of the first flange portion 12 is in contact with the plate member 50. The distance D1 between the upper surface 12*c* of the first flange portion 12 and the first surface 51 of the plate member 50 gradually increases in the direction from the inner surface 12*a* of the first flange portion 12 toward the outer surface 12*b*. In other words, the distance D1 at a position on the first flange portion 12 nearer than the center of the first flange portion 12 in the length direction Ld to the winding core portion 11 is shorter than the distance D1 at a position on the opposite side of the center in the length direction Ld from the winding core portion 11. That is, the length of the gap GA in the height direction Td between the first flange portion 12 and the plate member 50 gradually increases in the direction from the inner surface 12*a* of the first flange portion 12 toward the outer surface 12*b*. In other words, the length of the gap GA in the height direction Td gradually decreases in the length direction Ld toward the winding core portion 11. The position at which the distance in the height direction Td between the first surface 51 of the plate member 50 and the upper surface 12*c* of the first flange portion 12 decreases is near the inner surface 12*a* of the first flange portion 12. With this structure, when the plate member 50 is composed of a magnetic material, the length of the magnetic circuit that is formed by the core 10 and the plate member 50 can be decreased. The second flange portion 13 that has the same structure as that of the first flange portion 12 enables the length of the magnetic circuit to be decreased.

Figure 19B:
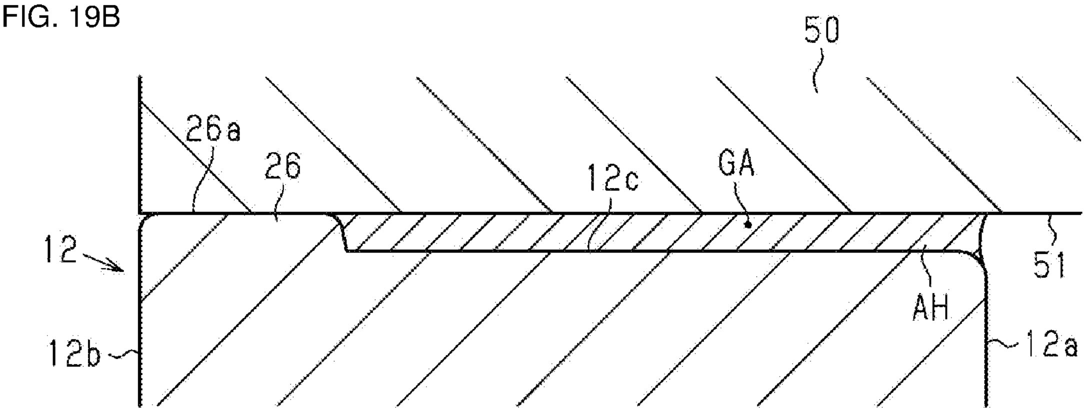

In the second example, as illustrated in FIG. 19B, a projecting portion 26 is disposed on the upper surface 12*c* of the first flange portion 12 near the outer surface 12*b* of the first flange portion 12. The projecting portion 26 may be disposed on the entire part of the first flange portion 12 in the width direction Wd or may be disposed on a part of the first flange portion 12 in the width direction Wd. The projecting portions 26 may be arranged in the width direction Wd at intervals. The distance in the height direction Td between the plate member 50 and the first flange portion 12 near the outer surface 12*b* is shorter than the distance between the plate member 50 and the first flange portion 12 near the inner surface 12*a*. In other words, the length of the gap in the height direction Td between the plate member 50 and the first flange portion 12 near the inner surface 12*a* is longer than the length of the gap in the height direction Td between the plate member 50 and the first flange portion 12 near the outer surface 12*b*. With this structure, when the plate member 50 is composed of a magnetic material, the magnetic circuit between the core 10 and the plate member 50 is restricted because the distance in the height direction Td between the first surface 51 of the plate member 50 and the upper surface 12*c* of the first flange portion 12 partly decreases due to the projecting portion 26 between the plate member 50 and the first flange portion 12. Accordingly, the variation in the length of the magnetic circuit in the coil component 1 is decreased, and the inductance value of the coil component 1 can be inhibited from varying. The second flange portion 13 that has the same structure as that of the first flange portion 12 enables the inductance value to be further inhibited from varying.

In FIG. 19B, the adhesive AH is applied to an end surface 26*a* of the projecting portion 26 and the upper surface 12*c* of the first flange portion 12, or the adhesive AH is applied to the first surface 51 of the plate member 50 that faces the first flange portion 12. The plate member 50 is mounted on the projecting portion 26. In this case, for example, the adhesive AH between the projecting portion 26 of the first flange portion 12 and the first surface 51 of the plate member 50 moves to the gap that is formed nearer than the projecting portion 26 to the inner surface 12*a* of the first flange portion 12 when pressed by the projecting portion 26 and the plate member 50. For this reason, the adhesive AH is inhibited from protruding to the outside of the core 10 and the plate member 50. The second flange portion 13 that has the same structure as that of the first flange portion 12 enables the adhesive AH to be further inhibited from protruding.

Figure 19C:
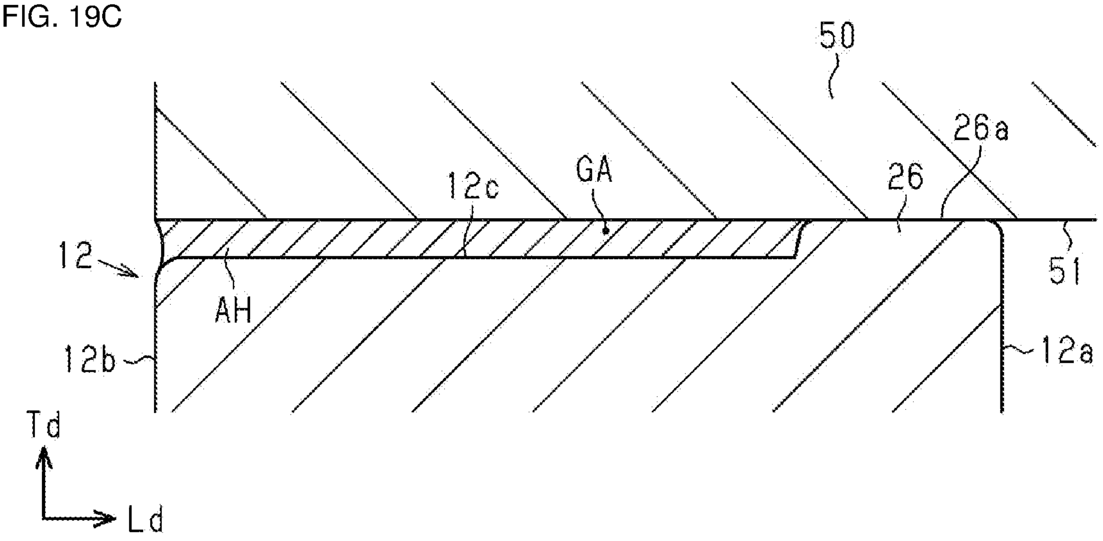

As illustrated in FIG. 19C, the projecting portion 26 may be disposed on the portion of the upper surface 12*c* of the first flange portion 12 near the inner surface 12*a* of the first flange portion 12. In this case, the distance in the height direction Td between the plate member 50 and the first flange portion 12 near the inner surface 12*a* is shorter than the distance between the plate member 50 and the first flange portion 12 near the outer surface 12*b*. In other words, the length of the gap in the height direction Td between the plate member 50 and the first flange portion 12 near the outer surface 12*b* is longer than the length of the gap in the height direction Td between the plate member 50 and the first flange portion 12 near the inner surface 12*a*. With this structure, when the plate member 50 is composed of a magnetic material, the length of the magnetic circuit that is formed by the core 10 and the plate member 50 can be decreased. The second flange portion 13 that has the same structure as that of the first flange portion 12 enables the length of the magnetic circuit to be further decreased.

The position of the projecting portion 26 in the length direction Ld is not limited to the end portion of the upper surface 12*c* of the first flange portion 12 near the outer surface 12*b* or near the inner surface 12*a* and can be freely changed. For example, the projecting portion 26 may be disposed on the upper surface 12*c* of the first flange portion 12 at the center of the upper surface 12*c* in the length direction Ld. The structure of the second flange portion 13 can be the same as that of the first flange portion 12.

Figure 20:
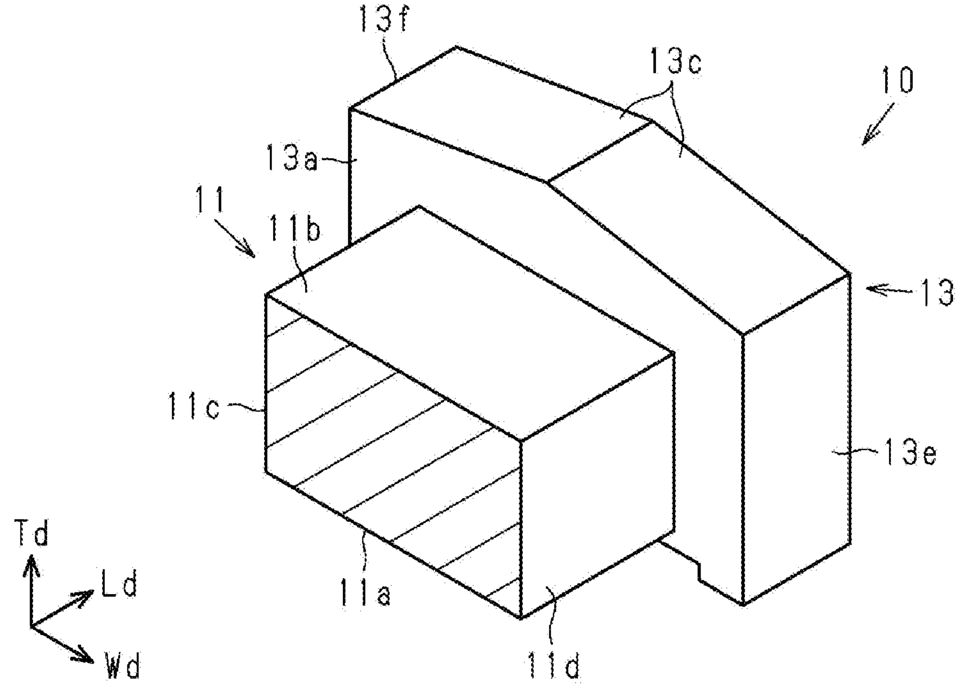
FIG. 20 is a perspective, sectional view of the core and illustrates the second flange portion according to the modification.
Figure 21:
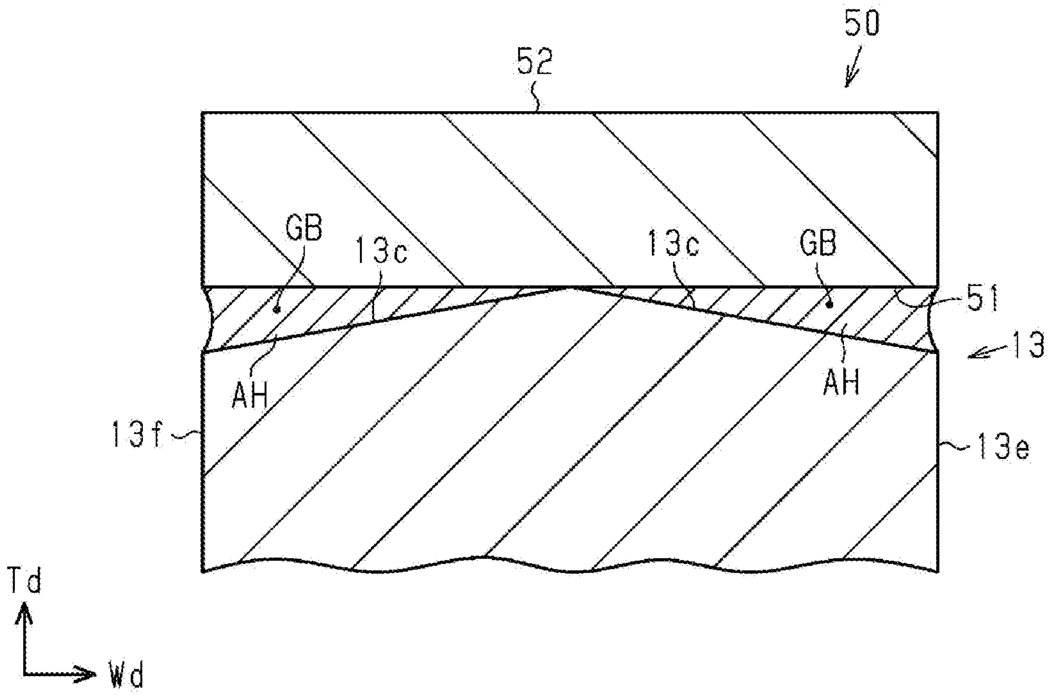
FIG. 21 is a sectional view of the connection structure between the second flange portion and the plate member according to the modification.

According to the modification illustrated in FIG. 19A to FIG. 19C, the distance in the height direction Td between the upper surface 12*c* of the first flange portion 12 (the upper surface 13*c* of the second flange portion 13) and the first surface 51 of the plate member 50 varies in the length direction Ld but is not limited thereto. For example, as illustrated in FIG. 20 to FIG. 22B, the distance in the height direction Td between the upper surface 13*c* of the second flange portion 13 and the first surface 51 of the plate member 50 may vary in the width direction Wd. In FIG. 20 and FIG. 21, an illustration of the recessed portions 21*a* and 21*b* of the second flange portion 13 is omitted for convenience, and the core 10 is schematically illustrated.

In the first example, as illustrated in FIG. 20, the upper surface 13*c* of the second flange portion 13 has a ridge at the center thereof in the width direction Wd and slopes toward the bottom surface 13*d* while extending in the direction toward the first side surface 13*e* and toward the second side surface 13*f* of the second flange portion 13. In this case, as illustrated in FIG. 21, in the connection structure between the second flange portion 13 and the plate member 50, the distance in the height direction Td between the upper surface 13*c* of the second flange portion 13 and the first surface 51 of the plate member 50 gradually decreases in the width direction Wd from the first side surface 13*e* to the center of the second flange portion 13 and from the second side surface 13*f* of the second flange portion 13 to the center of the second flange portion 13. In other words, the distance in the height direction Td between the upper surface 13*c* of the second flange portion 13 and the first surface 51 of the plate member 50 gradually increases in the direction toward the first side surface 13*e* and toward the second side surface 13*f* of the second flange portion 13. With this structure, when the plate member 50 is composed of a magnetic material, the distance in the height direction Td between the first surface 51 of the plate member 50 and the upper surface 13*c* of the second flange portion 13 partly decreases between the plate member 50 and the second flange portion 13, and the magnetic circuit between the core 10 and the plate member 50 is restricted. Accordingly, the variation in the length of the magnetic circuit in the coil component 1 is decreased, and the inductance value of the coil component 1 can be inhibited from varying. The first flange portion 12 that has the same structure as that of the second flange portion 13 enables the inductance value to be further inhibited from varying.

In the case where the plate member 50 and the second flange portion 13 are secured to each other with the adhesive AH, the adhesive AH at the center in the width direction Wd between the first surface 51 of the plate member 50 and the upper surface 13*c* of the second flange portion 13 moves toward each end portion of the upper surface 13*c* of the second flange portion 13 in the width direction Wd at which the gap between the first surface 51 of the plate member 50 and the upper surface 13*c* of the second flange portion 13 increases. For this reason, the adhesive AH is inhibited from protruding to the outside of the core 10 and the plate member 50. The first flange portion 12 that has the same structure as that of the second flange portion 13 enables the adhesive AH to be further inhibited from protruding.

Figure 22A:
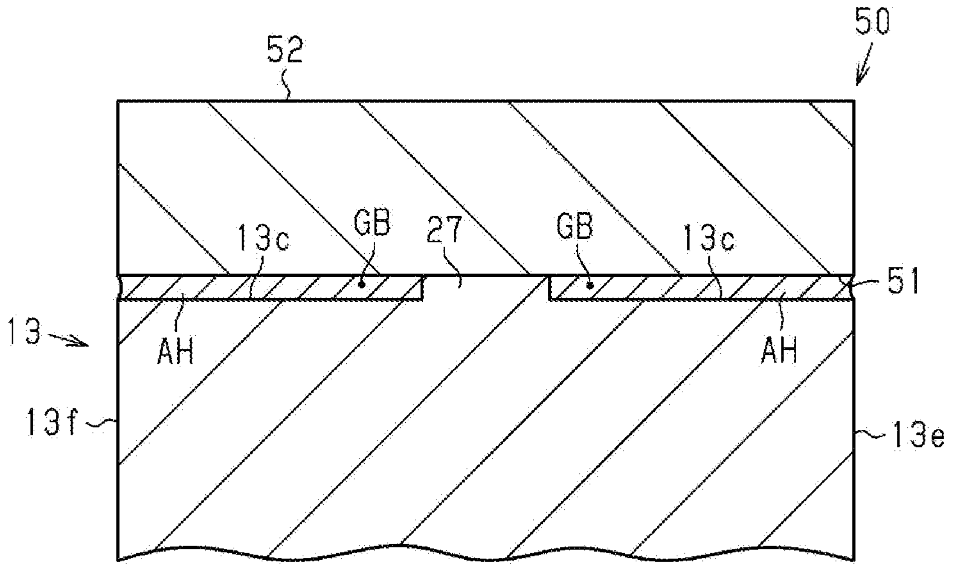
FIG. 22A and FIG. 22B illustrate sectional views of the connection structure between the second flange portion and the plate member according to the modification.

In the second example, as illustrated in FIG. 22A, a projecting portion 27 is disposed on the upper surface 13*c* of the second flange portion 13 at the center of the upper surface 13*c* in the width direction Wd. The projecting portion 27 may be disposed on the entire portion of the upper surface 13*c* of the second flange portion 13 in the length direction Ld or may be disposed on a part of the upper surface 13*c*. The projecting portions 27 may be arranged in the width direction Wd at intervals. The projecting portions 27 may be arranged in the length direction Ld at intervals. Because of the projecting portion 27, the distance in the height direction Td between each end portion of the upper surface 13*c* of the second flange portion 13 in the width direction Wd and the first surface 51 of the plate member 50 is longer than the distance in the height direction Td between the center of the upper surface 13*c* of the second flange portion 13 in the width direction Wd and the first surface 51 of the plate member 50. In other words, the length of the gap in the height direction Td between each end portion of the second flange portion 13 in the width direction Wd and the plate member 50 is longer than the length of the gap in the height direction Td between the center of the second flange portion 13 in the width direction Wd and the plate member 50. With this structure, the same effect as that of the structure in the first example illustrated in FIG. 20 and FIG. 21 is achieved. The first flange portion 12 that has the same structure as that of the second flange portion 13 achieves the same effect.

Figure 22B:
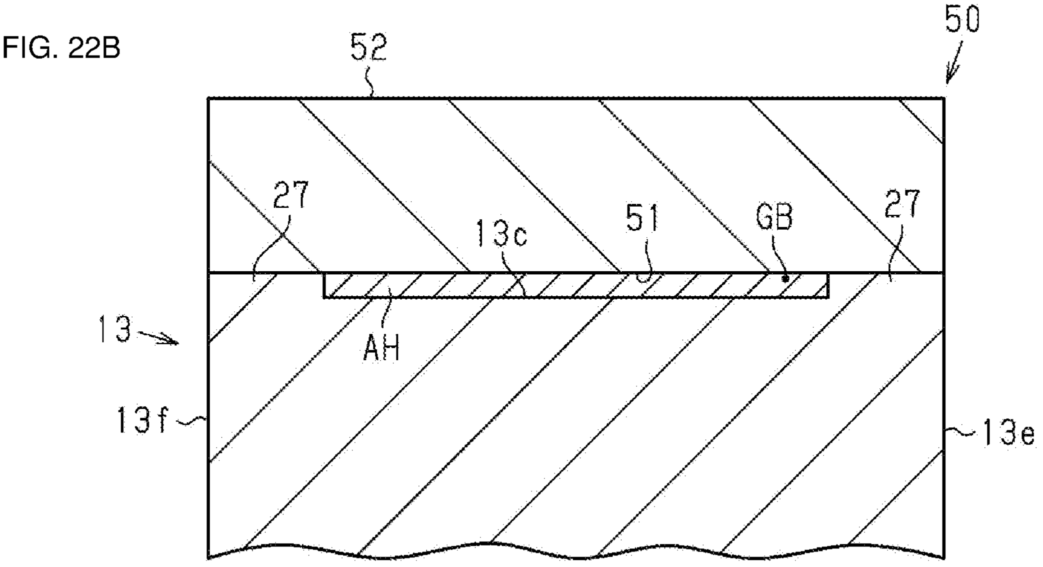

In the third example, as illustrated in FIG. 22B, the projecting portions 27 are disposed on both end portions of the upper surface 13*c* of the second flange portion 13 in the width direction Wd. In this case, the distance in the height direction Td between the center of the upper surface 13*c* of the second flange portion 13 in the width direction Wd and the first surface 51 of the plate member 50 is longer than the distances in the height direction Td between both end portions of the upper surface 13*c* of the second flange portion 13 in the width direction Wd and the first surface 51 of the plate member 50. In other words, the length of the gap in the height direction Td between the center of the second flange portion 13 in the width direction Wd and the plate member 50 is longer than the lengths of the gap in the height direction Td between both end portions of the second flange portion 13 in the width direction Wd and the plate member 50. With this structure, the magnetic circuit between the plate member 50 and the second flange portion 13 is restricted by the projecting portions 27, and the variation in the length of the magnetic circuit in the coil component 1 is decreased. Accordingly, the inductance value of the coil component 1 can be inhibited from varying. The first flange portion 12 that has the same structure as that of the second flange portion 13 enables the inductance value to be further inhibited from varying.

In the case where the plate member 50 and the second flange portion 13 are secured to each other with the adhesive AH, the adhesive AH between the projecting portions 27 on both end portions of the second flange portion 13 in the width direction Wd and the first surface 51 of the plate member 50 moves toward the center of the second flange portion 13 in the width direction Wd at which the length of the gap in the height direction Td between the first surface 51 of the plate member 50 and the second flange portion 13 increases. For this reason, the adhesive AH is inhibited from protruding to the outside of the core 10 and the plate member 50. The first flange portion 12 that has the same structure as that of the second flange portion 13 enables the adhesive AH to be further inhibited from protruding.

According to the above embodiment, the shape of the first flange portion 12 and the shape of the second flange portion 13 are changed to change the distance in the height direction Td between the upper surface 12*c* of the first flange portion 12 and the first surface 51 of the plate member 50 and the distance in the height direction Td between the upper surface 13*c* of the second flange portion 13 and the first surface 51 of the plate member 50. However, this is not a limitation. For example, the shape of the first surface 51 of the plate member 50 may be changed to change the distance in the height direction Td between the upper surface 12*c* of the first flange portion 12 and the first surface 51 of the plate member 50 and the distance in the height direction Td between the upper surface 13*c* of the second flange portion 13 and the first surface 51 of the plate member 50. Specifically, the portion of the first surface 51 of the plate member 50 that faces the first flange portion 12 in the height direction Td may slope so as to be gradually separated in the height direction Td from the upper surface 12*c* of the first flange portion 12 in the direction from the inner surface 12*a* of the first flange portion 12 to the outer surface 12*b*. The portion of the first surface 51 of the plate member 50 that faces the first flange portion 12 in the height direction Td may slope so as to be gradually separated in the height direction Td from the upper surface 12*c* of the first flange portion 12 in the direction from the outer surface 12*b* of the first flange portion 12 to the inner surface 12*a*. A projecting portion (not illustrated) that projects from the first surface 51 toward the upper surface 12*c* of the first flange portion 12 may be disposed on the portion of the first surface 51 of the plate member 50 that faces the first flange portion 12 in the height direction Td. The number and position of the projecting portion can be freely changed. The projecting portion may face the entire portion of the upper surface 12*c* of the first flange portion 12 in the width direction Wd or may face a part of the upper surface 12*c* of the first flange portion 12 in the width direction Wd. The projecting portion may face the entire portion of the upper surface 12*c* of the first flange portion 12 in the length direction Ld or may face a part of the upper surface 12*c* of the first flange portion 12 in the length direction Ld. The portion of the first surface 51 of the plate member 50 that faces the upper surface 13*c* of the second flange portion 13 in the height direction Td can be changed in the same manner as in the portion of the first surface 51 of the plate member 50 that faces the upper surface 12*c* of the first flange portion 12 in the height direction Td. With this structure, the second surface 52 of the plate member 50 can be kept flat, and the suction conveyance device can appropriately convey the coil component 1. The second surface 52 may have the same structure as that of the first surface 51 of the plate member 50. With this structure, there is no difference between the back and front of the plate member 50, it is not necessary to check the front and back of the plate member 50 in the plate member mounting step in which the plate member 50 is mounted on the core 10, and work can be inhibited from being complex.

According to the above embodiment, the distance in the height direction Td between the upper surface 12*c* of the first flange portion 12 or the upper surface 13*c* of the second flange portion 13 and the plate member 50 may vary in the length direction Ld and in the width direction Wd. With this structure, the adhesive AH can be inhibited from protruding to the outside of the core 10 and the plate member 50, and the inductance value can be more accurately set by adjusting the length of the magnetic circuit.

According to the above embodiment, the distance in the height direction Td between the upper surface 12*c* of the first flange portion 12 or the upper surface 13*c* of the second flange portion 13 and the plate member 50 may be constant in the length direction Ld and in the width direction Wd. Also, with this structure, the distance in the height direction Td between the other upper surface of the upper surface 12*c* of the first flange portion 12 and the upper surface 13*c* of the second flange portion 13, and the plate member 50 varies. Accordingly, when the plate member 50 is composed of a magnetic material, the magnetic circuit between the other flange portion of the first flange portion 12 and the second flange portion 13 and the plate member 50 is restricted. Accordingly, the variation in the length of the magnetic circuit in the coil component 1 is decreased, and the inductance value of the coil component 1 can be inhibited from varying.

According to the above embodiment, the distances in the height direction Td between the first flange portion 12 and the plate member 50 and between the second flange portion 13 and the plate member 50 may be constant in the length direction Ld and in the width direction Wd.

Modification Related to Recessed Portion of First Flange Portion and Recessed Portion of Second Flange Portion According to the above embodiment, at least one shape of the shapes of the recessed portions 17*a* and 17*b* of the first flange portion 12 and the shapes of the recessed portions 21*a* and 21*b* of the second flange portion 13 can be freely changed.

Figure 23A:
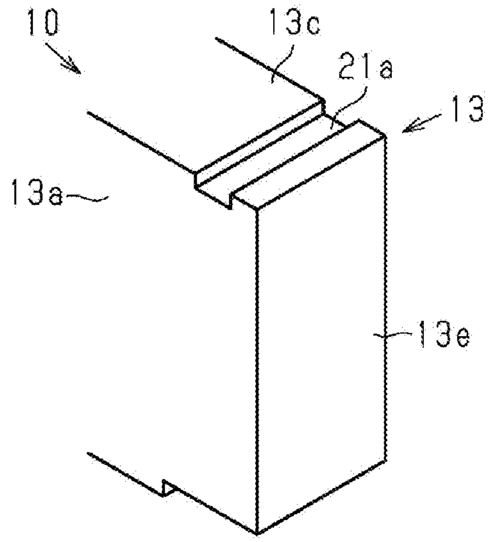
FIG. 23A to FIG. 23C illustrate perspective views of a part of the second flange portion according to the modification.

In the first example, as illustrated in FIG. 23A, the recessed portion 21*a* of the second flange portion 13 may extend from the inner surface 13*a* of the second flange portion 13 to the outer surface 13*b*. With this structure, the recessed portion 21*a* is readily formed when the core 10 is molded. The first flange portion 12 that has the same structure as that of the second flange portion 13 facilitates molding.

Figure 23B:
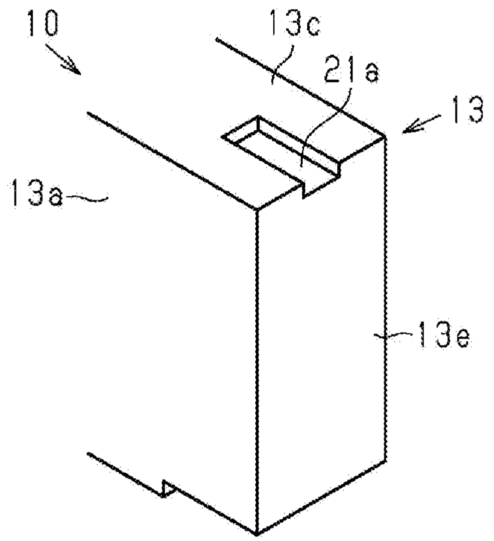

In the second example, as illustrated in FIG. 23B, the longitudinal direction of the recessed portion 21*a* of the second flange portion 13 may coincide with the width direction Wd, and the transverse direction thereof may coincide with the length direction Ld. In this case, as illustrated in FIG. 23B, the recessed portion 21*a* may extend to the second side surface 13*f* of the second flange portion 13. The first flange portion 12 can have the same structure as that of the second flange portion 13.

Figure 23C:
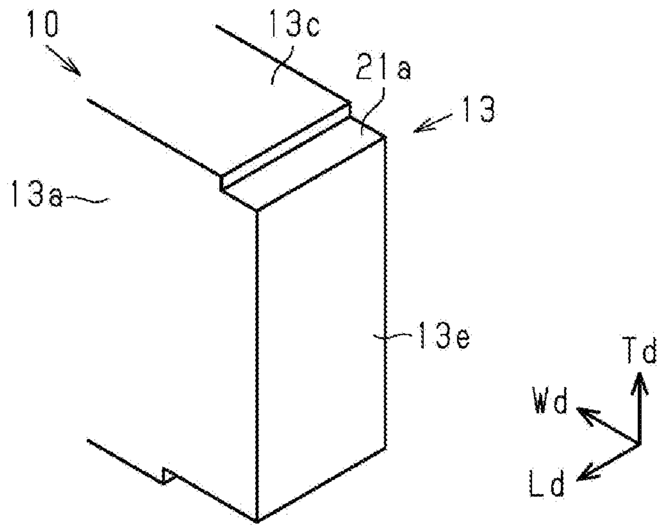

In the third example, as illustrated in FIG. 23C, the recessed portion 21*a* of the second flange portion 13 is formed on the end portion of the second flange portion 13 near the second side surface 13*f* in the width direction Wd. The recessed portion 21*a* extends from the inner surface 13*a* of the second flange portion 13 to the outer surface 13*b* and extends to the second side surface 13*f*. The first flange portion 12 can have the same structure as that of the second flange portion 13.

In the first example and the third example, the length of the recessed portion 21*a* in the length direction Ld can be freely changed. The recessed portion 21*a* may extend from the inner surface 13*a* of the second flange portion 13 to a portion nearer than the outer surface 13*b* of the second flange portion 13 to the inner surface 13*a* in the length direction Ld. The recessed portion 21*a* may extend from the outer surface 13*b* of the second flange portion 13 to a portion nearer than the inner surface 13*a* of the second flange portion 13 to the outer surface 13*b* in the length direction Ld. The first flange portion 12 can have the same structure as that of the second flange portion 13.

According to the above embodiment, each of the shapes of the recessed portions 17*a*, 17*b*, 21*a*, and 21*b* is a substantially rectangular shape when viewed in the height direction Td but is not limited thereto. At least one of the shapes of the recessed portions 17*a*, 17*b*, 21*a*, and 21*b* when viewed in the height direction Td may be a shape other than a substantially rectangular shape, for example, a substantially polygonal shape such as a substantially circular shape, a substantially square shape, or a substantially quadrilateral shape.

According to the above embodiment, the depths of the recessed portions 17*a* and 17*b* are equal to the depths of the recessed portions 21*a* and 21*b* when viewed in the height direction Td but are not limited thereto. The depths of the recessed portions 17*a* and 17*b* may differ from the depths of the recessed portions 21*a* and 21*b*. The depth of the recessed portion 17*a* may differ from the depth of the recessed portion 17*b* when viewed in the height direction Td. The depth of the recessed portion 21*a* may differ from the depth of the recessed portion 21*b*.

According to the above embodiment, the depth of at least one of the recessed portions 17*a*, 17*b*, 21*a*, and 21*b* may vary in the length direction Ld and in the width direction Wd. According to the above embodiment, the positions of the recessed portions 17*a* and 17*b* of the first flange portion 12 can be freely changed. For example, at least one of the recessed portions 17*a* and 17*b* is formed on a portion of the first flange portion 12 that overlaps the winding core portion 11 when viewed in the length direction Ld.

According to the above embodiment, the positions of the recessed portions 21*a* and 21*b* of the second flange portion 13 can be freely changed. For example, at least one of the recessed portions 21*a* and 21*b* may be formed on a portion of the second flange portion 13 that overlaps the winding core portion 11 when viewed in the length direction Ld.

According to the above embodiment, at least one of the recessed portions 17*a* and 17*b* of the first flange portion 12 may be omitted. At least one of the recessed portions 21*a* and 21*b* of the second flange portion 13 may be omitted.

Modification Related to First Wire, Second Wire, and Winding Portion

Figure 24:
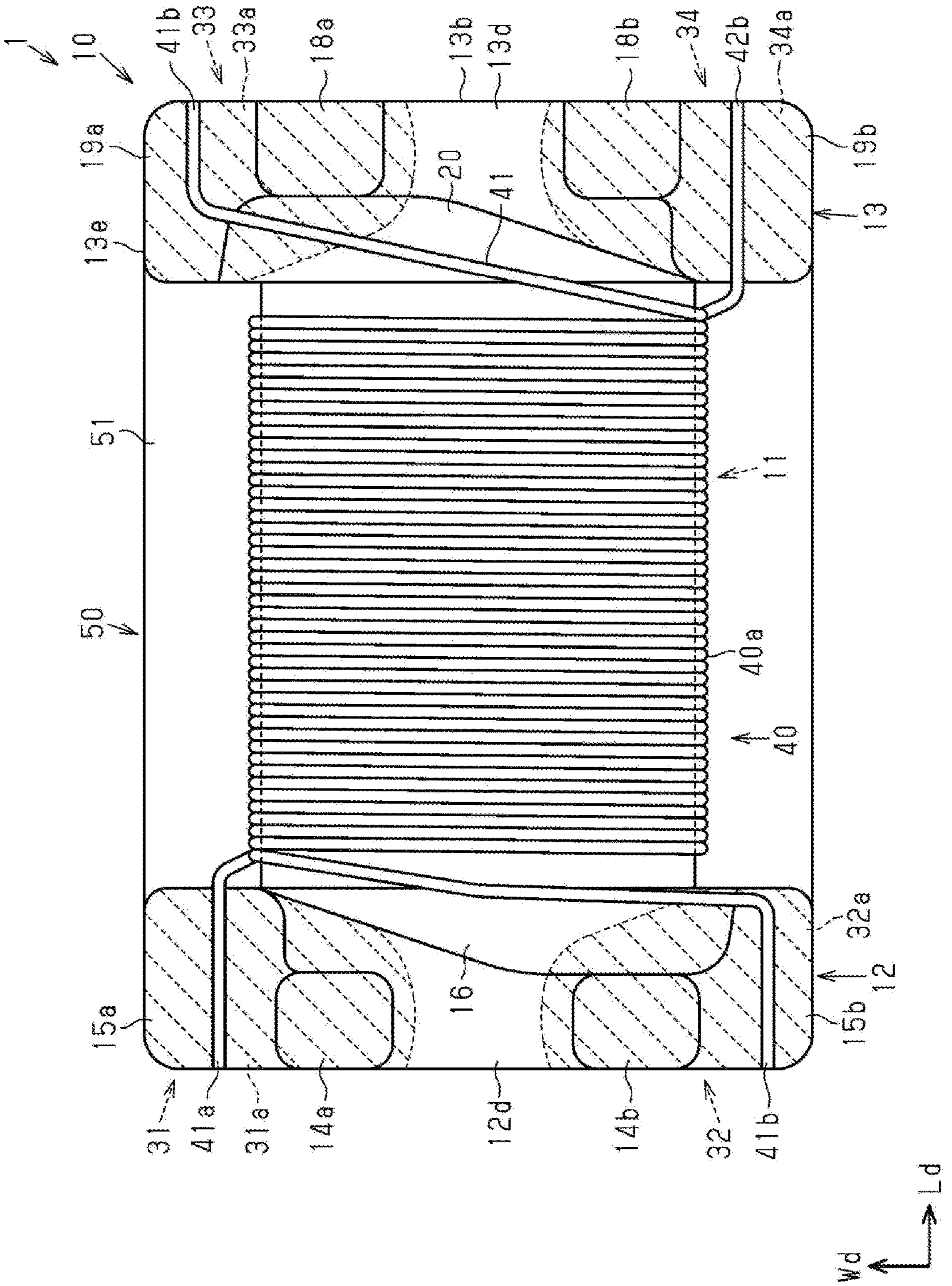
FIG. 24 is a schematic bottom view of a coil component according to a modification.

According to the above embodiment, the shape of a connection between the second end portion 41*b* of the first wire 41 and the third bottom surface electrode 33*a* of the third terminal electrode 33 can be freely changed. In the first example, as illustrated in FIG. 24, the second end portion 41*b* of the first wire 41 is connected to the third bottom surface electrode 33*a* of the third terminal electrode 33 that is formed on the protruding portion 19*a* and that extends in the length direction Ld. In this case, as illustrated in FIG. 24, the first end portion 41*a* and the second end portion 41*b* of the first wire 41 and the first end portion 42*a* and the second end portion 42*b* of the second wire 42 extend in the length direction Ld.

Figure 25A:
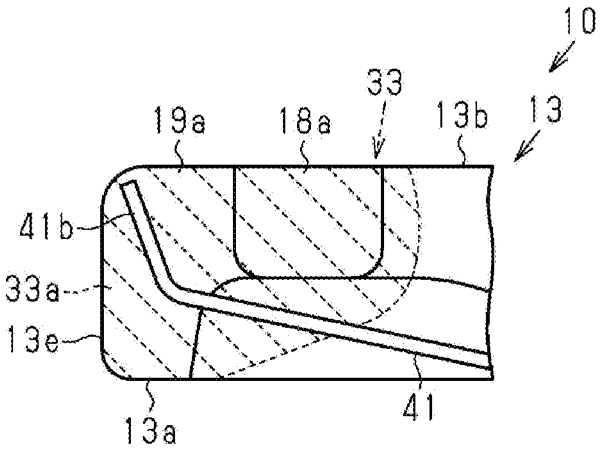
FIG. 25A and FIG. 25B illustrate schematic bottom views of a part of the second flange portion of the coil component according to the modification.

In the second example, as illustrated in FIG. 25A, the second end portion 41*b* of the first wire 41 is bent from a portion of the first wire 41 that is placed on the sloping portion 20 of the second flange portion 13, and is connected to the third bottom surface electrode 33*a* of the third terminal electrode 33 that is formed on the protruding portion 19*a*. With this structure, the area of contact between the second end portion 41*b* of the first wire 41 and the third bottom surface electrode 33*a* increases, and connectivity between the first wire 41 and the third terminal electrode 33 can be improved.

Figure 25B:
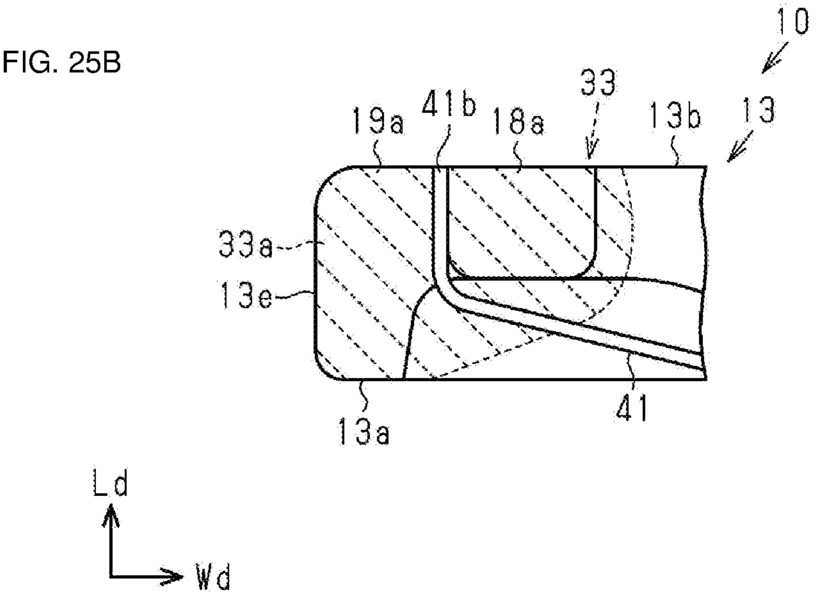

In the third example, as illustrated in FIG. 25B, the second end portion 41*b* of the first wire 41 is bent from a portion of the first wire 41 that is placed on the sloping portion 20 of the second flange portion 13, is adjacent to the leg portion 18*a*, and is connected to the third bottom surface electrode 33*a* of the third terminal electrode 33 that is formed on the protruding portion 19*a*. With this structure, the area of contact between the second end portion 41*b* of the first wire 41 and the third bottom surface electrode 33*a* increases, and connectivity between the first wire 41 and the third terminal electrode 33 can be improved. Since the second end portion 41*b* of the first wire 41 is adjacent to the leg portion 18*a*, the position of the second end portion 41*b* of the first wire 41 can be readily controlled.

Figure 26:
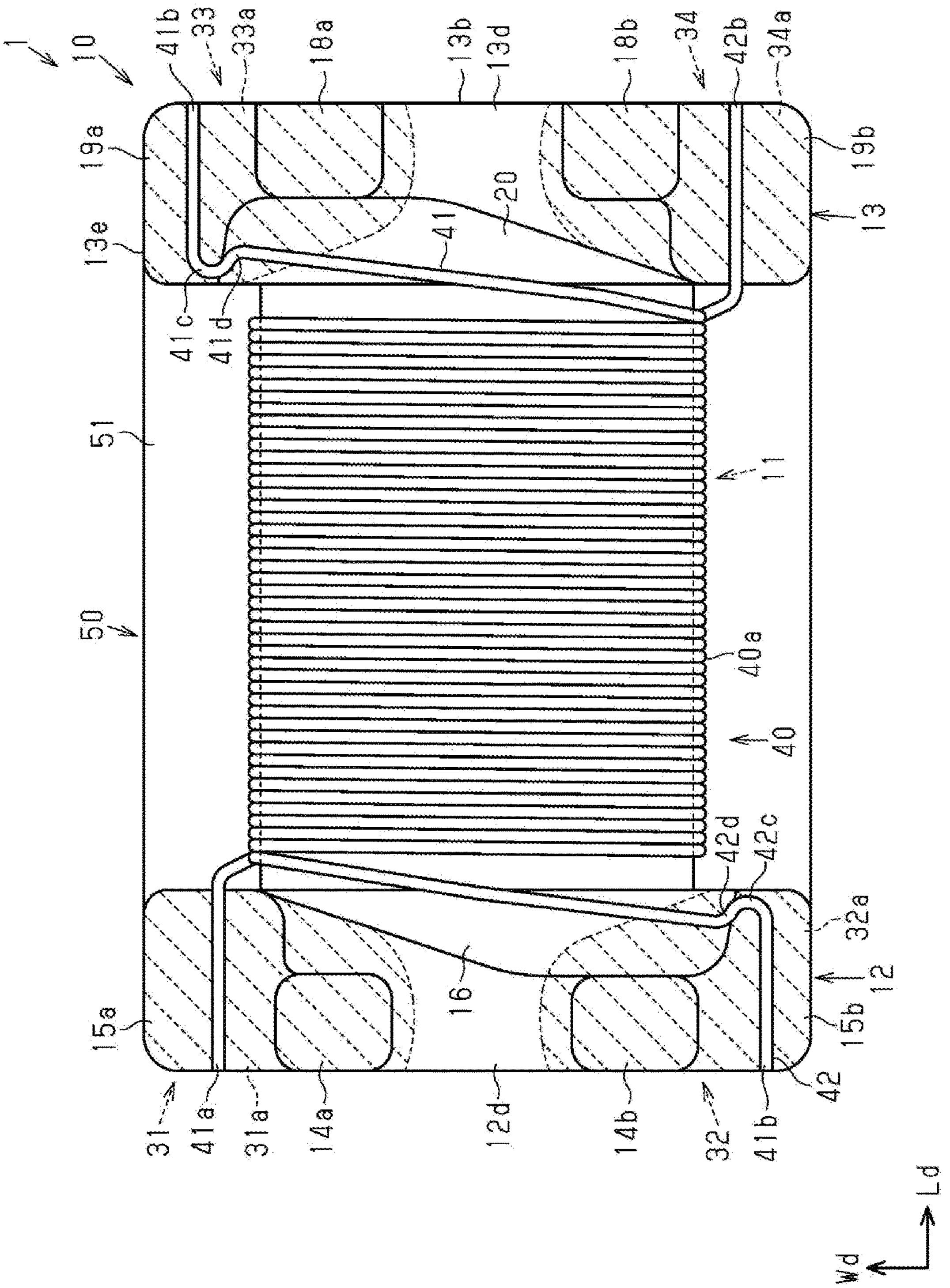
FIG. 26 is a schematic bottom view of the coil component according to the modification.

According to the above embodiment, as illustrated in FIG. 26, the extension portion 40*c* of the first wire 41 may include a third bent portion 41*c* and a fourth bent portion 41*d* as in the first bent portion 42*c* and the second bent portion 42*d* of the extension portion 40*b* of the second wire 42. With this structure, the extension portion 40*c* of the first wire 41 is readily placed on the sloping portion 20 of the second flange portion 13.

Figure 27:
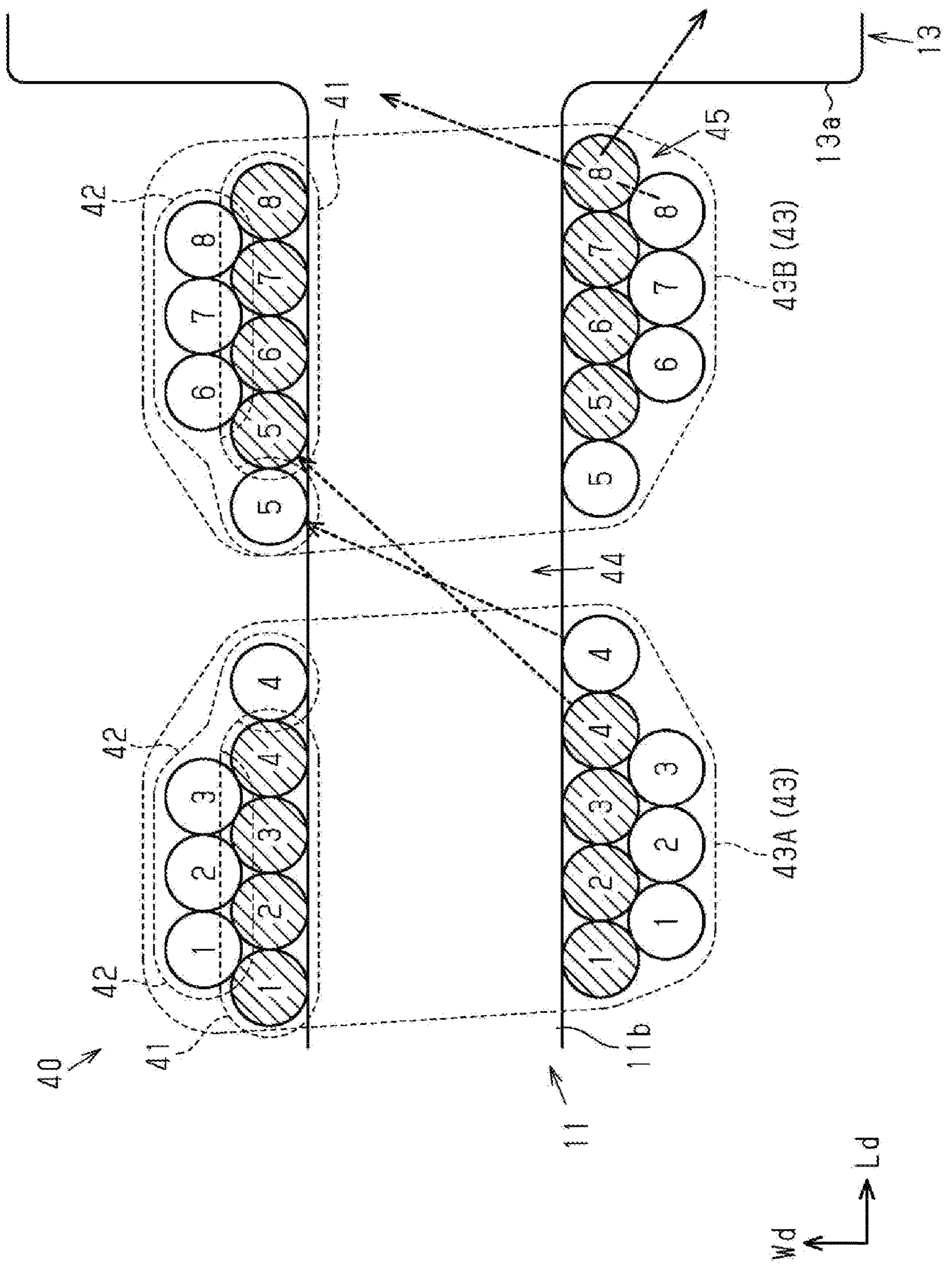
FIG. 27 is a schematic plan view of the winding core portion of the coil component according to the modification around which a first wire and a second wire are wound.

According to the above embodiment, a portion of the second wire 42 from the extension portion 40*b* to the second bent portion 42*d* may be omitted. According to the above embodiment, in the coil 40, the first wire 41 and the second wire 42 are wound so as to form a layer around the winding core portion 11 but are not limited thereto. For example, in the coil 40, the first wire 41 and the second wire 42 are wound around outer side portions of the first wire 41 and the second wire 42 that are wound around the winding core portion 11 so as to form two layers of the winding portion. FIG. 27 illustrates an example of the structure of the two layers of the winding portion of the first wire 41 and the second wire 42. FIG. 27 illustrates two first winding portions 43 that are arranged in the length direction Ld, and a single first intersecting portion 44 that is located between the two first winding portions 43 for convenience. In FIG. 27, the two first winding portions are referred to as first winding portions 43A and 43B to distinguish the two first winding portions 43. For example, the first winding portion 43B is nearest to the first flange portion 12 of the winding portion 40*a* among the first winding portions 43.

As illustrated in FIG. 27, to form the first winding portions 43A and 43B, the first wire 41 and the second wire 42 are wound to have 8 turns. The first wire 41 is wound around the winding core portion 11 to have a predetermined number of turns (4 turns in FIG. 27). The second wire 42 is wound to have a predetermined number of turns (4 turns in FIG. 27) on the outer side portion of the first wire 41 that is wound around the winding core portion 11. Consequently, the two layers of the first winding portion 43A are formed. The second wire 42 is wound around the winding core portion 11 at the fourth turn and is wound around the winding core portion 11 at the fifth turn (the first turn of the first winding portion 43B). The first wire 41 that forms the first winding portion 43B is wound around the winding core portion 11 to have a predetermined number of turns (4 turns in FIG. 27). The second wire 42 is wound on the outer side portion of the first wire 41 at the sixth turn to the eighth turn (the second turn to the fourth turn of the second wire 42 that forms the first winding portion 43B).

The first wire 41 at the fourth turn of the first winding portion 43A and the second wire 42 at the fourth turn of the first winding portion 43A intersect each other to form the first intersecting portion 44. Consequently, there is an inverse relationship between the positions of the first wire 41 and the second wire 42 in the length direction Ld at the fourth turn and the positions of the first wire 41 and the second wire 42 in the length direction Ld at the fifth turn.

As illustrated by two-dot chain lines in FIG. 27, the first wire 41 at the eighth turn of the first winding portion 43B and the second wire 42 at the eighth turn of the first winding portion 43B intersect each other to form the second intersecting portion 45. In the second intersecting portion 45, the first wire 41 in the first layer and the second wire 42 in the second layer intersect each other along the second side surface 11*d* of the winding core portion 11 at the position on the winding portion 40*a* nearest to the second flange portion 13. In the case where the first wire 41 at the eighth turn and the second wire 42 at the eighth turn are in the second layer, in the second intersecting portion 45, the first wire 41 and the second wire 42 intersect each other in the second layer of the winding portion 40*a* along the second side surface 11*d* of the winding core portion 11 at the position on the winding portion 40*a* nearest to the second flange portion 13.

According to the above embodiment, the winding portion 40*a* is formed in a manner in which the first wire 41 and the second wire 42 intersect each other whenever the first wire 41 and the second wire 42 are wound predetermined times but is not limited thereto. For example, the first intersecting portions 44 and the second intersecting portion 45 of the winding portion 40*a*, at which the first wire 41 and the second wire 42 intersect each other, may be omitted. That is, the winding portion 40*a* may include only the first winding portions 43.

According to the above embodiment, the first wire 41 and the second wire 42 intersect each other along the first side surface 11*c* of the winding core portion 11 at the end portion (end portion at the end of winding) of the winding portion 40*a* near the second flange portion 13 as illustrated in FIG. 4 but are not limited thereto. For example, the first wire 41 and the second wire 42 may intersect each other along a surface of the winding portion 40*a* other than the first side surface 11*c* of the winding core portion 11 at the end portion (end portion at the end of winding) near the second flange portion 13. That is, the first wire 41 and the second wire 42 may intersect each other along the bottom surface 11*a*, the upper surface 11*b*, or the second side surface 11*d* of the winding core portion 11 at the end portion (end portion at the end of winding) of the winding portion 40*a* near the second flange portion 13. The second intersecting portion 45 at the end portion (end portion at the end of winding) of the winding portion 40*a* near the second flange portion 13, at which the first wire 41 and the second wire 42 intersect each other, may be omitted.

Figure 28:
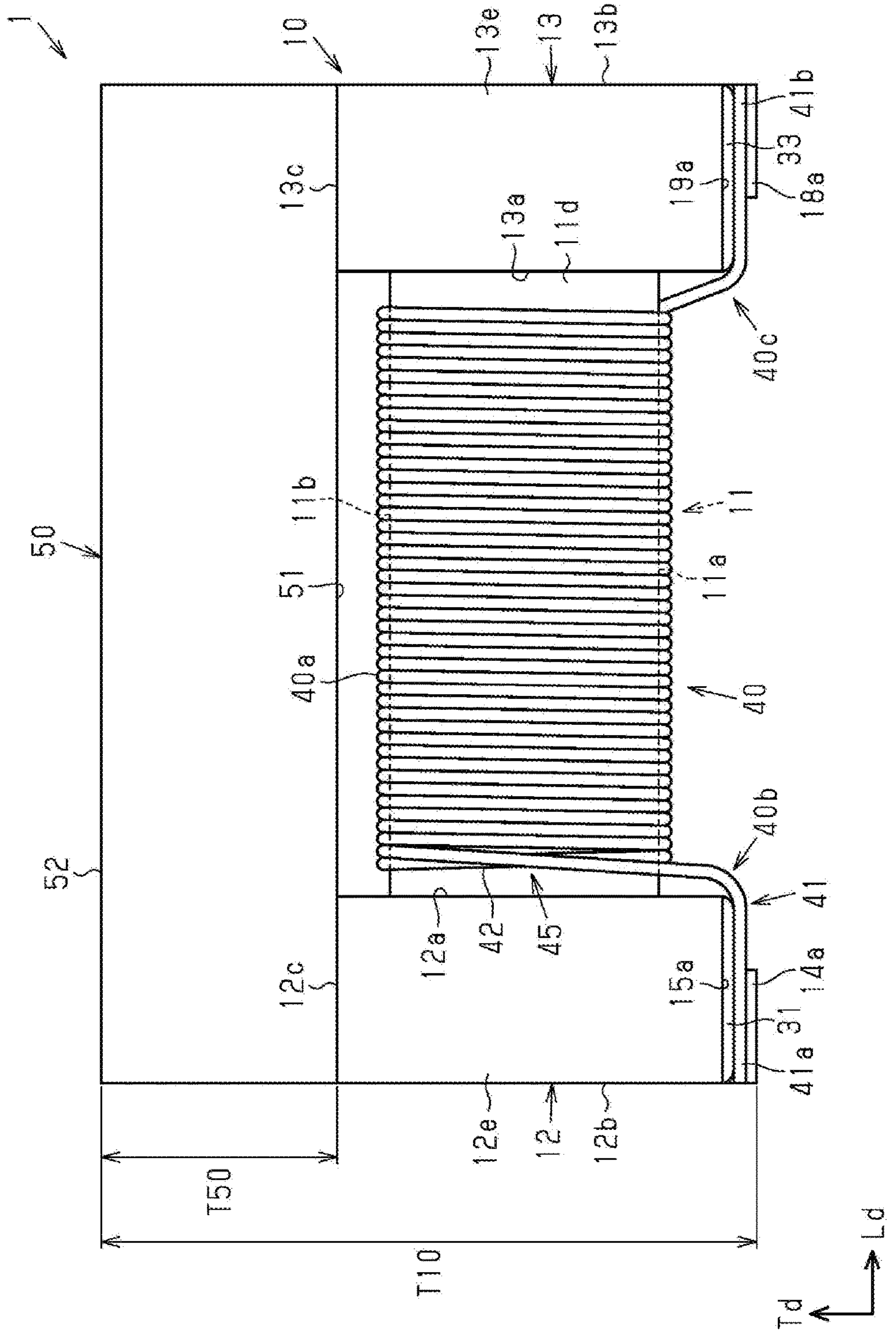
FIG. 28 is a schematic side view of the coil component according to the modification.

According to the above embodiment, the first wire 41 and the second wire 42 intersect each other along the first side surface 11*c* of the winding core portion 11 at the end portion (end portion at the end of winding) of the winding portion 40*a* near the second flange portion 13. However, as illustrated in FIG. 28, the first wire 41 and the second wire 42 may intersect each other along the second side surface 11*d* of the winding core portion 11 at the end portion (at the beginning of winding) of the winding portion 40*a* near the first flange portion 12. That is, the first wire 41 and the second wire 42 intersect each other along the second side surface 11*d* of the winding core portion 11 at the position on the winding portion 40*a* nearest to the first flange portion 12. With this structure, the second intersecting portion 45 is not adjacent to the first winding portions 43 in the length direction Ld, and the winding portion 40*a* is inhibited from being excessively close to the first terminal electrode 31 and the second terminal electrode 32 of the first flange portion 12. Accordingly, the quality of the coil component 1 is improved. In the case where the first wire 41 and the second wire 42 are connected to the first terminal electrode 31 and the second terminal electrode 32, the first wire 41 and the second wire 42 can be gently bent, and the risk of breakage of the first wire 41 and the second wire 42 can be reduced.

In FIG. 28, the second intersecting portion 45 is formed as a part of the first winding portion 43 that is formed at the end portion of the winding portion 40*a* near the first flange portion 12. Also in this case, for example, the first wire 41 and the second wire 42 may intersect each other along a surface of the winding portion 40*a* other than the second side surface 11*d* of the winding core portion 11 at the end portion (end portion at the beginning of winding) near the first flange portion 12. That is, the first wire 41 and the second wire 42 may intersect each other along the bottom surface 11*a*, the upper surface 11*b*, or the first side surface 11*c* of the winding core portion 11 at the end portion (end portion at the beginning of winding) of the winding portion 40*a* near the first flange portion 12. With this structure, the first wire 41 and the second wire 42 can be connected to the first terminal electrode 31 and the second terminal electrode 32 with the first wire 41 and the second wire 42 gently bent, and a stress can be inhibited from concentrating on the second extension portion 40*c* and the fourth extension portion 40*e*. The second intersecting portion 45, at which the first wire 41 and the second wire 42 intersect each other, at the end portion (end portion at the beginning of winding) of the winding portion 40*a* near the first flange portion 12 may be omitted.

According to the above embodiment, the second intersecting portion 45 is formed as a part of the first winding portion 43 that is formed on the end portion (end portion at the end of winding) of the winding portion 40*a* near the second flange portion 13 but is not limited thereto. For example, the second intersecting portion 45 may be formed such that the end portion (end portion at the end of winding) of the winding portion 40*a* near the second flange portion 13 is adjacent to the first winding portions 43 in the length direction Ld. In the case where the second intersecting portion 45 is formed near the end portion (end portion at the beginning of winding) of the winding portion 40*a* near the first flange portion 12, for example, the second intersecting portion 45 may be formed so as to be adjacent, in the length direction Ld, to the first winding portions 43 that is formed at the end portion of the winding portion 40*a* near the first flange portion 12.

According to the above embodiment, the first wire 41 and the second wire 42 that form the first intersecting portions 44 intersect each other along the upper surface 11*b* of the winding core portion 11 but are not limited thereto. For example, the first wire 41 and the second wire 42 that form the first intersecting portions 44 may intersect each other along the bottom surface 11*a*, the first side surface 11*c*, or the second side surface 11*d* of the winding core portion 11.

According to the above embodiment, the length LA of the winding portion 40*a* in the length direction Ld along the bottom surface 11*a* of the winding core portion 11 may be equal to or longer than the length LB of the winding portion 40*a* along the upper surface 11*b* of the winding core portion 11.

According to the above embodiment, the distance LD2 in the length direction Ld between the winding portion 40*a* along the bottom surface 11*a* of the winding core portion 11 and the inner surface 13*a* of the second flange portion 13 may be equal to or shorter than the distance LD1 in the length direction Ld between the winding portion 40*a* along the bottom surface 11*a* of the winding core portion 11 and the inner surface 12*a* of the first flange portion 12.

Modification Related to Terminal Electrode

Figure 29:
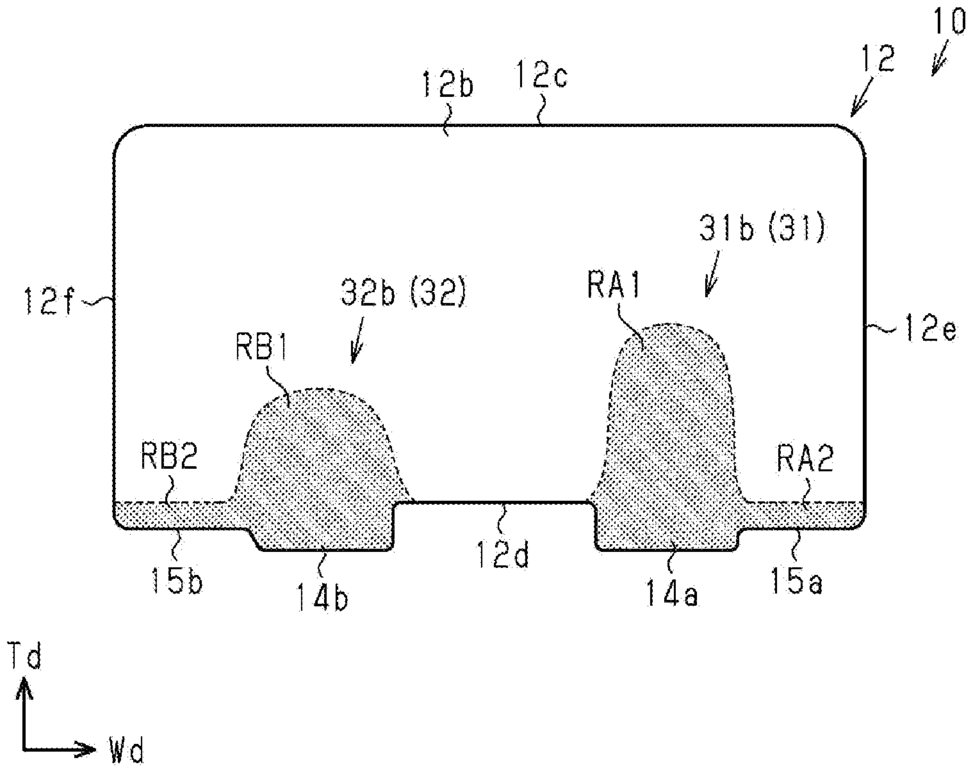
FIG. 29 is a front view of the first flange portion of the coil component according to the modification.

According to the above embodiment, the lengths of the end surface electrodes 31*b* to 34*b* of the terminal electrodes 31 to 34 in the height direction Td can be freely changed. For example, as illustrated in FIG. 29, the length of the first end surface electrode 31*b* of the first terminal electrode 31 in the height direction Td may be longer than the length of the second end surface electrode 32*b* of the second terminal electrode 32 in the height direction Td. The length of the first end surface electrode 31*b* of the first terminal electrode 31 in the height direction Td may be shorter than the length of the second end surface electrode 32*b* of the second terminal electrode 32 in the height direction Td although this is not illustrated. With this structure, a user can see the direction of the coil component 1. The length of the third end surface electrode 33*b* of the third terminal electrode 33 in the height direction Td and the length of the fourth end surface electrode 34*b* of the fourth terminal electrode 34 in the height direction Td can be changed as in the length of the first end surface electrode 31*b* of the first terminal electrode 31 in the height direction Td and the length of the second end surface electrode 32*b* of the second terminal electrode 32 in the height direction Td.

According to the above embodiment, the method of forming the first end surface electrode 31*b* of the first terminal electrode 31 and the second end surface electrode 32*b* of the second terminal electrode 32 may differ from the method of forming the third end surface electrode 33*b* of the third terminal electrode 33 and the fourth end surface electrode 34*b* of the fourth terminal electrode 34. For example, the first end surface electrode 31*b* and the second end surface electrode 32*b* may be formed by using the applicator 100, and the third end surface electrode 33*b* and the fourth end surface electrode 34*b* may be formed by screen printing. The third end surface electrode 33*b* and the fourth end surface electrode 34*b* may be formed by using the applicator 100, and the first end surface electrode 31*b* and the second end surface electrode 32*b* may be formed by screen printing. In this case, the first end surface electrode 31*b* and the second end surface electrode 32*b* or the third end surface electrode 33*b* and the fourth end surface electrode 34*b* are each formed to have an uneven shape. The method of forming the end surface electrodes 31*b* to 34*b* may be individually set. In this case, at least one of the end surface electrodes 31*b* to 34*b* is formed by using the applicator 100, and at least one of the end surface electrodes 31*b* to 34*b* is formed to have an uneven shape.

According to the above embodiment, at least one of the outer edges of the bottom surface electrodes 31*a* to 34*a* of the terminal electrodes 31 to 34 may has a straight portion. In short, it is only necessary for each of the outer edges of the bottom surface electrodes 31*a* to 34*a* to have a shape that includes no corner portion on which a stress is likely to concentrate.

According to the above embodiment, at least one of the outer edges of the end surface electrodes 31*b* to 34*b* of the terminal electrodes 31 to 34 may has a straight portion. In short, it is only necessary for each of the outer edges of the end surface electrode 31*b* to 34*b* to have a shape that has no corner portion on which a stress is likely to concentrate.

According to the above embodiment, at least one of the outer edges of the bottom surface electrodes 31*a* to 34*a* of the terminal electrodes 31 to 34 may be straight as a whole. That is, at least one of the outer edges of the bottom surface electrodes 31*a* to 34*a* may have a shape that has no convex curve.

According to the above embodiment, at least one of the outer edges of the end surface electrodes 31*b* to 34*b* of the terminal electrodes 31 to 34 may be straight as a whole. That is, at least one of the outer edges of the end surface electrode 31*b* to 34*b* may have a shape that has no convex curve.

According to the above embodiment, the relationship between the lengths of the end surface electrodes 31*b* to 34*b* of the terminal electrodes 31 to 34 in the height direction Td and the lengths thereof in the width direction Wd can be freely changed. The length of at least one of the end surface electrodes 31*b* to 34*b* in the height direction Td may be equal to or shorter than the length thereof in the width direction Wd.

According to the above embodiment, the end surface electrodes 31*b* to 34*b* of the terminal electrodes 31 to 34 may be omitted. According to the above embodiment, the plate member 50 may be omitted.

According to the above embodiment, after the end surface electrodes 31*b* to 34*b* of the terminal electrodes 31 to 34 are formed by using the applicator 100, the bottom surface electrodes 31*a* to 34*a* of the terminal electrodes 31 to 34 are formed by using the dip coating device 110. However, this is not a limitation. After the bottom surface electrodes 31*a* to 34*a* are formed by using the dip coating device 110, the end surface electrodes 31*b* to 34*b* may be formed by using the applicator 100. In this case, the end surface electrodes 31*b* to 34*b* are formed on the outer side portions of the bottom surface electrodes 31*a* to 34*a* at positions at which the bottom surface electrodes 31*a* to 34*a* and the end surface electrodes 31*b* to 34*b* overlap.

According to the above embodiment, the end surface electrodes 31*b* to 34*b* of the terminal electrodes 31 to 34 are formed by using the applicator 100. However, the method of forming the end surface electrodes 31*b* to 34*b* is not limited thereto. For example, the end surface electrodes 31*b* to 34*b* of the terminal electrodes 31 to 34 may be formed by using a screen-printing device.

In the end surface electrode formation step according to the above embodiment, the number of the applied portions 35 in a row in the width direction Wd may differ from the number of the applied portions 35 in a column in the height direction Td. For example, the number of the applied portions 35 in a row in the width direction Wd may gradually increase in the direction toward the bottom surface 12*d* of the first flange portion 12 and in the direction toward the bottom surface 13*d* of the second flange portion 13.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A coil component comprising:

a core including a winding core portion that extends in a length direction of the coil component and a first flange portion that is disposed on a first end portion of the winding core portion in the length direction, the winding core portion including a first curved portion that is formed at a connection between a bottom surface of the winding core portion and the first flange portion, and the winding core portion including a third curved portion that is formed at a connection between an upper surface of the winding core portion and the first flange portion;

a first wire and a second wire that are wound around the winding core portion in the same direction;

a first terminal electrode that is disposed on a bottom part of the first flange portion in a height direction of the coil component perpendicular to the length direction and that is connected to a first end portion of the first wire; and a second terminal electrode that is disposed on the bottom part of the first flange portion and that is connected to a first end portion of the second wire, and wherein a ratio of a length of the first curved portion in the height direction to a distance in the height direction between the bottom surface of the winding core portion and the first terminal electrode is from 20% to 60% in a section of the winding core portion that passes through a center of the winding core portion and that is along a plane extending in the length direction and in the height direction, and wherein the length of the first curved portion in the height direction is longer than a length of the third curved portion in the height direction in the section of the winding core portion that passes through the center of the winding core portion and that is along the plane extending in the length direction and in the height direction.

2. The coil component according to claim 1, wherein a shape of the first curved portion includes a curve that partly defines a true-circular shape in the section of the winding core portion that passes through the center of the winding core portion and that is along the plane extending in the length direction and in the height direction.

3. The coil component according to claim 1, wherein a curvature of the first curved portion varies in the length direction from the bottom surface of the winding core portion toward a surface of the first flange portion near the winding core portion in the section of the winding core portion that passes through the center of the winding core portion and that is along the plane extending in the length direction and in the height direction.

4. The coil component according to claim 3, wherein a shape of the first curved portion includes a curve that partly defines an elliptic shape having a major axis in the length direction in the section of the winding core portion that passes through the center of the winding core portion and that is along the plane extending in the length direction and in the height direction.

5. The coil component according to claim 3, wherein a shape of the first curved portion includes a curve that partly defines an elliptic shape having a minor axis in the length direction in the section of the winding core portion that passes through the center of the winding core portion and that is along the plane extending in the length direction and in the height direction.

6. The coil component according to claim 1, wherein a length of the first curved portion in the length direction is longer than a length of the third curved portion in the length direction.

7. The coil component according to claim 1, further comprising:

a second flange portion that is disposed on a second end portion of the winding core portion in the length direction, wherein the winding core portion includes a second curved portion that is formed at a connection between the bottom surface of the winding core portion and the second flange portion, and a fourth curved portion that is formed at a connection between the upper surface of the winding core portion and the second flange portion, and a distance in the length direction between the first curved portion and the second curved portion is longer than a distance in the length direction between the third curved portion and the fourth curved portion in the section of the winding core portion that passes through the center of the winding core portion and that is along the plane extending in the length direction and in the height direction.

8. The coil component according to claim 1, wherein the first wire and the second wire are wound around the winding core portion to form a winding portion, and a length of the winding portion in the length direction along the bottom surface of the winding core portion is shorter than a length of the winding portion in the length direction along the upper surface of the winding core portion in the section of the winding core portion that passes through the center of the winding core portion and that is along the plane extending in the length direction and in the height direction.

9. The coil component according to claim 1, wherein the first wire and the second wire are wound around the winding core portion to form a winding portion, and a distance in the length direction between a surface of the first flange portion near the winding core portion and the winding portion along the bottom surface of the winding core portion is longer than a distance in the length direction between the surface of the first flange portion near the winding core portion and the winding portion along the upper surface of the winding core portion in the section of the winding core portion that passes through the center of the winding core portion and that is along the plane extending in the length direction and in the height direction.

10. The coil component according to claim 2, wherein a length of the first curved portion in the length direction is longer than a length of the third curved portion in the length direction.

11. The coil component according to claim 3, wherein a length of the first curved portion in the length direction is longer than a length of the third curved portion in the length direction.

12. The coil component according to claim 2, further comprising:

a second flange portion that is disposed on a second end portion of the winding core portion in the length direction, wherein the winding core portion includes a second curved portion that is formed at a connection between the bottom surface of the winding core portion and the second flange portion, and a fourth curved portion that is formed at a connection between the upper surface of the winding core portion and the second flange portion, and a distance in the length direction between the first curved portion and the second curved portion is longer than a distance in the length direction between the third curved portion and the fourth curved portion in the section of the winding core portion that passes through the center of the winding core portion and that is along the plane extending in the length direction and in the height direction.

13. The coil component according to claim 2, wherein the first wire and the second wire are wound around the winding core portion to form a winding portion, and a length of the winding portion in the length direction along the bottom surface of the winding core portion is shorter than a length of the winding portion in the length direction along the upper surface of the winding core portion in the section of the winding core portion that passes through the center of the winding core portion and that is along the plane extending in the length direction and in the height direction.

14. The coil component according to claim 2, wherein the first wire and the second wire are wound around the winding core portion to form a winding portion, and a distance in the length direction between a surface of the first flange portion near the winding core portion and the winding portion along the bottom surface of the winding core portion is longer than a distance in the length direction between the surface of the first flange portion near the winding core portion and the winding portion along the upper surface of the winding core portion in the section of the winding core portion that passes through the center of the winding core portion and that is along the plane extending in the length direction and in the height direction.

15. A coil component comprising:

a core including a winding core portion that extends in a length direction of the coil component and a first flange portion that is disposed on a first end portion of the winding core portion in the length direction, the winding core portion including a first curved portion that is formed at a connection between a bottom surface of the winding core portion and the first flange portion, and the winding core portion including a third curved portion that is formed at a connection between an upper surface of the winding core portion and the first flange portion;

a first wire and a second wire that are wound around the winding core portion in the same direction;

a first terminal electrode that is disposed on a bottom part of the first flange portion in a height direction of the coil component perpendicular to the length direction and that is connected to a first end portion of the first wire; and a second terminal electrode that is disposed on the bottom part of the first flange portion and that is connected to a first end portion of the second wire, wherein a curvature of the first curved portion varies in the length direction from the bottom surface of the winding core portion toward a surface of the first flange portion near the winding core portion in a section of the winding core portion that passes through a center of the winding core portion and that is along a plane extending in the length direction and in the height direction, and wherein a length of the first curved portion in the height direction is longer than a length of the third curved portion in the height direction in the section of the winding core portion that passes through the center of the winding core portion and that is along the plane extending in the length direction and in the height direction.

16. The coil component according to claim 15, wherein a shape of the first curved portion includes a curve that partly defines an elliptic shape having a major axis in the length direction in the section of the winding core portion that passes through the center of the winding core portion and that is along the plane extending in the length direction and in the height direction.

17. The coil component according to claim 15, wherein a shape of the first curved portion includes a curve that partly defines an elliptic shape having a minor axis in the length direction in the section of the winding core portion that passes through the center of the winding core portion and that is along the plane extending in the length direction and in the height direction.

18. The coil component according to claim 15, further comprising:

a second flange portion that is disposed on a second end portion of the winding core portion in the length direction, wherein the winding core portion includes a second curved portion that is formed at a connection between the bottom surface of the winding core portion and the second flange portion, and a fourth curved portion that is formed at a connection between the upper surface of the winding core portion and the second flange portion, and a distance in the length direction between the first curved portion and the second curved portion is longer than a distance in the length direction between the third curved portion and the fourth curved portion in the section of the winding core portion that passes through the center of the winding core portion and that is along the plane extending in the length direction and in the height direction.

* * * * *